US009090822B2

(12) United States Patent
Goetz et al.

(10) Patent No.: US 9,090,822 B2
(45) Date of Patent: *Jul. 28, 2015

(54) POLYMERIZABLE COMPOUNDS AND THE USE THEREOF IN LIQUID CRYSTAL DISPLAYS

(75) Inventors: Achim Goetz, Alsbach-Haehnlein (DE); Christoph Marten, Darmstadt (DE); Sven Christian Laut, Griesheim (DE); Andreas Taugerbeck, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/504,231

(22) PCT Filed: Oct. 4, 2010

(86) PCT No.: PCT/EP2010/006050
§ 371 (c)(1),
(2), (4) Date: Apr. 26, 2012

(87) PCT Pub. No.: WO2011/050893
PCT Pub. Date: May 5, 2011

(65) Prior Publication Data
US 2012/0224124 A1    Sep. 6, 2012

(30) Foreign Application Priority Data

Oct. 28, 2009   (DE) .................. 10 2009 050 989

(51) Int. Cl.
| | | |
|---|---|---|
| C09K 19/12 | (2006.01) | |
| C09K 19/52 | (2006.01) | |
| C09K 19/06 | (2006.01) | |
| C09K 19/00 | (2006.01) | |
| C09K 19/02 | (2006.01) | |
| G02F 1/1333 | (2006.01) | |
| C07C 69/52 | (2006.01) | |
| C09K 19/04 | (2006.01) | |
| C09K 19/54 | (2006.01) | |

(52) U.S. Cl.
CPC ......... *C09K 19/12* (2013.01); *C09K 2019/0448* (2013.01); *C09K 2019/123* (2013.01); *C09K 2019/548* (2013.01)

(58) Field of Classification Search
CPC .. C09K 19/12; C09K 19/06; C09K 2019/123; C09K 2019/548; C09K 2019/0448; G02F 1/1333; C07C 69/52

USPC ............... 428/1.1; 252/299.5, 299.01, 299.6, 252/299.66; 349/86, 187, 183; 560/221
See application file for complete search history.

(56) References Cited

U.S. PATENT DOCUMENTS

| | | | |
|---|---|---|---|
| 5,723,066 A | 3/1998 | Coates et al. | |
| 5,746,938 A | 5/1998 | Coates et al. | |
| 5,871,665 A | 2/1999 | Coates et al. | |
| 5,972,240 A | 10/1999 | Kobayashi et al. | |
| 6,042,745 A | 3/2000 | Coates et al. | |
| 6,090,308 A | 7/2000 | Coates et al. | |
| 6,187,222 B1 | 2/2001 | Coates et al. | |
| 6,475,574 B1 | 11/2002 | Coates et al. | |
| 7,125,500 B2 * | 10/2006 | Farrand et al. ........... 252/299.01 |
| 7,625,610 B2 | 12/2009 | Saito et al. | |
| 7,807,068 B2 | 10/2010 | Bremer et al. | |
| 8,304,035 B2 * | 11/2012 | Bernatz et al. ............... 428/1.1 |
| 8,535,768 B2 | 9/2013 | Saito | |
| 2008/0083903 A1 | 4/2008 | Saito et al. | |
| 2009/0141215 A1 | 6/2009 | Bremer et al. | |
| 2010/0309423 A1 | 12/2010 | Bernatz et al. | |
| 2010/0328601 A1 | 12/2010 | Matsumoto et al. | |
| 2011/0272631 A1 | 11/2011 | Saito | |
| 2012/0224124 A1 * | 9/2012 | Goetz et al. ..................... 349/84 |

FOREIGN PATENT DOCUMENTS

| | | |
|---|---|---|
| DE | 69613962 T2 | 4/2002 |
| DE | 102008056221 A1 | 6/2009 |
| EP | 0730019 A1 | 9/1996 |
| EP | 1 908 814 A1 | 4/2008 |
| EP | 2380947 A1 | 10/2011 |
| JP | 07-101900 | 4/1995 |
| JP | 08-291288 A | 11/1996 |
| JP | 10-036847 A | 2/1998 |
| JP | 2009011507 A | 1/2009 |
| JP | 2009132718 A | 6/2009 |
| WO | 00/29505 A1 | 5/2000 |
| WO | 2009/030329 A1 | 3/2009 |
| WO | 2009/104468 A1 | 8/2009 |
| WO | 2010084823 A1 | 7/2010 |

OTHER PUBLICATIONS

International Search Report, dated Jan. 12, 2011, issued in corresponding PCT/EP2010/006050.

(Continued)

*Primary Examiner* — Geraldina Visconti
(74) *Attorney, Agent, or Firm* — Millen, White, Zelano, Branigan, P.C.

(57) ABSTRACT

The present invention relates to polymerizable compounds, to processes and intermediates for the preparation thereof, and to the use thereof for optical, electro-optical and electronic purposes, in particular in liquid-crystal (LC) media and LC displays, especially in LC displays of the PS or PSA type ("polymer sustained" or "polymer sustained alignment" respectively).

24 Claims, No Drawings

(56) References Cited

OTHER PUBLICATIONS

Taiwan IPO Search Report. Language: Taiwanese. Date of completion of the search: Sep. 22, 2014.
English Translation of Taiwan IPO Search Report. Date of Completion of the search: Sep. 22, 2014.
Office Action in Taiwan Patent Application No. 099136329. Dated Sep. 25, 2014. Language: Taiwanese.
English Translation of Office Action in Taiwan Patent Application No. 099136329. Dated: Sep. 25, 2014.
English Translation of JP 07-101900. "Terphenyl Methacrylate Derivative and Polymer Dispersion Type Liquid Crystal Display Element Using the Same," Publication Date: Apr. 18, 1995. Application No. 06-018649. Filing Date: Feb. 15, 1994. Inventor: Yamada Shuhei et al. Applicant: Seiko Epson Corp. (Machine Translation by INPIT).

* cited by examiner

POLYMERIZABLE COMPOUNDS AND THE USE THEREOF IN LIQUID CRYSTAL DISPLAYS

The present invention relates to polymerisable compounds, to processes and intermediates for the preparation thereof, and to the use thereof for optical, electro-optical and electronic purposes, in particular in liquid-crystal (LC) media and LC displays, especially in LC displays of the PS ("polymer sustained") or PSA ("polymer sustened alignment") type.

The liquid-crystal displays (LC displays) used at present are usually those of the TN ("twisted nematic") type. However, these have the disadvantage of a strong viewing-angle dependence of the contrast. In addition, so-called VA ("vertically aligned") displays are known which have a broader viewing angle. The LC cell of a VA display contains a layer of an LC medium between two transparent electrodes, where the LC medium usually has a negative value of the dielectric (DC) anisotropy. In the switched-off state, the molecules of the LC layer are aligned perpendicular to the electrode surfaces (homeotropically) or have a tilted homeotropic alignment. On application of an electrical voltage to the two electrodes, a realignment of the LC molecules parallel to the electrode surfaces takes place.

Furthermore, OCB ("optically compensated bend") displays are known which are based on a birefringence effect and have an LC layer with a so-called "bend" alignment and usually positive (DC) anisotropy. On application of an electrical voltage, a realignment of the LC molecules perpendicular to the electrode surfaces takes place. In addition, OCB displays normally contain one or more birefringent optical retardation films in order to prevent undesired transparency to light of the bend cell in the dark state. OCB displays have a broader viewing angle and shorter response times compared with TN displays.

Also known are so-called IPS ("in-plane switching") displays, which contain an LC layer between two substrates, where the two electrodes are arranged on only one of the two substrates and preferably have intermeshed, comb-shaped structures. On application of a voltage to the electrodes, an electric field which has a significant component parallel to the LC layer is thereby generated between them. This causes realignment of the LC molecules in the layer plane.

Furthermore, so-called FFS ("fringe-field switching") displays have been proposed (see, inter alia, S. H. Jung et al., Jpn. J. Appl. Phys., Volume 43, No. 3, 2004, 1028), which likewise contain two electrodes on the same substrate, but, in contrast to IPS displays, only one of these is in the form of an electrode which is structured in a comb-shaped manner, and the other electrode is unstructured. A strong, so-called "fringe field" is thereby generated, i.e. a strong electric field close to the edge of the electrodes, and, throughout the cell, an electric field which has both a strong vertical component and also a strong horizontal component. Both IPS displays and also FFS displays have a low viewing-angle dependence of the contrast.

In VA displays of the more recent type, uniform alignment of the LC molecules is restricted to a plurality of relatively small domains within the LC cell. Disclinations may exist between these domains, also known as tilt domains. VA displays having tilt domains have, compared with conventional VA displays, a greater viewing-angle independence of the contrast and the grey shades. In addition, displays of this type are simpler to produce since additional treatment of the electrode surface for uniform alignment of the molecules in the switched-on state, such as, for example, by rubbing, is no longer necessary. Instead, the preferential direction of the tilt or pretilt angle is controlled by a special design of the electrodes.

In so-called MVA ("multidomain vertical alignment") displays, this is usually achieved by the electrodes having protrusions which cause a local pretilt. As a consequence, the LC molecules are aligned parallel to the electrode surfaces in different directions in different, defined regions of the cell on application of a voltage. "Controlled" switching is thereby achieved, and the formation of interfering disclination lines is prevented. Although this arrangement improves the viewing angle of the display, it results, however, in a reduction in its transparency to light.

A further development of MVA uses protrusions on only one electrode side, while the opposite electrode has slits, which improves the transparency to light. The slotted electrodes generate an inhomogeneous electric field in the LC cell on application of a voltage, meaning that controlled switching is still achieved. For further improvement of the transparency to light, the separations between the slits and protrusions can be increased, but this in turn results in a lengthening of the response times. In so-called PVA (patterned VA), protrusions are rendered completely superfluous in that both electrodes are structured by means of slits on the opposite sides, which results in increased contrast and improved transparency to light, but is technologically difficult and makes the display more sensitive to mechanical influences ("tapping", etc.). For many applications, such as, for example, monitors and especially TV screens, however, a shortening of the response times and an improvement in the contrast and luminance (transmission) of the display are demanded.

A further development are the so-called PS or PSA (polymer sustained or polymer sustained alignment) displays, for which the term "polymer stabilised" is also occasionally used. In these displays, a small amount (for example 0.3% by weight, typically <1% by weight) of one or more polymerisable compound(s) is added to the LC medium and, after introduction into the LC cell, is polymerised or crosslinked in situ, usually by UV photopolymerisation, between the electrodes with or without an applied electrical voltage. The addition of polymerisable mesogenic or liquid-crystalline compounds, also known as reactive mesogens or "RMs", to the LC mixture has proven particularly suitable.

Unless indicated otherwise, the term "PSA" is used below as representative of PS displays and PSA displays.

In the meantime, the PS(A) principle is being used in diverse classical LC displays. Thus, for example, PSA-VA, PSA-OCB, PSA-IPS, PSA-FFS and PSA-TN displays are known. The polymerisation of the polymerisable compound(s) preferably takes place with an applied electrical voltage in the case of PSA-VA and PSA-OCB displays, and with or without an applied electrical voltage in the case of PSA-IPS displays. As can be demonstrated in test cells, the PS(A) method results in a pretilt in the cell. In the case of PSA-OCB displays, for example, it is possible for the bend structure to be stabilised so that an offset voltage is unnecessary or can be reduced. In the case of PSA-VA displays, the pretilt has a positive effect on response times. For PSA-VA displays, a standard MVA or PVA pixel and electrode layout can be used. In addition, however, it is also possible, for example, to manage with only one structured electrode side and no protrusions, which significantly simplifies production and at the same time results in very good contrast at the same time as very good transparency to light.

In addition, so-called positive-VA displays have proven to be a particularly favourable embodiment. Just as in the case of classical VA displays, the initial alignment of the liquid crystals in positive-VA displays in the strain-free starting state is homeotropic, i.e. essentially perpendicular to the substrates. In contrast to classical VA displays, however, positive-VA displays use LC media having positive dielectric anisotropy. The two electrodes in positive-VA displays are, as in the case of the IPS displays usually used, only arranged on one of the two substrates, and preferably have comb-shaped (interdigital) structures which are interlocked with one another. By application of an electrical voltage to the interdigital electrodes, which generate a field essentially parallel to the layer of the LC medium, the LC molecules are converted into an alignment which is essentially parallel to the substrates. Polymer stabilisation (PSA), i.e. the addition of RMs to the LC medium, which polymerise in the cell, enabling a considerable reduction to be achieved in the response times, has also proven to be advantageous in the case of positive VA displays.

PSA-VA displays are described, for example, in JP 10-036847 A, EP 1 170 626 A2, U.S. Pat. No. 6,861,107, U.S. Pat. No. 7,169,449, US 2004/0191428 A1, US 2006/0066793 A1 and US 2006/0103804 A1. PSA-OCB displays are described, for example, in T.-J-Chen et al., Jpn. J. Appl. Phys. 45, 2006, 2702-2704 and S. H. Kim, L.-C-Chien, Jpn. J. Appl. Phys. 43, 2004, 7643-7647. PSA-IPS displays are described, for example, in U.S. Pat. No. 6,177,972 and Appl. Phys. Lett. 1999, 75(21), 3264. PSA-TN displays are described, for example, in Optics Express 2004, 12(7), 1221.

Like the conventional LC displays described above, PSA displays can be operated as active-matrix or passive-matrix displays. In the case of active-matrix displays, individual pixels are usually addressed by integrated, non-linear active elements, such as, for example, transistors (for example thin-film transistors ("TFTs")), while in the case of passive-matrix displays, individual pixels are usually addressed by the multiplex method, where both methods are known from the prior art.

In particular for monitor and especially TV applications, optimisation of the response times, but also of the contrast and luminance (thus also transmission) of the LC display continues to be demanded. The PSA method can provide crucial advantages here. In particular in the case of PSA-VA, PSA-IPS, PSA-FFS and PSA-positive-VA displays, a shortening of the response times, which correlate with a measurable pretilt in test cells, can be achieved without significant adverse effects on other parameters.

In the prior art, use is made, for example, of polymerisable compounds of the following formula:

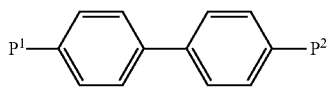

in which P denotes a polymerisable group, usually an acrylate or methacrylate group, as described, for example, in U.S. Pat. No. 7,169,449.

However, the problem arises that not all combinations consisting of LC mixture (also referred to as "LC host mixture" below)+polymerisable component (typically RMs) are suitable for PSA displays since, for example, an inadequate tilt or none at all becomes established or since, for example, the so-called "voltage holding ratio" (VHR or HR) is inadequate for TFT display applications. In addition, it has been found that, on use in PSA displays, the LC mixtures and RMs known from the prior art still have some disadvantages. Thus, not every known RM which is soluble in LC mixtures is suitable for use in PSA displays. In addition, it is often difficult to find a suitable selection criterion for the RM besides direct measurement of the pretilt in the PSA display. The choice of suitable RMs becomes even smaller if polymerisation by means of UV light without the addition of photoinitiators is desired, which may be advantageous for certain applications.

In addition, the selected combination of LC host mixture/RM should have the lowest possible rotational viscosity and the best possible electrical properties. In particular, it should have the highest possible VHR. In PSA displays, a high VHR after irradiation with UV light is particularly necessary since UV exposure is a requisite part of the display production process, but also occurs as normal exposure during operation of the finished display.

In particular, it would be desirable to have available novel materials for PSA displays which produce a particularly small pretilt angle. Preferred materials here are those which produce a lower pretilt angle during polymerisation for the same exposure time than the materials known to date, and/or through the use of which the (higher) pretilt angle that can be achieved with known materials can already be achieved after a shorter exposure time. The production time ("tact time") of the display could thus be shortened and the costs of the production process reduced.

A further problem in the production of PSA displays is the presence or removal of residual amounts of unpolymerised RMs, in particular after the polymerisation step for production of the pretilt angle in the display. For example, unreacted RMs of this type may adversely affect the properties of the display by, for example, polymerising in an uncontrolled manner during operation after finishing of the display.

Thus, the PSA displays known from the prior art often exhibit the undesired effect of so-called "image sticking" or "image burn", i.e. the image produced in the LC display by temporary addressing of individual pixels still remains visible even after the electric field in these pixels has been switched off or after other pixels have been addressed.

This "image sticking" can occur on the one hand if LC host mixtures having a low VHR are used. The UV component of daylight or the backlighting can cause undesired decomposition reactions of the LC molecules therein and thus initiate the production of ionic or free-radical impurities. These may accumulate, in particular, at the electrodes or the alignment layers, where they may reduce the effective applied voltage. This effect can also be observed in conventional LC displays without a polymer component.

In addition, an additional "image sticking" effect caused by the presence of unpolymerised RMs is often observed in PSA displays. Uncontrolled polymerisation of the residual RMs is initiated here by UV light from the environment or by the backlighting. In the switched display areas, this changes the tilt angle after a number of addressing cycles. As a result, a change in transmission in the switched areas may occur, while it remains unchanged in the unswitched areas.

It is therefore desirable for the polymerisation of the RMs to proceed as completely as possible during production of the PSA display and for the presence of unpolymerised RMs in the display to be excluded as far as possible or reduced to a minimum. To this end, materials are required which enable highly effective and complete polymerisation. In addition, controlled reaction of these residual amounts would be desirable. This would be simpler if the RM polymerised more rapidly and effectively than the materials known to date.

There is thus still a great demand for PSA displays, in particular of the VA and OCB type, and LC media and polymerisable compounds for use in such displays, which do not exhibit the disadvantages described above or only do so to a small extent and have improved properties. In addition, there is a great demand for PSA displays, and materials for use in PSA displays, which have advantageous properties, in particular enable a high specific resistance at the same time as a large working-temperature range, short response times, even at low temperatures, and a low threshold voltage, a low pretilt angle, a multiplicity of grey shades, high contrast and a broad viewing angle, and have high values for the "voltage holding ratio" (VHR) after UV exposure and of the low=temperature stability, also known as "LTS", i.e. the stability of the LC mixture to spontaneous crystallisation-out of individual components.

The invention is based on the object of providing novel suitable materials, in particular RMs and LC media comprising same, for use in PSA displays, which do not have the disadvantages indicated above or do so to a reduced extent, polymerise as rapidly and completely as possible, enable a low pretilt angle to be established as quickly as possible, reduce or prevent the occurrence of "image sticking" in the display, and preferably at the same time enable very high specific resistance values, low threshold voltages and short response times. In addition, the LC media should have favourable LC phase properties and high VHR and LTS values.

A further object of the invention is the provision of novel RMs, in particular for optical, electro-optical and electronic applications, and of suitable processes and intermediates for the preparation thereof.

In particular, the invention is based on the object of providing polymerisable compounds which produce a greater maximum pretilt after photopolymerisation, which results in the desired pretilt being achieved more quickly and thus in significantly shortened times for production of the LC display.

This object has been achieved in accordance with the invention by the provision of materials, processes and LC displays as described in the present application. In particular, it has been found, surprisingly, that some or all of the objects described above can be achieved by providing PSA displays which contain one or more polymerised compounds according to the invention or by using LC media which comprise one or more polymerisable compounds according to the invention for the production of PSA displays of this type. The polymerisable compounds according to the invention contain, as mesogenic group, a terphenyl group which is at least monosubstituted by a halogen atom, as well as one or more polymerisable groups. Particular preference is given to compounds according to the invention containing two or more than two polymerisable groups in which at least one of these polymerisable groups is connected to the terphenyl group via a spacer group and at least one of these polymerisable groups is connected to the terphenyl group directly, i.e. not via a spacer group. The use of polymerisable compounds of this type in LC media and PSA displays according to the invention results in the desired pretilt being achieved particularly quickly and in significantly shortened times for production of the display. This has been demonstrated in connection with an LC medium by means of exposure time-dependent pretilt measurements in VA tilt measurement cells. In particular, it was possible to achieve a pretilt without the addition of photoinitiator.

Since the polymerisable compounds according to the invention exhibit a significantly higher polymerisation rate in the PSA displays, fewer unreacted residual amounts also remain in the LC cell, causing an improvement in the electro-optical properties thereof, and the controlled reaction of these residual amounts becomes simpler.

Polymerisable terphenyl compounds have already been described in the prior art. WO 2009/030329 A1 discloses PSA displays containing RMs which contain only one spacer group and may also contain a terphenyl group, but does not explicitly disclose reactive terphenyls according to the invention with lateral halogen substitution. WO 93/22397 A1 and U.S. Pat. No. 5,723,066 disclose direactive terphenyl RMs with lateral fluorine substituents, as well as PDLC displays containing phase-separated microdroplets of an LC mixture in an optically isotropic and transparent polymer matrix, but do not explicitly disclose reactive terphenyls according to the invention containing only one spacer group, or the general use of reactive terphenyls in PSA displays.

The specific use of reactive, halogen-substituted terphenyls according to the invention in PSA displays for rapid setting of a tilt angle by in-situ polymerisation in an electrical field has thus neither been described in nor is it obvious from the prior art.

In addition, it has been found, entirely surprisingly, that polymerisable compounds according to the invention containing a mesogenic terphenyl group which is at least monosubstituted by halogen exhibit, on use in PSA displays, significantly faster tilt angle generation and faster and more complete polymerisation than structurally analogous polymerisable compounds containing an unsubstituted mesogenic terphenyl group. This has been confirmed by direct comparative experiments. This result was neither described in nor was it obvious from the prior art.

The invention thus relates to the use of polymerisable compounds containing a terphenyl group which is at least monosubstituted by a halogen atom, preferably by F or Cl, and one or more, preferably two or more than two, polymerisable groups, where at least one of these polymerisable groups is connected to the terphenyl group via a spacer group and at least one of these polymerisable groups is connected to the terphenyl group directly, i.e. not via a spacer group (also referred to as "polymerisable compounds according to the invention" below), in liquid-crystal (LC) media and LC displays of the PS or PSA (polymer sustained alignment) type.

The invention furthermore relates to an LC medium comprising one or more polymerisable compounds according to the invention and one or more additional compounds, which may also be mesogenic, liquid-crystal-line and/or polymerisable.

The invention furthermore relates to an LC medium comprising a polymer obtainable by polymerisation of one or more polymerisable compounds according to the invention and one or more additional compounds, which may also be mesogenic, liquid-crystalline and/or polymerisable.

The invention furthermore relates to an LC medium comprising
 a polymerisable component A) comprising one or more polymerisable compounds according to the invention, and
 a liquid-crystalline component B), also referred to below as "LC host mixture", comprising one or more, preferably two or more, low-molecular-weight (monomeric and unpolymerisable) compounds as described above and below.

The invention furthermore relates to a process for the preparation of an LC medium as described above and below in which one or more low-molecular-weight liquid-crystalline compounds, or an LC host mixture as described above and below, are mixed with one or more polymerisable compounds according to the invention and optionally with further liquid-crystalline compounds and/or additives.

The invention furthermore relates to the use of polymerisable compounds according to the invention and LC media according to the invention in PS and PSA displays, in particular the use in PS and PSA displays containing an LC medium, for the production of a tilt angle in the LC medium by in-situ polymerisation of the polymerisable compounds according to the invention in the PSA display, preferably with application of an electric or magnetic field.

The invention furthermore relates to an LC display containing one or more polymerisable compounds according to the invention or an LC medium according to the invention, in particular a PS or PSA display, particularly preferably a PSA-VA, PSA-OCB, PSA-IPS, PSA-FFS, PSA-positive-VA or PSA-TN display.

The invention furthermore relates to an LC display of the PS or PSA type containing an LC cell having two substrates and two electrodes, where at least one substrate is transparent to light and at least one substrate has one or two electrodes, and a layer, located between the substrates, of an LC medium comprising a polymerised component and a low-molecular-weight component, where the polymerised component is obtainable by polymerisation of one or more polymerisable compounds between the substrates of the LC cell in the LC medium, preferably with application of an electrical voltage to the electrodes, where at least one of the polymerisable compounds is selected from polymerisable compounds according to the invention.

The invention furthermore relates to a process for the production of an LC display as described above and below in which an LC medium comprising one or more low-molecular-weight liquid-crystalline compounds or an LC host mixture as described above and below and one or more polymerisable compounds according to the invention is introduced into an LC cell having two substrates and two electrodes as described above and below, and the polymerisable compounds are polymerised, preferably with application of an electrical voltage to the electrodes.

The PS and PSA displays according to the invention have two electrodes, preferably in the form of transparent layers, which are applied to one or both of the substrates which form the LC cell. Either in each case one electrode is applied to each of the two substrates, as, for example, in PSA-VA, PSA-OCB or PSA-TN displays according to the invention, or both electrodes are applied to only one of the two substrates, while the other substrate has no electrode, as, for example, in PSA-positive-VA, PSA-IPS or PSA-FFS displays according to the invention.

The invention furthermore relates to novel polymerisable compounds according to the invention, to processes for the preparation thereof, and to novel intermediates used or obtained in these processes.

The following meanings apply above and below:

The terms "tilt" and "tilt angle" relate to a tilted alignment of the LC molecules of an LC medium relative to the surfaces of the cell in an LC display (here preferably a PS or PSA display). The tilt angle here denotes the average angle (<90°) between the longitudinal molecular axes of the LC molecules (LC director) and the surface of the plane-parallel outer plates which form the LC cell. A low value for the tilt angle (i.e. a large deviation from the 90° angle) corresponds to a large tilt here. A suitable method for measurement of the tilt angle is given in the examples. Unless indicated otherwise, tilt angle values disclosed above and below relate to this measurement method.

The term "mesogenic group" is known to the person skilled in the art and is described in the literature, and denotes a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in Pure Appl. Chem. 73(5), 888 (2001) and C. Tschierske, G. Pelzl, S. Diele, Angew. Chem. 2004, 116, 6340-6368.

The term "spacer group", also referred to as "Sp" above and below, is known to the person skilled in the art and is described in the literature, see, for example, Pure Appl. Chem. 73(5), 888 (2001) and C. Tschierske, G. Pelzl, S. Diele, Angew. Chem. 2004, 116, 6340-6368. Unless indicated otherwise, the term "spacer group" or "spacer" above and below denotes a flexible group which connects the mesogenic group and the polymerisable group(s) to one another in a polymerisable mesogenic compound.

The term "reactive mesogen" or "RM" denotes a compound containing one mesogenic group and one or more functional groups which are suitable for polymerisation (also referred to as polymerisable group or group P).

The terms "low-molecular-weight compound" and "unpolymerisable compound" denote compounds, usually monomeric, which contain no functional group which is suitable for polymerisation under the usual conditions known to the person skilled in the art, in particular under the conditions used for the polymerisation of RMs.

"Halogen" denotes F, Cl, Br or I.

Particularly preferred polymerisable compounds according to the invention are those of the formula I

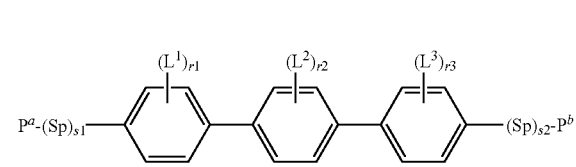

I in which the individual radicals have the following meanings:
$P^a$, $P^b$ each, independently of one another, denote a polymerisable group,
Sp on each occurrence, identically or differently, denotes a leaving group,
$L^1$, $L^2$, $L^3$ each, independently of one another, denote F or Cl, one or more of the radicals $L^1$, $L^2$ and $L^3$ also denotes fully or partially fluorinated alkyl or alkoxy having 1, 2 or 3 C atoms, $P^a$ or $P^a$-Sp-, where at least one of the radicals $L^1$, $L^2$ and $L^3$ denotes F or Cl, preferably F,
r1, r2, r3 each, independently of one another, denote 0, 1, 2, 3 or 4 where r1+r2+r3≥1,
s1, s2 each, independently of one another, denote 0 or 1.

The polymerisable group $P^{a,b}$ is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups $P^{a,b}$ are selected from the group consisting of $CH_2$=$CW^1$—CO—O—, $CH_2$=$CW^1$—CO—,

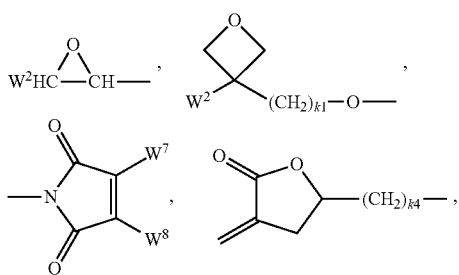

$CH_2=CW^2-(O)_{k3}-$, $CW^1=CH-CO-(O)_{k3}-$, $CW^1=CH-CO-NH-$, $CH_2=CW^1-CO-NH-$, $CH_3-CH=CH-O-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $HO-CW^2W^3-$, $HS-CW^2W^3-$, $HW^2N-$, $HO-CW^2W^3-NH-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH-, HOOC—, OCN— and $W^4W^5W^6Si-$, in which $W^1$ denotes H, F, Cl, CN, CF$_3$, phenyl or alkyl having 1 to 5 C atoms, in particular H, F, Cl or CH$_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp-, $k_1$, $k_2$ and $k_3$ each, independently of one another, denote 0 or 1, $k_3$ preferably denotes 1, and $k_4$ denotes an integer from 1 to 10.

Particularly preferred groups $P^{a,b}$ are selected from the group consisting of $CH_2=CW^1-CO-O-$, $CH_2=CW^1-CO-$,

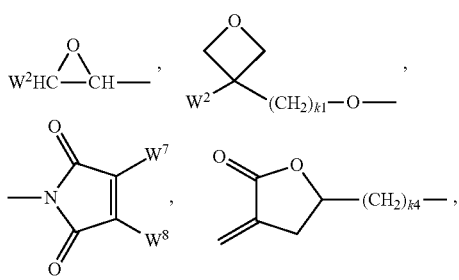

$CH_2=CW^2-O-$, $CW^1=CH-CO-(O)_{k3}-$, $CW^1=CH-CO-NH-$, $CH_2=CW^1-CO-NH-$, $(CH_2=CH)_2CH-OCO-$, $(CH_2=CH-CH_2)_2CH-OCO-$, $(CH_2=CH)_2CH-O-$, $(CH_2=CH-CH_2)_2N-$, $(CH_2=CH-CH_2)_2N-CO-$, $CH_2=CW^1-CO-NH-$, $CH_2=CH-(COO)_{k1}$-Phe-$(O)_{k2}-$, $CH_2=CH-(CO)_{k1}$-Phe-$(O)_{k2}-$, Phe-CH=CH— and $W^4W^5W^6Si-$, in which $W^1$ denotes H, F, Cl, CN, CF$_3$, phenyl or alkyl having 1 to 5 C atoms, in particular H, F, Cl or CH$_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups $P^{a,b}$ are selected from the group consisting of $CH_2=CW^1-CO-O-$, in particular $CH_2=CH-CO-O-$, $CH_2=C(CH_3)-CO-O-$ and $CH_2=CF-CO-O-$, furthermore $CH_2=CH-O-$, $(CH_2=CH)_2CH-O-CO-$, $(CH_2=CH)_2CH-O-$,

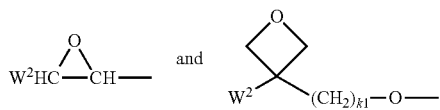

Further very particularly preferred groups $P^{a,b}$ are selected from the group consisting of vinyloxy, acrylate, methacrylate, fluoroacrylate, chloroacrylate, oxetane and epoxide groups, and particularly preferably denote an acrylate or methacrylate group.

Preferred spacer groups Sp are selected from the formula Sp"-X", so that the radical "$P^{a/b}$-Sp-" conforms to the formula "$P^{a/b}$-Sp"-X"-", where Sp" denotes alkylene having 1 to 20, preferably 1 to 12, C atoms, which is optionally mono- or polysubstituted by F, Cl, Br, I or CN and in which, in addition, one or more non-adjacent CH$_2$ groups may each be replaced, independently of one another, by —O—, —S—, —NH—, —N(R$^0$)—, —Si(R$^{00}$R$^{000}$)—, —CO—, —CO—O—, —O—CO—, —O—CO—O—, —S—CO—, —CO—S—, —N(R$^{00}$)—CO—O—, —O—CO—N(R$^{00}$)—, —N(R$^{00}$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^{00}$)—, —N(R$^{00}$)—CO—, —N(R$^{00}$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^{00}$ and R$^{000}$ each, independently of one another, denote H or alkyl having 1 to 12 C atoms, and Y$^2$ and Y$^3$ each, independently of one another, denote H, F, Cl or CN.

X' is preferably —O—, —S—, —CO—, —COO—, —OCO—, —O—COO—, —CO—NR$^0$—, —NR$^0$—CO—, —NR$^0$—CO—NR$^0$— or a single bond.

Typical spacer groups Sp" are, for example, —(CH$_2$)$_{p1}$—, —(CH$_2$CH$_2$O)$_{q1}$—CH$_2$CH$_2$—, —CH$_2$CH$_2$—S—CH$_2$CH$_2$—, —CH$_2$CH$_2$—NH—CH$_2$CH$_2$— or —(SiR$^{00}$R$^{000}$—O)$_{p1}$—, in which p1 is an integer from 1 to 12, q1 is an integer from 1 to 3, and R$^{00}$ and R$^{000}$ have the meanings indicated above.

Particularly preferred groups -Sp"—X"— are —(CH$_2$)$_{p1}$—, —(CH$_2$)$_{p1}$—O—, —(CH$_2$)$_{p1}$—O—CO—, —(CH$_2$)$_{p1}$—O—CO—O—, in which p1 and q1 have the meanings indicated above.

Particularly preferred groups Sp" are, for example, in each case straight-chain ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methyliminoethylene, 1-methylalkylene, ethenylene, propenylene and butenylene.

In a further preferred embodiment of the invention, $P^a$ and/or $P^b$ in formula I denote a radical containing two or more polymerisable groups (multifunctional polymerisable radicals). Suitable radicals of this type and polymerisable compounds containing them and the preparation thereof are described, for example, in U.S. Pat. No. 7,060,200 B1 or US 2006/0172090 A1. Particular preference is given to multifunctional polymerisable radicals selected from the following formulae:

| | |
|---|---|
| —X-alkyl-CHP$^1$—CH$_2$—CH$_2$P$^2$ | I*a |
| —X-alkyl-C(CH$_2$P$^1$)(CH$_2$P$^2$)—CH$_2$P$^3$ | I*b |
| —X-alkyl-CHP$^1$CHP$^2$—CH$_2$P$^3$ | I*c |
| —X-alkyl-C(CH$_2$P$^1$)(CH$_2$P$^2$)—C$_{aa}$H$_{2aa+1}$ | I*d |
| —X-alkyl-CHP$^1$—CH$_2$P$^2$ | I*e |
| —X-alkyl-CHP$^1$P$^2$ | I*f |
| —X-alkyl-CP$^1$P$^2$—C$_{aa}$H$_{2aa+1}$ | I*g |
| —X-alkyl-C(CH$_2$P$^1$)(CH$_2$P$^2$)—CH$_2$OCH$_2$—C(CH$_2$P$^3$)(CH$_2$P$^4$)CH$_2$P$^5$ | I*h |
| —X-alkyl-CH((CH$_2$)$_{aa}$P$^1$)((CH$_2$)$_{bb}$P$^2$) | I*i |
| —X-alkyl-CHP$^1$CHP$^2$—C$_{aa}$H$_{2aa+1}$ | I*k |
| —X'-alkyl-C(CH$_3$)(CH$_2$P$^1$)(CH$_2$P$^2$) | I*m | in which
alkyl denotes a single bond or straight-chain or branched alkylene having 1 to 12 C atoms, in which one or more non-adjacent CH$_2$ groups may each be replaced, independently of one another, by —C(R$^{00}$)=C(R$^{000}$)—, —C≡C—, —N(R$^{00}$)—, —O—, —S—, —CO—, —CO—O—, —O—CO—, —O—CO—O— in such a way that O and/or S atoms are not linked directly to one another and in which, in addition, one or more H atoms may be replaced by F, Cl or CN, where R$^{00}$ and R$^{000}$ have the meanings indicated above,
aa and bb each, independently of one another, denote 0, 1, 2, 3, 4, 5 or 6,
X has one of the meanings indicated for X', and
P$^{1-5}$ each, independently of one another, have one of the meanings indicated for P$^a$.
In the formulae described above and below,

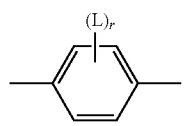

preferably denotes

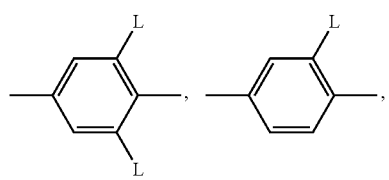

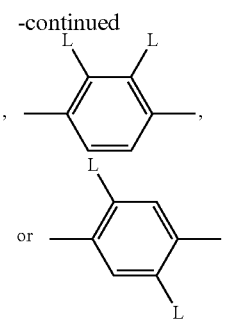

in which L on each occurrence, identically or differently, has one of the meanings indicated above and below, and preferably denotes F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, particularly preferably F, Cl, CN, CH$_3$, C$_2$H$_5$, OCH$_3$, COCH$_3$, OCF$_3$ or P-Sp-, very particularly preferably F, Cl, CH$_3$, OCH$_3$, COCH$_3$ or OCF$_3$.

Particularly preferred compounds of the formula I and sub-formulae thereof indicated above and below are those in which $L^1$, $L^2$ and $L^3$ are other than $P^a$-(Sp)$_{s1}$- and $P^b$-(Sp)$_{s2}$-, one or more, preferably all, of the radicals $L^1$, $L^2$ and $L^3$ denote F and/or Cl, particularly preferably F, the sum r1+r2+r3 is 1, 2, 3 or 4, one or two of r1, r2 and r3 denote 0, r2 denotes 1 or 2, r1 and/or r3 denotes 1, s1 and s2 each denote 0, s1 and s2 each denote 1, s11 and s2 denote 0 or s1 denotes 0 and s2 denotes 1, one of the indices s1 and s2 denotes 0 and the other of the indices s1 and s2 denotes 1.

Very particularly preferred compounds of the formula I are selected from the group consisting of the following sub-formulae:

I1

![I1 structure with P$^a$-(Sp)$_{s1}$ and P$^b$, with F substituent]

I2

![I2 structure with P$^a$-(Sp)$_{s1}$ and P$^b$, with two F substituents]

I3

![I3 structure with P$^a$-(Sp)$_{s1}$ and P$^b$, with F substituent]

-continued

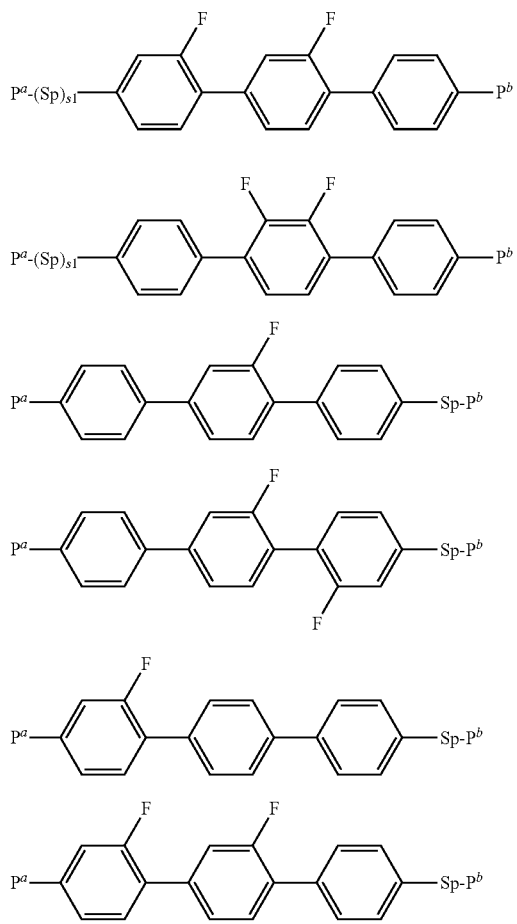

in which P$^a$, P$^b$, Sp and s1 have one of the meanings indicated above and below, and s1 is preferably 1.

P$^a$ and P$^b$ in the compounds of the formula I and sub-formulae thereof preferably denote acrylate or methacrylate, furthermore fluoroacrylate.

Sp in the compounds of the formula I and sub-formulae thereof preferably denotes —(CH$_2$)$_{p1}$—, —(CH$_2$)$_{p1}$—O—, —(CH$_2$)$_{p1}$—O—CO— or —(CH$_2$)$_{p1}$—O—CO—O—, in which p1 denotes an integer from 1 to 12, preferably 1 to 6, particularly preferably 1, 2 or 3, where these groups are linked to P$^a$ or P$^b$ in such a way that O atoms are not directly adjacent.

The invention furthermore relates to novel compounds of the formula I and sub-formulae thereof, as defined above and below, in which s1 and s2 do not simultaneously denote 1.

The invention furthermore relates to novel intermediates for the preparation of compounds of the formula I, selected from formula II

II

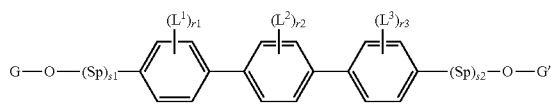

in which Sp, L$^1$, L$^2$, L$^3$, r1, r2, r3, s1 and s2 have the meanings indicated in formula I or above and below, where s1 and s2 do not both simultaneously denote 1, and G and G' each, independently of one another, denote an H atom or a protecting group.

Suitable protecting groups G are known to the person skilled in the art. Preferred protecting groups are alkyl, acyl and alkylsilyl or arylsilyl groups, 2-tetrahydropyranyl or methoxymethyl.

Particularly preferred intermediates of the formula II are selected from the group consisting of the above-mentioned sub-formulae I1-I9 in which P$^a$ in each case denotes G-O— and P$^b$ in each case denotes —O-G', where G and G' preferably denote H.

In a further preferred embodiment of the invention, the spacer groups in the polymerisable compounds according to the invention do not contain a C—C triple bond (—C≡C—), or Sp in formula I and formula II and sub-formulae thereof, and Sp" as described above, do not contain a C—C triple bond (—C≡C—).

Particularly suitable and preferred processes for the preparation of compounds and intermediates of the formulae I and II and sub-formulae thereof are depicted by way of example in the following schemes and preferably comprise one or more of the steps described below.

The compounds and intermediates of the formulae I and II and sub-formulae thereof can be prepared analogously to processes known to the person skilled in the art and described in standard works of organic chemistry, such as, for example, in Houben-Weyl, Methoden der organischen Chemie [Methods of Organic Chemistry], Thieme-Verlag, Stuttgart.

For example, compounds of the formula I are synthesised by esterification or etherification of the intermediates of the formula II using corresponding acids, acid derivatives, or halogenated compounds containing a group P. As depicted by way of example in Scheme 1 (in which R denotes H or CH$_3$), compounds of the formula I in which P$^a$ and P$^b$ denote an acrylate or methacrylate group can be obtained by esterification of the corresponding alcohols of the formula II in which G=G'=H using acid derivatives, such as, for example, (meth)acryloyl chloride or (meth)acrylic anhydride, in the presence of a base and optionally 4-(N,N-dimethylamino)pyridine (DMAP). Furthermore, the alcohols can also be esterified using (meth)acrylic acid in the presence of a dehydrating agent, for example by the Steglich method using dicyclohexylcarbodiimide (DCC).

Scheme 1

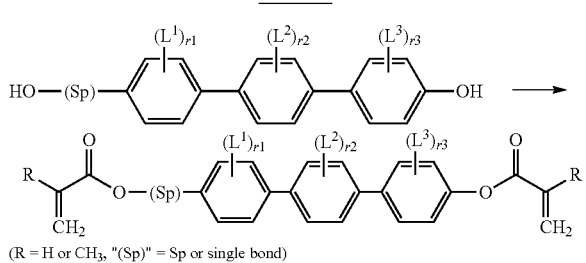

(R = H or CH$_3$, "(Sp)" = Sp or single bond)

The intermediates of the formula II are synthesised, for example, by transition metal-catalysed cross-coupling (see Scheme 2) of aryl halides (Hal=Cl, Br, I, OTf) to arylmetal compounds, for example by Suzuki coupling (M=B(OH)$_2$, B(OR)$_2$), Negishi coupling (M=ZnHal) or Kumada coupling (M=MgHal).

Scheme 2

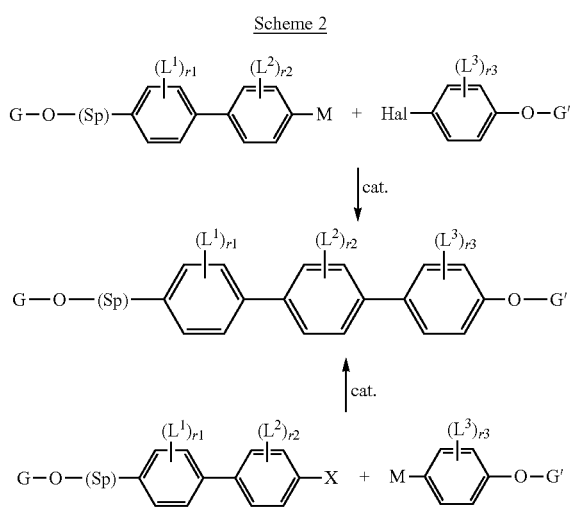

The arylmetal compounds are themselves accessible from aryl halides, either directly by reaction with magnesium to give Grignard compounds or by halogen-lithium exchange using butyllithium and subsequent trans-metallation using zinc salts or magnesium salts. Reaction of the lithium compound with trialkyl borates gives boronic acid esters, from which the free boronic acids can be obtained by hydrolysis.

The biphenyl synthesis building blocks depicted Scheme 2 can be prepared analogously thereto (see Scheme 3) by reacting dihaloaromatic compounds with arylmetal compounds in a cross-coupling reaction. The substituents Hal and Hal' may be identical or different here.

Scheme 3

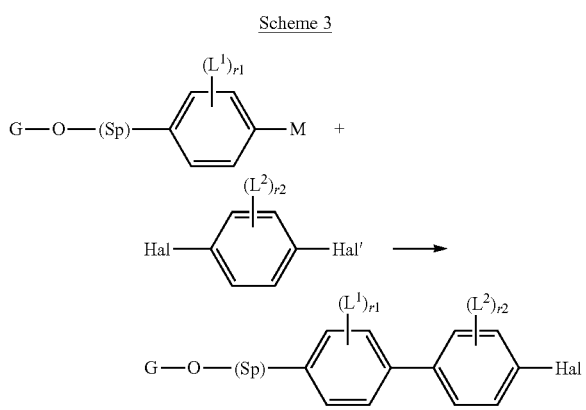

For the production of PSA displays, the polymerisable compounds are polymerised or crosslinked (if one compound contains two or more polymerisable groups) by in-situ polymerisation in the LC medium between the substrates of the LC display with application of a voltage. The polymerisation can be carried out in one step. It is also possible firstly to carry out the polymerisation with application of a voltage in a first step in order to produce a pretilt angle, and subsequently, in a second polymerisation step without an applied voltage, to polymerise or crosslink the compounds which have not reacted in the first step ("end curing").

Suitable and preferred polymerisation methods are, for example, thermal or photopolymerisation, preferably photopolymerisation, in particular UV photopolymerisation. One or more initiators can optionally also be added here. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure369® or Darocure1173® (Ciba AG). If an initiator is employed, its proportion is preferably 0.001 to 5% by weight, particularly preferably 0.001 to 1% by weight.

The polymerisable compounds according to the invention are also suitable for polymerisation without an initiator, which is accompanied by considerable advantages, such, for example, lower material costs and in particular less contamination of the LC medium by possible residual amounts of the initiator or degradation products thereof. The polymerisation can thus also be carried out without the addition of an initiator. In a preferred embodiment, the LC medium thus comprises no polymerisation initiator.

The polymerisable component A) or the LC medium may also comprise one or more stabilisers in order to prevent undesired spontaneous polymerisation of the RMs, for example during storage or transport. Suitable types and amounts of stabilisers are known to the person skilled in the art and are described in the literature. Particularly suitable are, for example, the commercially available stabilisers from the Irganox® series (Ciba AG), such as, for example, Irganox® 1076. If stabilisers are employed, their proportion, based on the total amount of RMs or the polymerisable component A), is preferably 10-10,000 ppm, particularly preferably 50-500 ppm.

The LC media according to the invention for use in PSA displays preferably comprise <5% by weight, particularly preferably <1% by weight, very particularly preferably <0.5% by weight, of polymerisable compounds, in particular polymerisable compounds of the above-mentioned formula I and sub-formulae thereof.

Particular preference is given to LC media comprising one, two or three polymerisable compounds according to the invention.

Preference is furthermore given to LC media in which the polymerisable component (component A) comprises exclusively polymerisable compounds according to the invention.

Preference is furthermore given to LC media in which component B) is an LC compound or an LC mixture which has a nematic liquid-crystal phase.

Preference is furthermore given to achiral polymerisable compounds according to the invention and LC media in which the compounds of component A) and/or B) are selected exclusively from the group consisting of achiral compounds.

Preference is furthermore given to LC media in which the polymerisable component or component A) comprises one or more polymerisable compounds according to the invention containing one polymerisable group (monoreactive) and one or more polymerisable compounds according to the invention containing two or more, preferably two, polymerisable groups (di- or multireactive).

Preference is furthermore given to PSA displays and LC media in which the polymerisable component or component A) comprises exclusively polymerisable compounds according to the invention containing two polymerisable groups (direactive).

The proportion of the polymerisable component or component A) in the LC media according to the invention is preferably <5%, particularly preferably <1%, very particularly preferably <0.5%.

The proportion of the liquid-crystalline component or component B) in the LC media according to the invention is preferably >95%, particularly preferably >99%.

The polymerisable compounds according to the invention can be polymerised individually, but it is also possible to polymerise mixtures which comprise two or more polymerisable compounds according to the invention, or mixtures comprising one or more polymerisable compounds according to the invention and one or more further polymerisable compounds (comonomers), which are preferably mesogenic or liquid-crystal-line. In the case of polymerisation of such mixtures, copolymers form. The invention furthermore relates to the polymerisable mixtures mentioned above and below. The polymerisable compounds and comonomers are mesogenic or non-mesogenic, preferably mesogenic or liquid-crystal-line.

Suitable and preferred mesogenic comonomers, particularly for use in PSA displays, are selected, for example, from the following formulae:

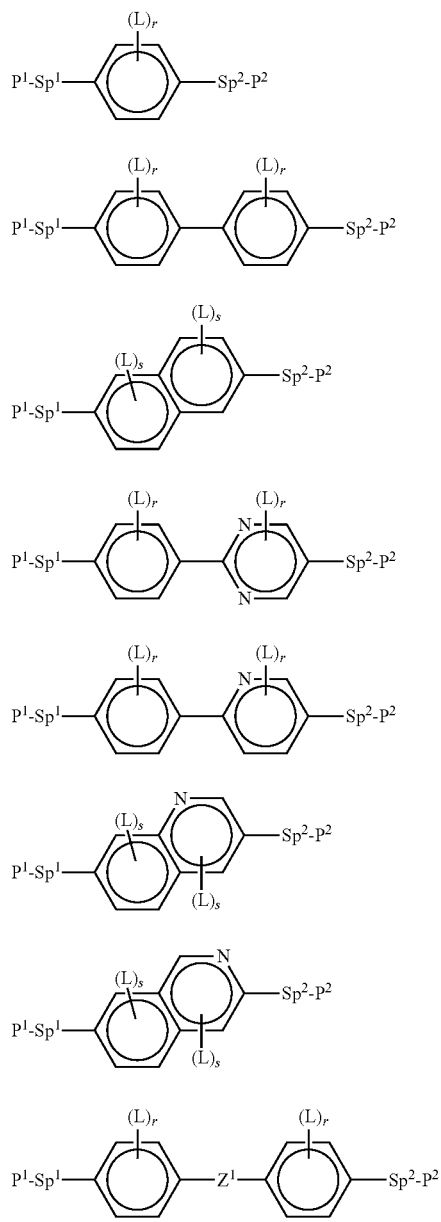

-continued

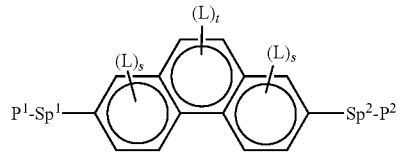
M9

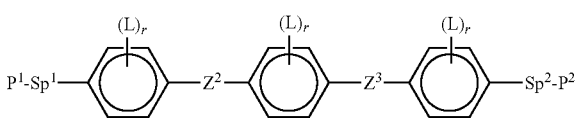
M10

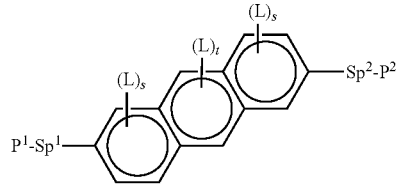
M11

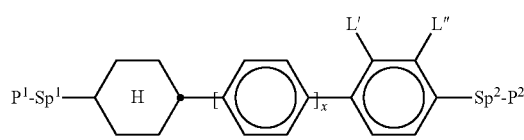
M12

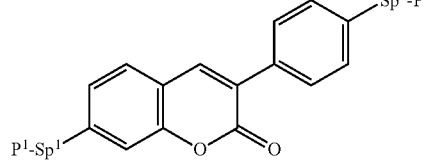
M13

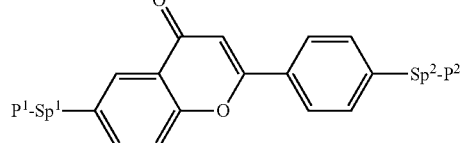
M14

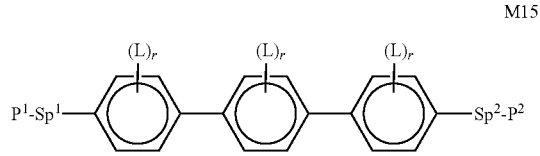
M15

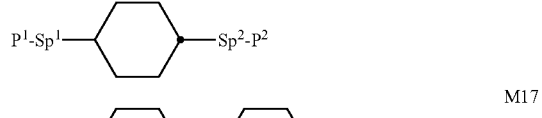
M16

M17

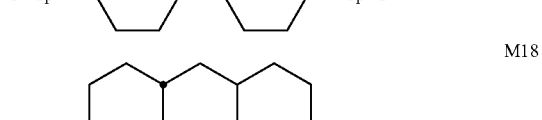
M18

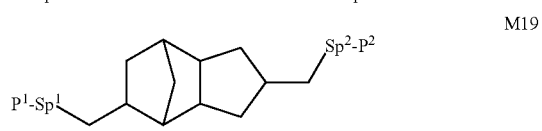
M19

-continued

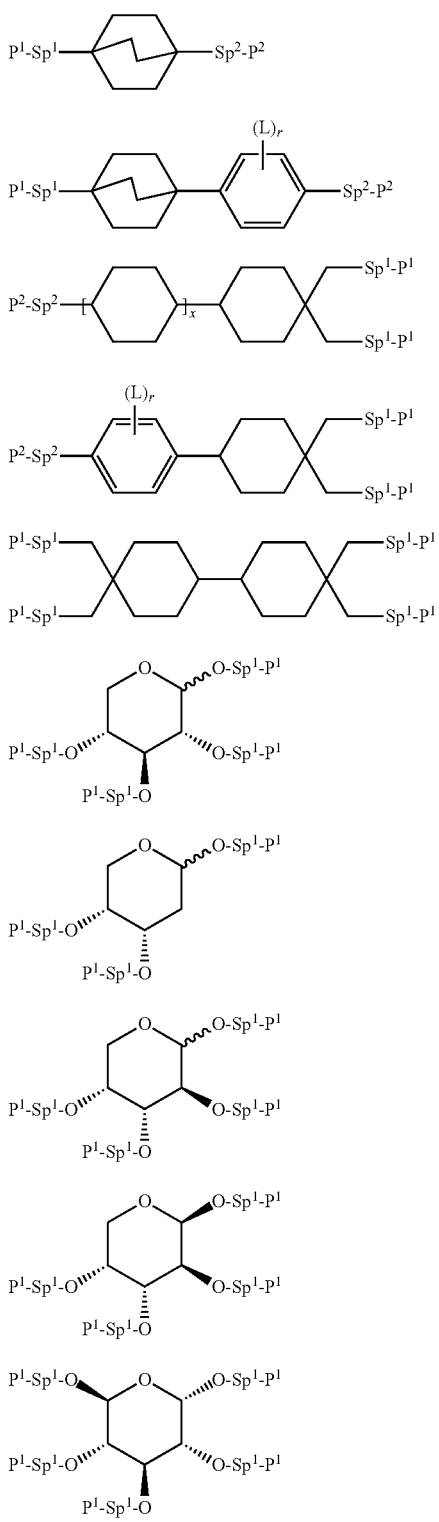

in which the individual radicals have the following meanings:

$P^1$ and $P^2$ each, independently of one another, denote a polymerisable group, preferably having one of the meanings indicated above and below for P, particularly preferably an acrylate, methacrylate, fluoroacrylate, oxetane, vinyloxy or epoxide group, $Sp^1$ and $Sp^2$ each, independently of one another, denote a single bond or a spacer group, preferably having one of the meanings indicated above and below for Sp, and particularly preferably denote $-(CH_2)_{p1}-$, $-(CH_2)_{p1}-O-$, $-(CH_2)_{p1}-CO-O-$ or $-(CH_2)_{p1}-O-CO-O-$, in which p1 is an integer from 1 to 12, and where the linking to the adjacent ring in the last-mentioned groups takes place via the O atom, where, in addition, one or more of the radicals $P^1$-$Sp^1$- and $P^2$-$Sp^2$- may denote $R^{aa}$, with the proviso that at least one of the radicals $P^1$-$Sp^1$- and $P^2$-$Sp^2$- present does not denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by $C(R^0)=C(R^{00})-$, $-C\equiv C-$, $-N(R^0)-$, $-O-$, $-S-$, $-CO-$, $-CO-O-$, $-O-CO-$, $-O-CO-O-$ in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^0$, $R^{00}$ each, independently of one another and identically or differently on each occurrence, denote H or alkyl having 1 to 12 C atoms, $R^y$ and $R^z$ each, independently of one another, denote H, F, $CH_3$ or $CF_3$, $Z^1$ denotes $-O-$, $-CO-$, $-C(R^yR^z)-$ or $-CF_2CF_2-$, $Z^2$ and $Z^3$ each, independently of one another, denote $-CO-O-$, $-O-CO-$, $-CH_2O-$, $-OCH_2-$, $-CF_2O-$, $-OCF_2-$ or $-(CH_2)_n-$, where n is 2, 3 or 4, L on each occurrence, identically or differently, denotes F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, x denotes 0 or 1.

In the compounds of the formulae M1 to M29,

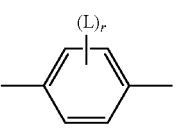

preferably denotes

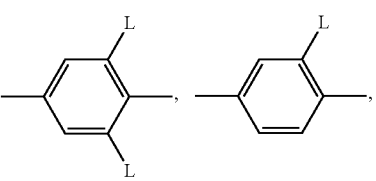

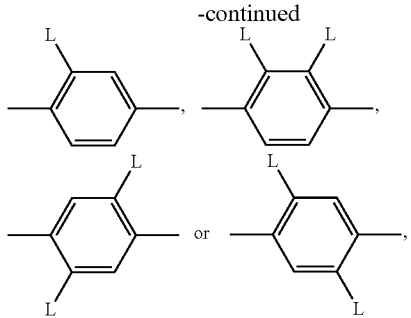

in which L on each occurrence, identically or differently, has one of the meanings indicated above and below, and preferably denotes F, Cl, CN, NO$_2$, CH$_3$, C$_2$H$_5$, C(CH$_3$)$_3$, CH(CH$_3$)$_2$, CH$_2$CH(CH$_3$)C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$ or P-Sp-, particularly preferably F, Cl, CN, CH$_3$, C$_2$H$_5$, OCH$_3$, COCH$_3$, OCF$_3$ or P-Sp-, very particularly preferably F, Cl, CH$_3$, OCH$_3$, COCH$_3$ or OCF$_3$, in particular F or CH$_3$.

Besides the polymerisable compounds described above, the LC media for use in the LC displays according to the invention comprise an LC mixture ("host mixture") comprising one or more, preferably two or more, low-molecular-weight (i.e. monomeric or unpolymerised) compounds. The latter are stable or unreactive to a polymerisation reaction under the conditions used for polymerisation of the polymerisable compounds. In principle, any LC mixture which is suitable for use in conventional VA and OCB displays is suitable as host mixture. Suitable LC mixtures are known to the person skilled in the art and are described in the literature, for example mixtures in VA displays in EP 1 378 557 A1 and mixtures for OCB displays in EP 1 306 418 A1 and DE 102 24 046 A1.

Particularly preferred LC displays, LC host mixtures and LC media are mentioned below:

In a first preferred embodiment, the LC medium comprises an LC host mixture based on compounds having negative dielectric anisotropy. Such LC media are particularly suitable for PSA-VA displays. Particularly preferred embodiments of an LC medium of this type are mentioned in sections a)-x) below:

a) LC medium which comprises one or more compounds of the formulae CY and/or PY:

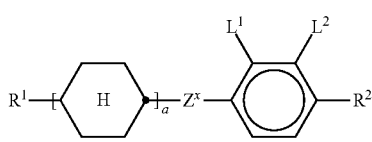

CY

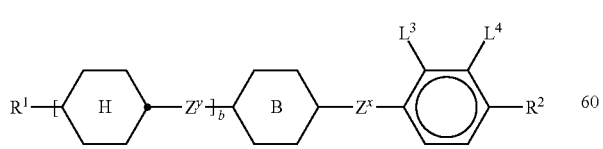

PY in which the individual radicals have the following meanings:
a denotes 1 or 2,
b denotes 0 or 1,

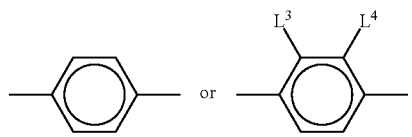

denotes

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, Z$^x$ and Z$^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^{1-4}$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl, or both radicals L$^3$ and L$^4$ denote F or one of the radicals L$^3$ and L$^4$ denotes F and the other denotes Cl.

The compounds of the formula CY are preferably selected from the group consisting of the following sub-formulae:

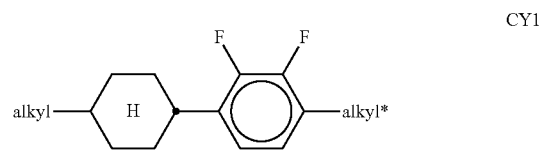

CY1

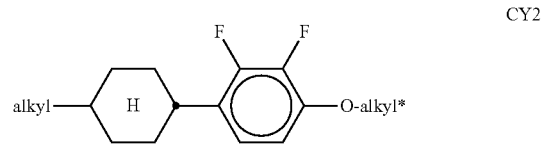

CY2

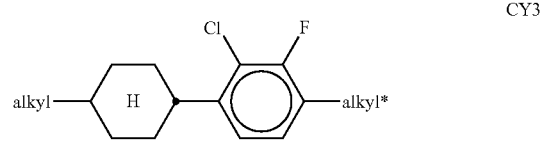

CY3

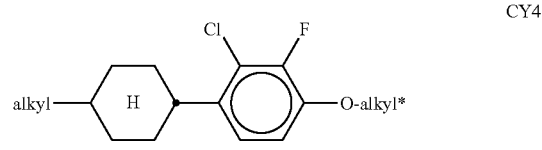

CY4

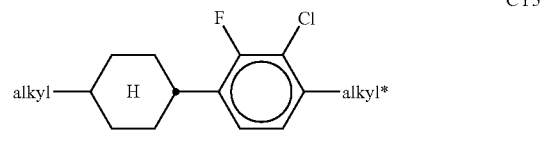

CY5

CY6
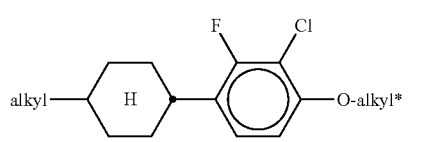
CY7
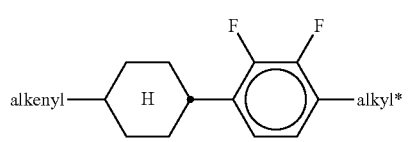
CY8
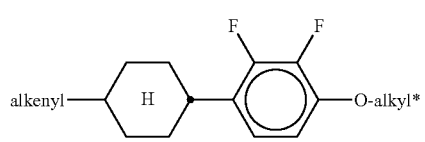
CY9
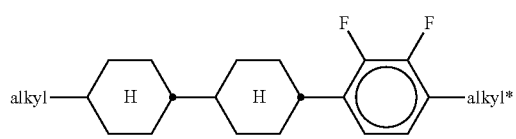
CY10
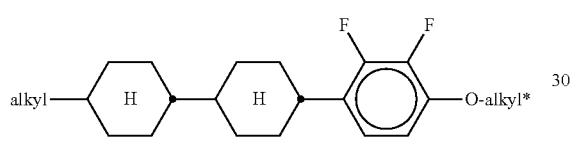
CY11
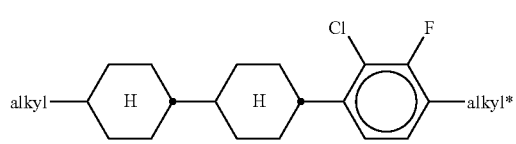
CY12
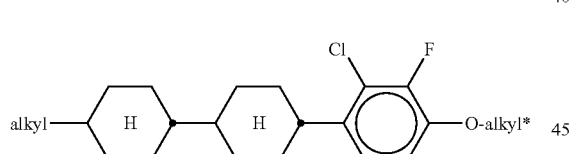
CY13
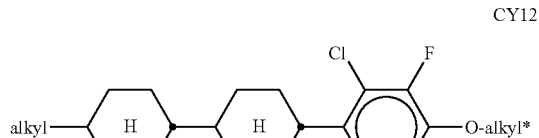
CY14
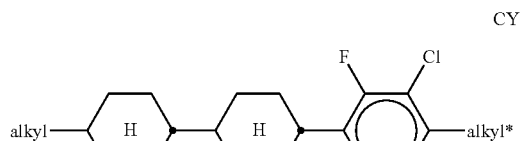
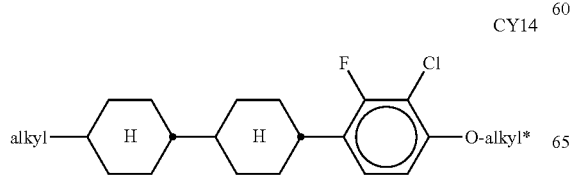
CY15
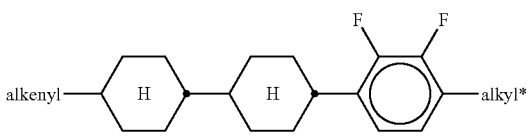
CY16
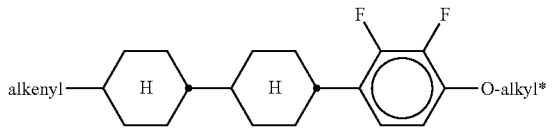
CY17
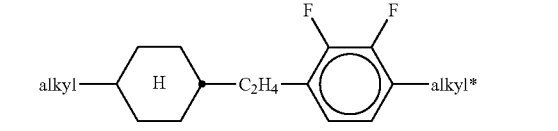
CY18
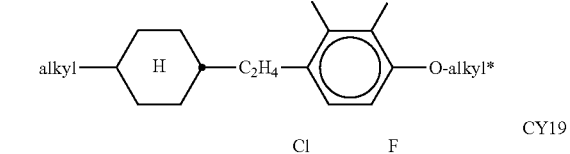
CY19
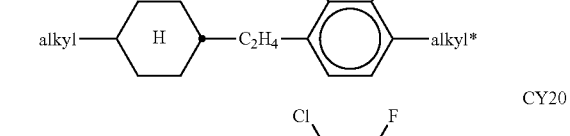
CY20
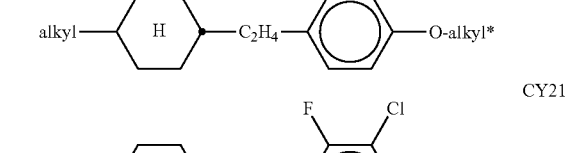
CY21
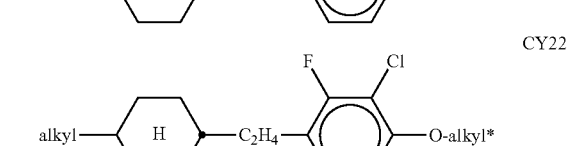
CY22
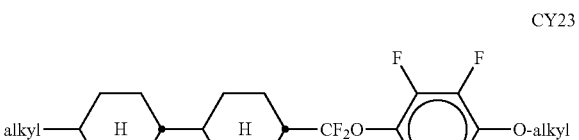
CY23
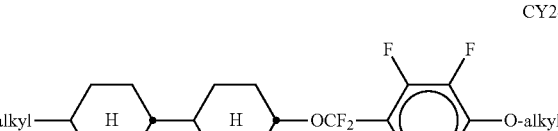
CY24
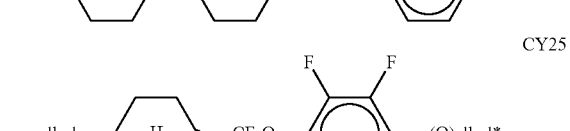
CY25
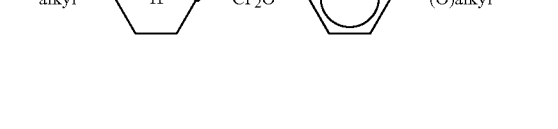

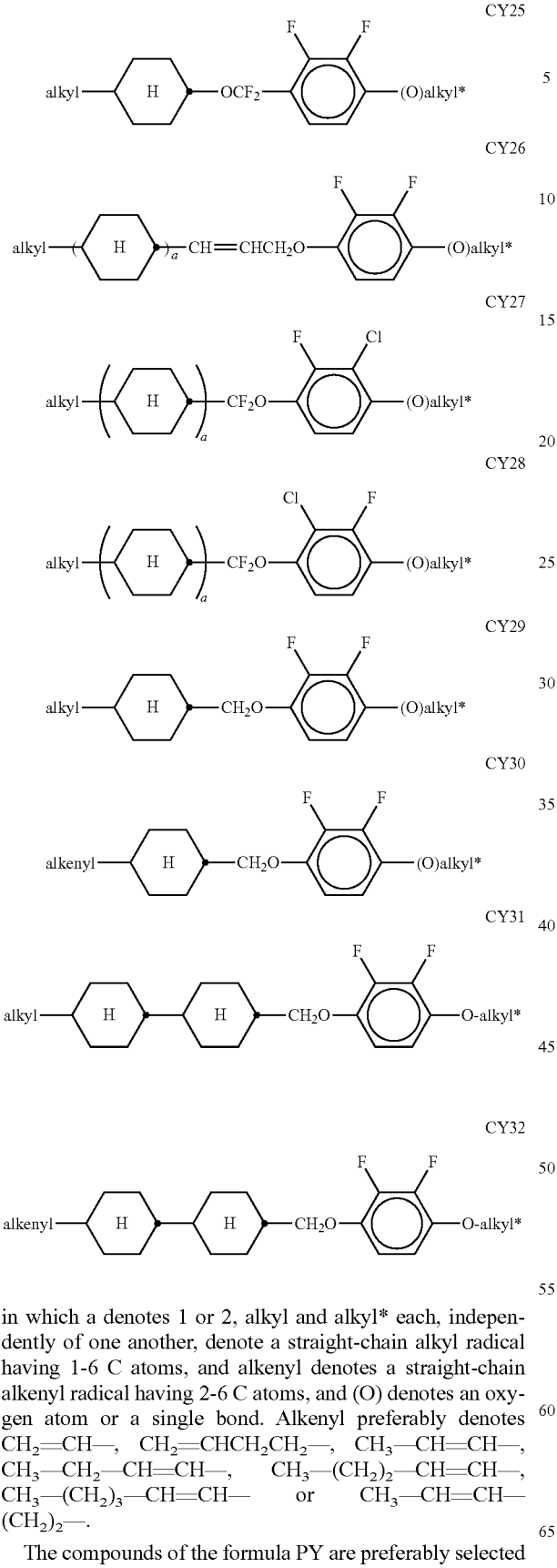
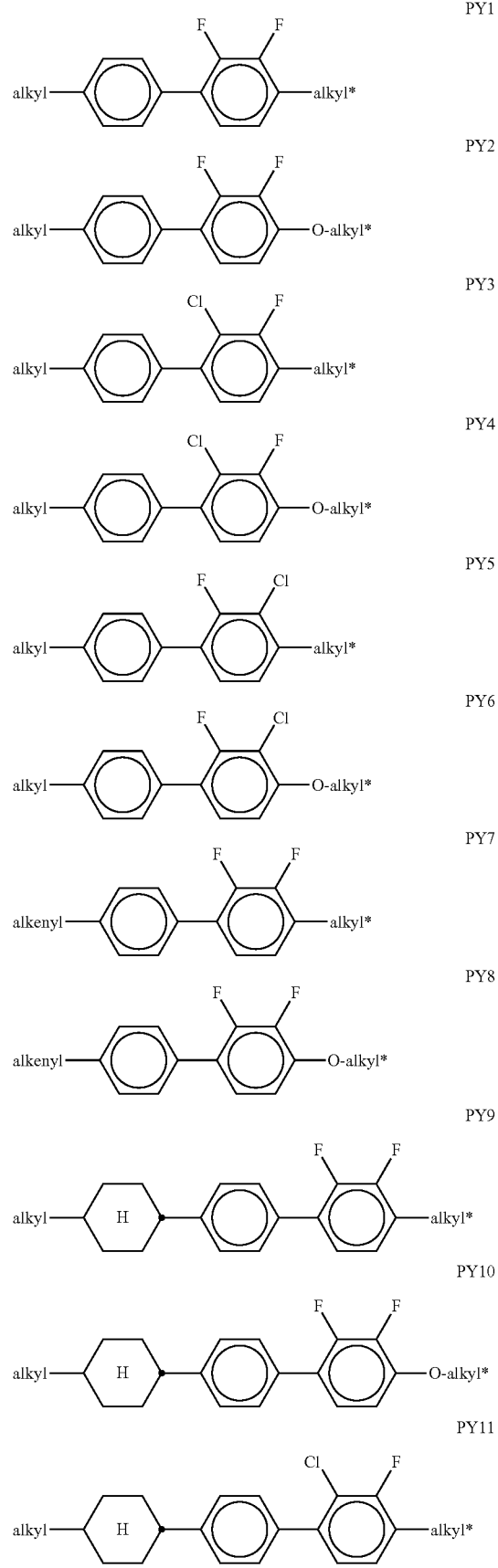

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

The compounds of the formula PY are preferably selected from the group consisting of the following sub-formulae:

-continued

PY12
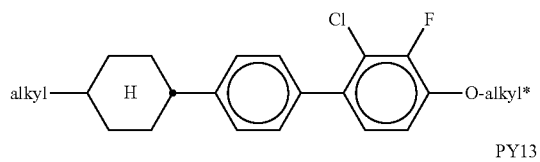

PY13
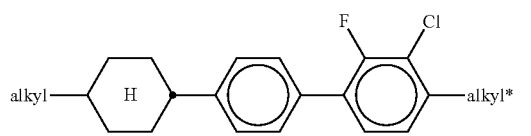

PY14
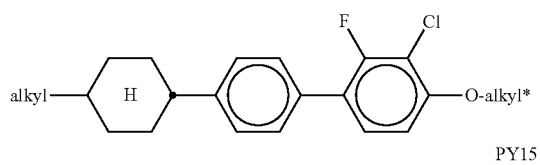

PY15
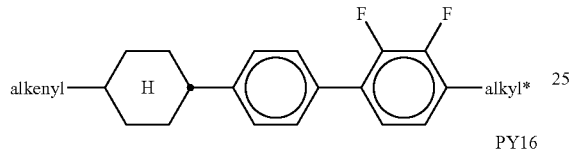

PY16
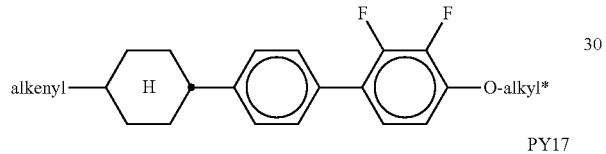

PY17
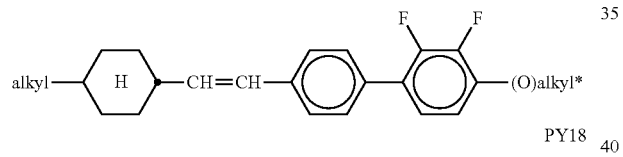

PY18
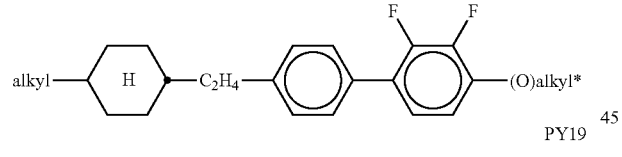

PY19
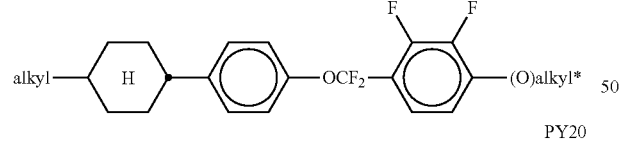

PY20
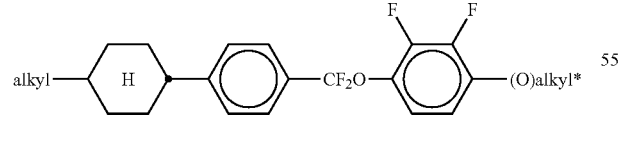

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

b) LC medium which additionally comprises one or more compounds of the following formula:

ZK
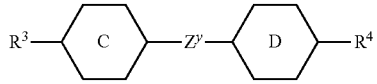

in which the individual radicals have the following meanings:

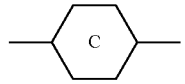

denotes

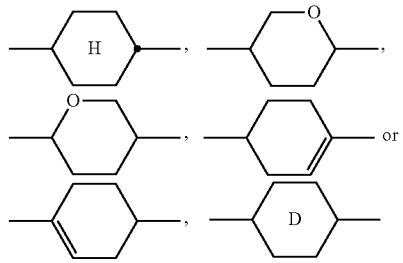

denotes

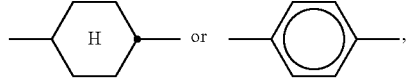

$R^3$ and $R^4$ each, independently of one another, denote alkyl having 1 to 12 C atoms, in which, in addition, one or two non-adjacent $CH_2$ groups may be replaced by —O—, —CH=CH—, —CO—, —O—CO— or —CO—O— in such a way that O atoms are not linked directly to one another, $Z^y$ denotes —$CH_2CH_2$—, —CH=CH—, —$CF_2O$—, —$OCF_2$—, —$CH_2O$—, —$OCH_2$—, —CO—O—, —O—CO—, —$C_2F_4$—, —CF=CF—, —CH=CH—$CH_2O$— or a single bond, preferably a single bond.

The compounds of the formula ZK are preferably selected from the group consisting of the following sub-formulae:

ZK1
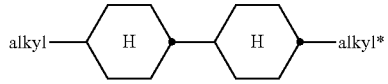

ZK2
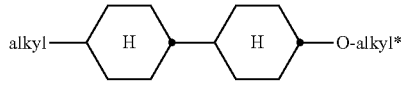

ZK3
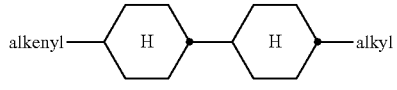

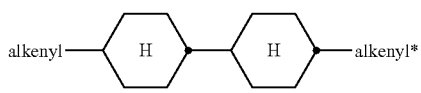

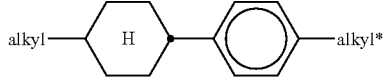

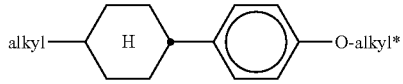

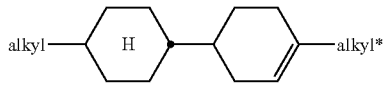

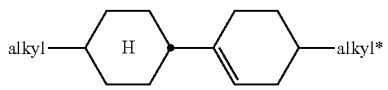

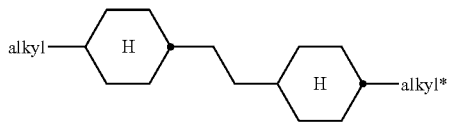

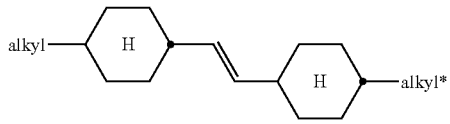

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

c) LC medium which additionally comprises one or more compounds of the following formula:

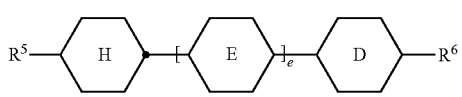

DK in which the individual radicals on each occurrence, identically or differently, have the following meanings:

$R^5$ and $R^6$ each, independently of one another, have one of the meanings indicated above for $R^1$,

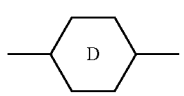

denotes

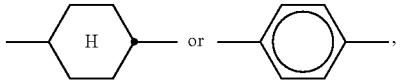 ZK4

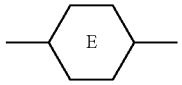 ZK5 denotes

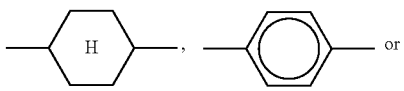 ZK6

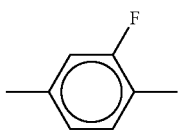 ZK7 and e denotes 1 or 2.

The compounds of the formula DK are preferably selected from the group consisting of the following sub-formulae:

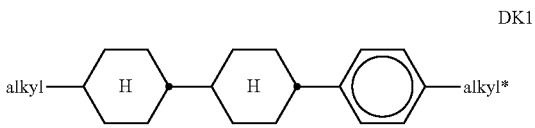

DK1

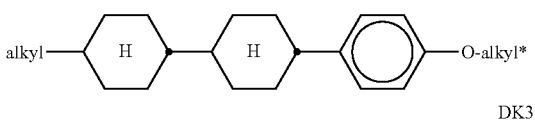

DK2

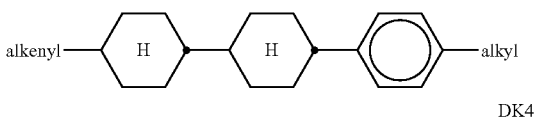

DK3

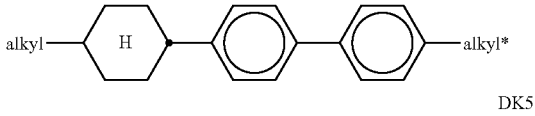

DK4

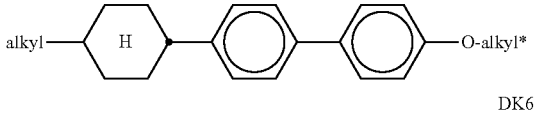

DK5

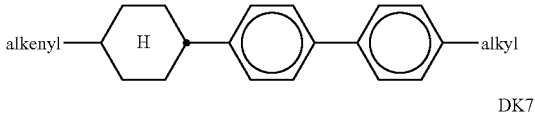

DK6

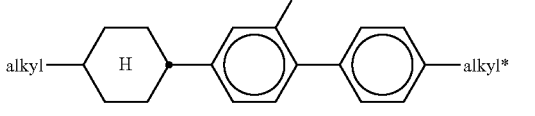

DK7

-continued

DK8
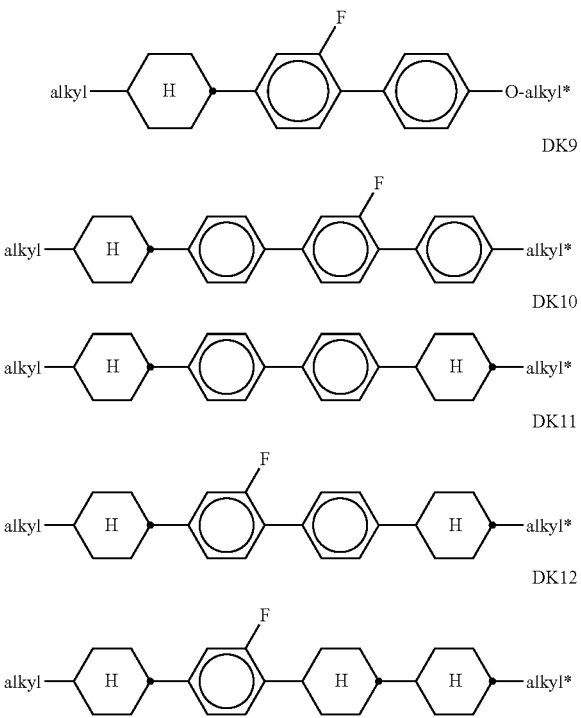
DK9

DK10

DK11

DK12 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

d) LC medium which additionally comprises one or more compounds of the following formula:

LY
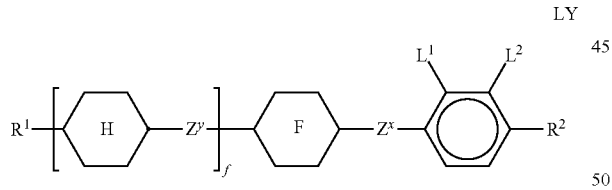

in which the individual radicals have the following meanings:

denotes

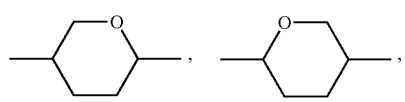

-continued

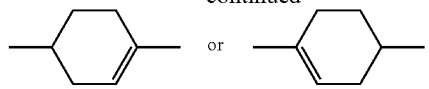

f denotes 0 or 1, $R^1$ and $R^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, $Z^x$ and $Z^y$ each, independently of one another, denote —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, $L^1$ and $L^2$ each, independently of one another, denote F, Cl, OCF$_3$, CF$_3$, CH$_3$, CH$_2$F, CHF$_2$.

Preferably, both radicals $L^1$ and $L^2$ denote F or one of the radicals $L^1$ and $L^2$ denotes F and the other denotes Cl.

The compounds of the formula LY are preferably selected from the group consisting of the following sub-formulae:

LY1
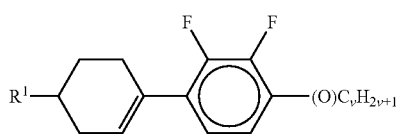

LY2
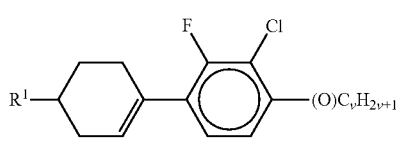

LY3
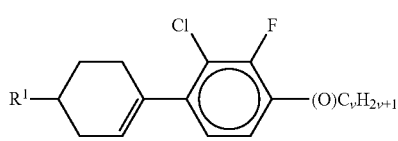

LY4
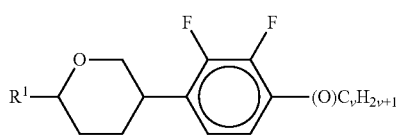

LY5
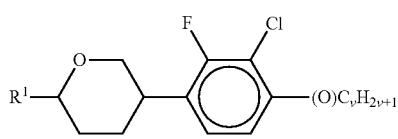

LY6
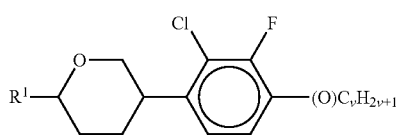

LY7
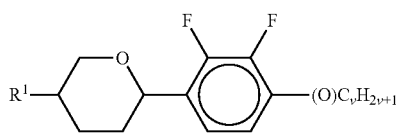

LY8 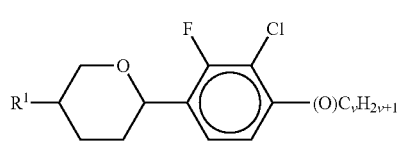
LY9 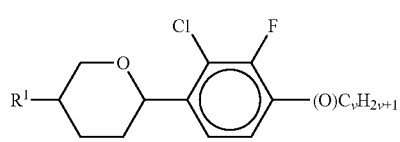
LY10 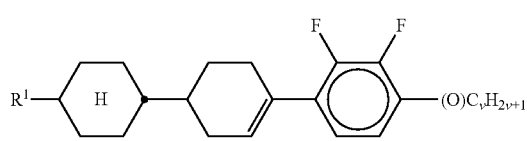
LY11 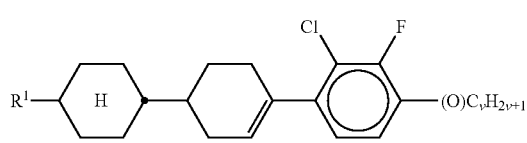
LY12 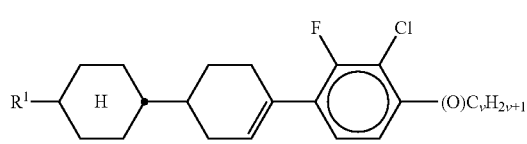
LY13 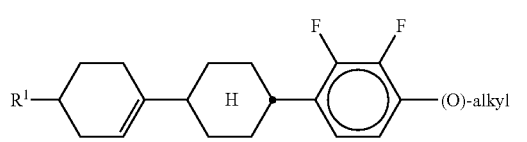
LY14 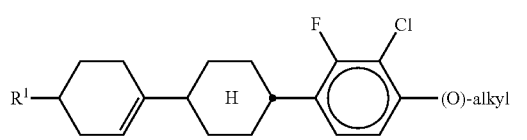
LY15 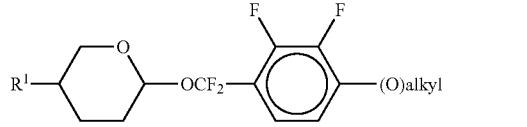
LY16 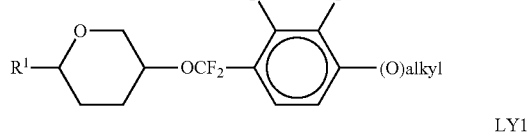
LY17 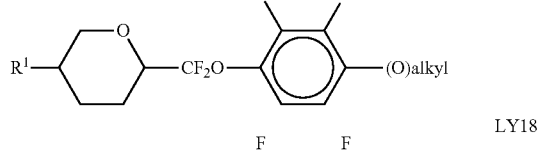
LY18 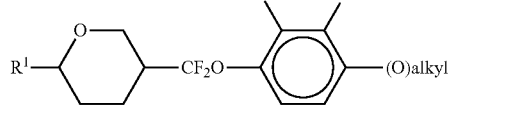

LY19 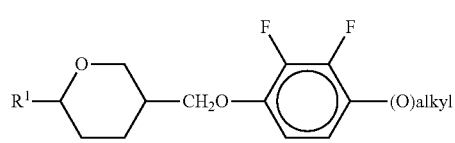
LY20 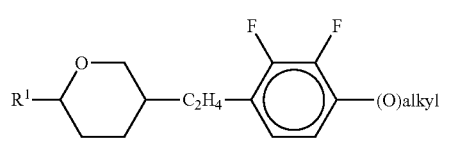
LY21 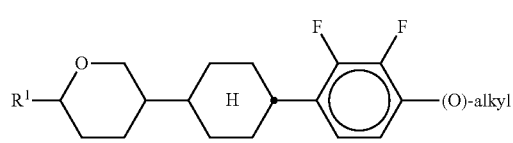
LY22 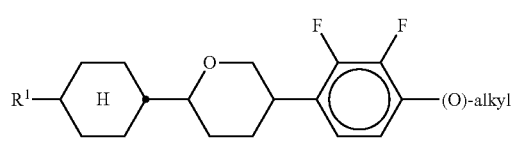
LY23 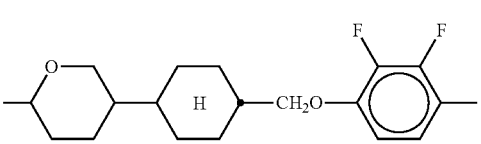
LY24 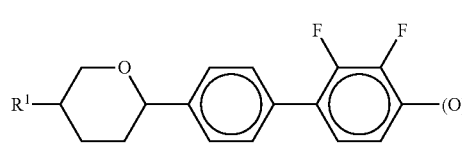

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, $n\text{-}C_3H_7$, $n\text{-}C_4H_9$, $n\text{-}C_5H_{11}$, $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

e) LC medium which additionally comprises one or more compounds selected from the group consisting of the following formulae:

G1 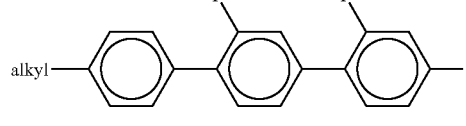
G2 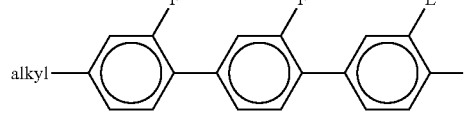

G3
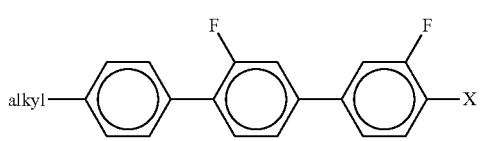
G4
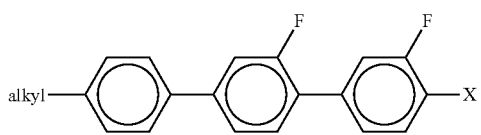
in which alkyl denotes $C_{1-6}$-alkyl, $L^x$ denotes H or F, and X denotes F, Cl, $OCF_3$, $OCHF_2$ or $OCH{=}CF_2$. Particular preference is given to compounds of the formula G1 in which X denotes F.
f) LC medium which additionally comprises one or more compounds selected from the group consisting of the following formulae:
Y1
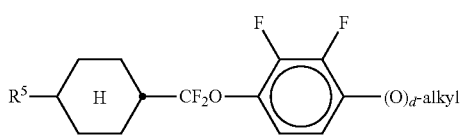
Y2
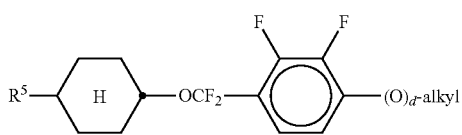
Y3
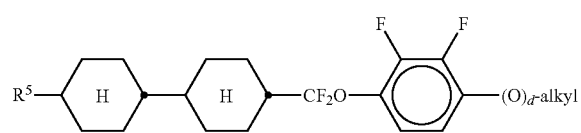
Y4
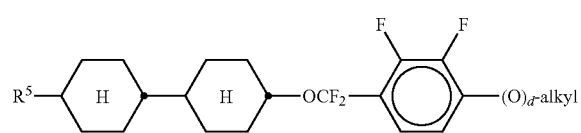
Y5
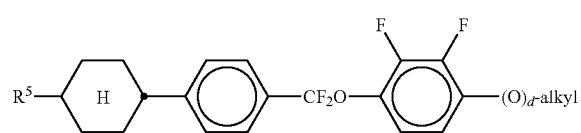
Y6
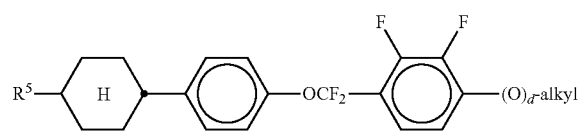
Y7
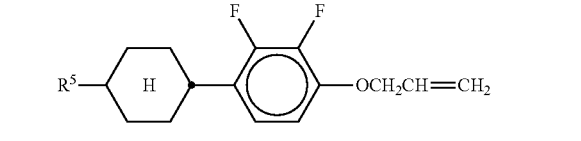
Y8
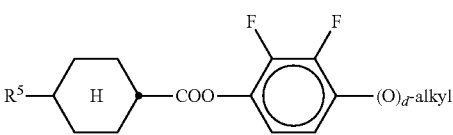
Y9
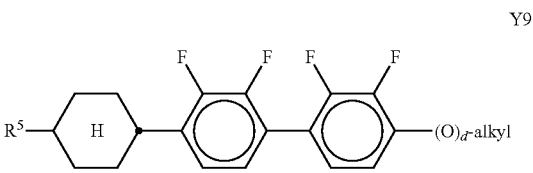
Y10
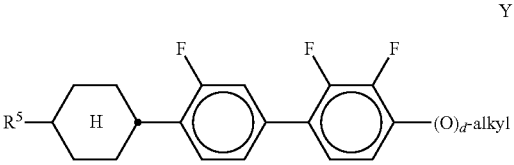
Y11
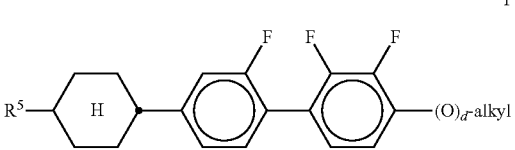
Y12
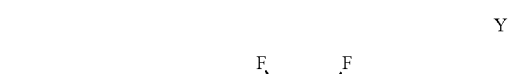
Y13
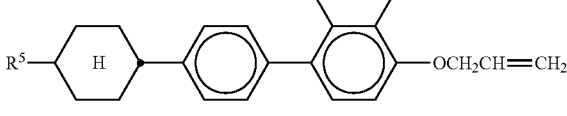
Y14
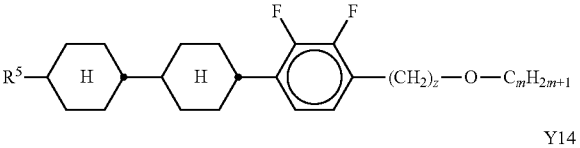
Y15
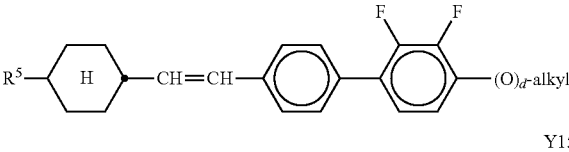
Y16
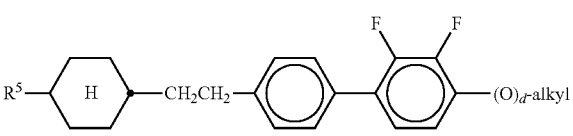
Y17
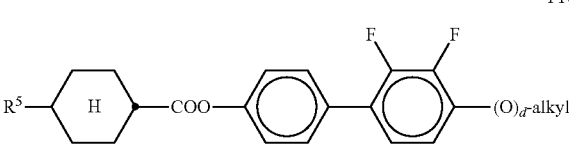

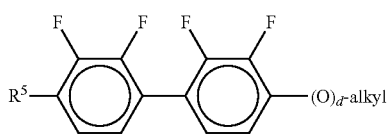

Y18 in which R⁵ has one of the meanings indicated above for R¹, alkyl denotes $C_{1-6}$-alkyl, d denotes 0 or 1, and z and m each, independently of one another, denote an integer from 1 to 6. R⁵ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

g) LC medium which additionally comprises one or more biphenyl compounds selected from the group consisting of the following formulae:

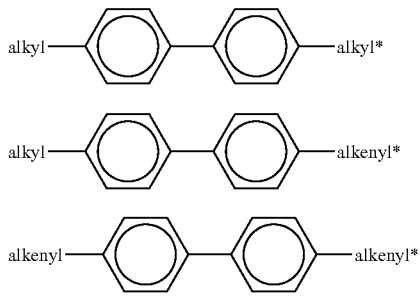

B1

B2

B3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=$CHCH_2CH_2$—, $CH_3$—CH=CH—, $CH_3$—$CH_2$—CH=CH—, $CH_3$—$(CH_2)_2$—CH=CH—, $CH_3$—$(CH_2)_3$—CH=CH— or $CH_3$—CH=CH—$(CH_2)_2$—.

The proportion of the biphenyls of the formulae B1 to B3 in the LC mixture is preferably at least 3% by weight, in particular ≥5% by weight.

The compounds of the formula B2 are particularly preferred.

The compounds of the formulae B1 to B3 are preferably selected from the group consisting of the following sub-formulae:

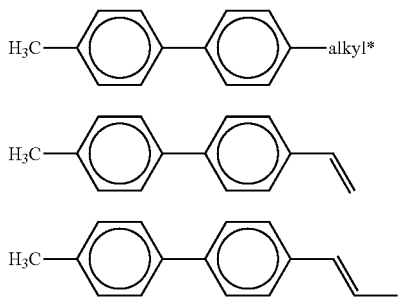

B1a

B2a

B2b

B2c in which alkyl* denotes an alkyl radical having 1-6 C atoms. The medium according to the invention particularly preferably comprises one or more compounds of the formulae B1a and/or B2c.

h) LC medium which additionally comprises one or more terphenyl compounds of the following formula:

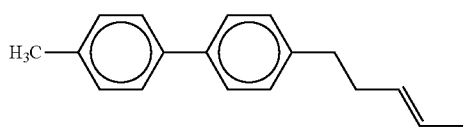

T in which R⁵ and R⁶ each, independently of one another, have one of the meanings indicated above for R¹, and G, I and K each, independently of one another, denote in which L⁵ denotes F or Cl, preferably F, and L⁶ denotes F, Cl, $OCF_3$, $CF_3$, $CH_3$, $CH_2F$ or $CHF_2$, preferably F.

The compounds of the formula T are preferably selected from the group consisting of the following sub-formulae:

T1

T2

T3 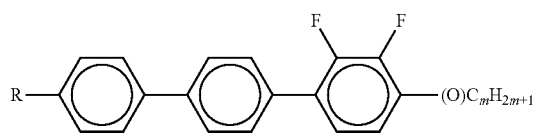
T4 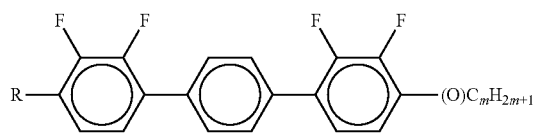
T5 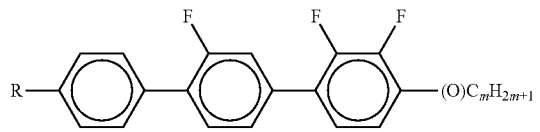
T6 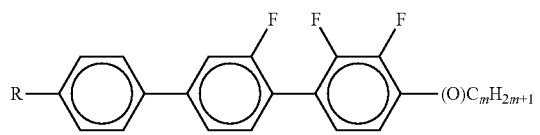
T7 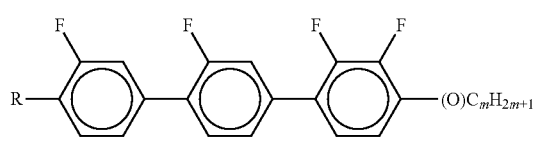
T8 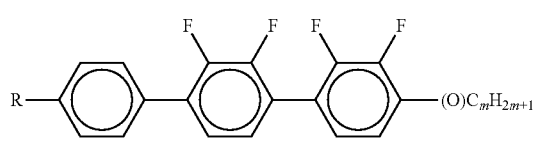
T9 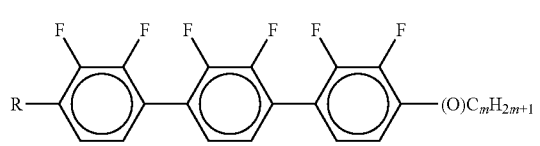
T10 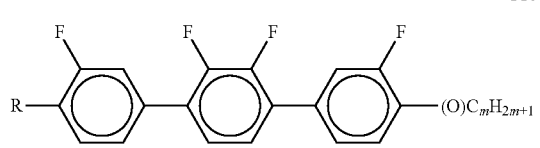
T11 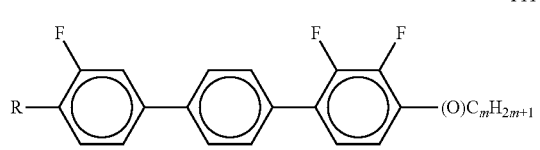
T12 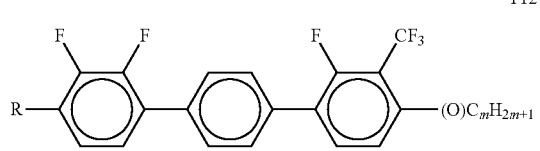
T13 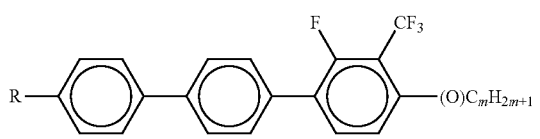
T14 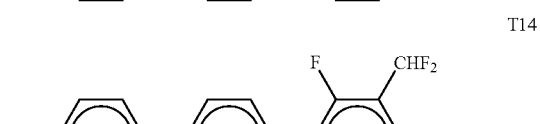
T15 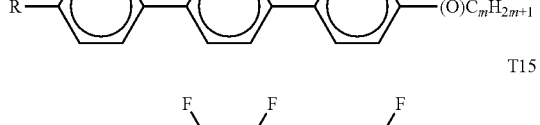
T16 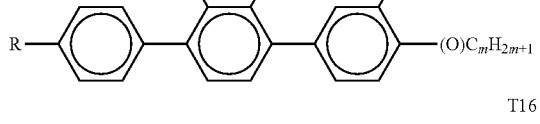
T17 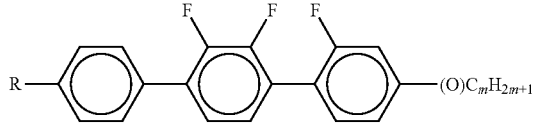
T18 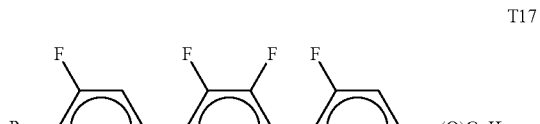
T19 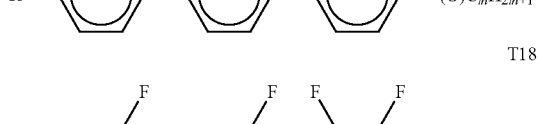
T20 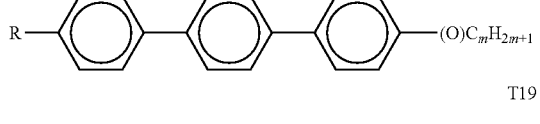
T21 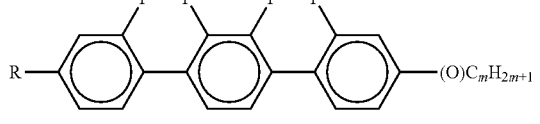
T22 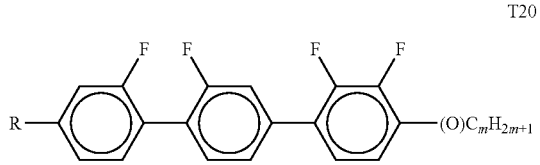

-continued

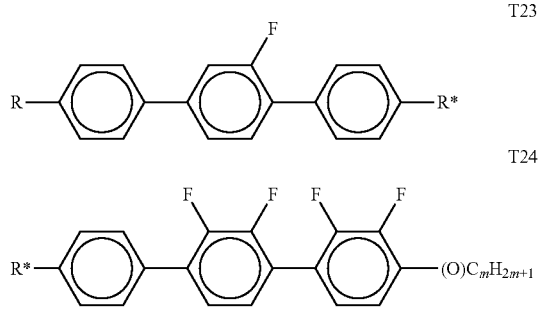

T23

T24 in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

R preferably denotes methyl, ethyl, propyl, butyl, pentyl, hexyl, methoxy, ethoxy, propoxy, butoxy or pentoxy.

The LC medium according to the invention preferably comprises the terphenyls of the formula T and the preferred sub-formulae thereof in an amount of 0.5-30% by weight, in particular 1-20% by weight.

Particular preference is given to compounds of the formulae T1, T2, T3 and T21. In these compounds, R preferably denotes alkyl, furthermore alkoxy, each having 1-5 C atoms.

The terphenyls are preferably employed in mixtures according to the invention if the Δn value of the mixture is to be ≥0.1. Preferred mixtures comprise 2-20% by weight of one or more terphenyl compounds of the formula T, preferably selected from the group of compounds T1 to T22.

i) LC medium which additionally comprises one or more compounds selected from the group consisting of the following formulae:

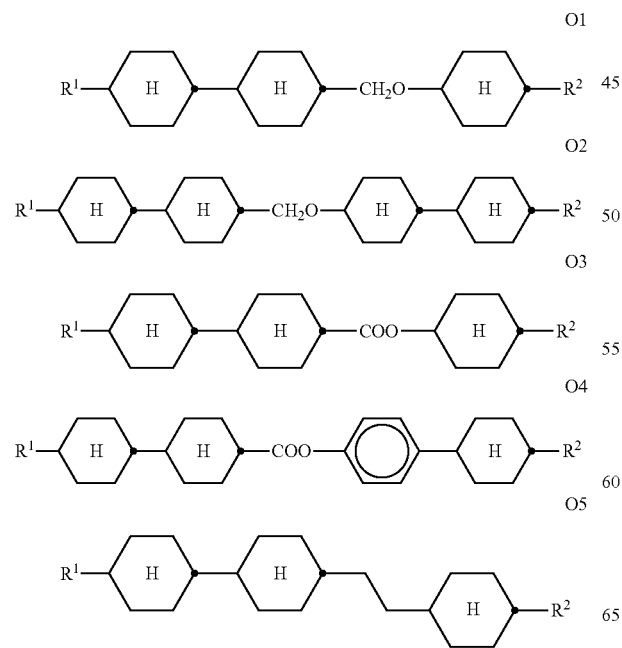

O1

O2

O3

O4

O5

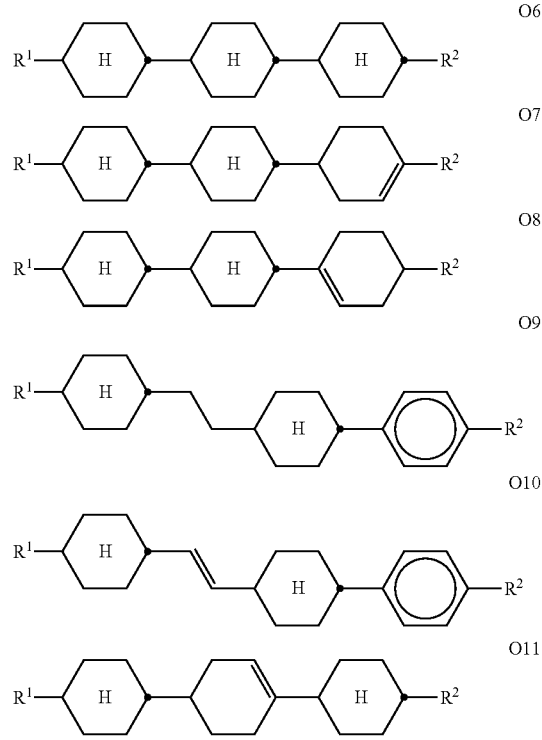

O6

O7

O8

O9

O10

O11 in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

k) LC medium which additionally comprises one or more compounds of the following formula:

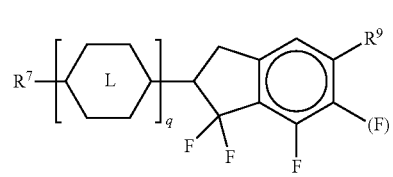

FI in which

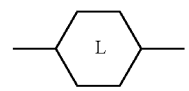

denotes

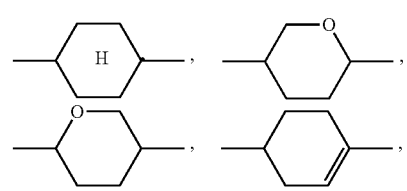

-continued

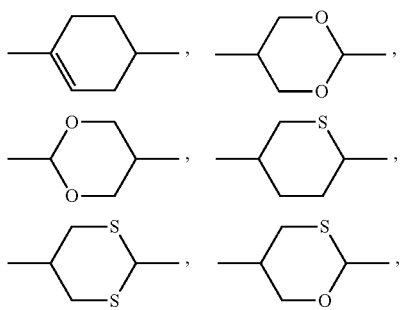

$R^9$ denotes H, $CH_3$, $C_2H_5$ or n-$C_3H_7$, (F) denotes an optional fluorine substituent, and q denotes 1, 2 or 3, and $R^7$ has one of the meanings indicated for $R^1$, preferably in amounts of >3% by weight, in particular ≥5% by weight and very particularly preferably 5-30% by weight.

Particularly preferred compounds of the formula FI are selected from the group consisting of the following sub-formulae:

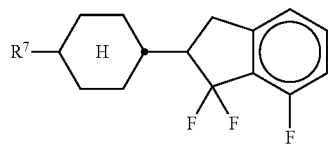

FI1

FI2

FI3

FI4

FI5

FI6

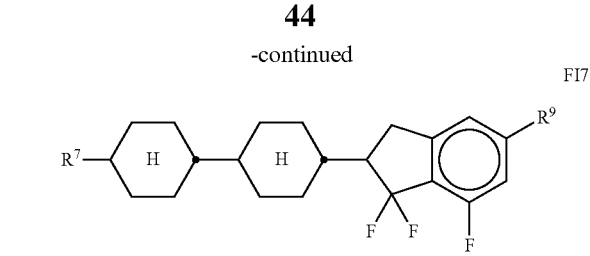

FI7

FI8 in which $R^7$ preferably denotes straight-chain alkyl, and $R^9$ denotes $CH_3$, $C_2H_5$ or n-$C_3H_7$. Particular preference is given to the compounds of the formulae FI1, FI2 and FI3.

m) LC medium which additionally comprises one or more compounds selected from the group consisting of the following formulae:

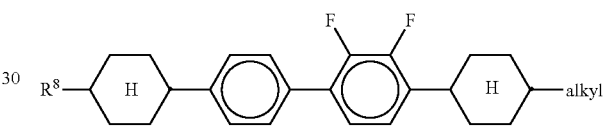

VK1

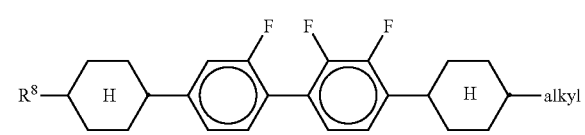

VK2

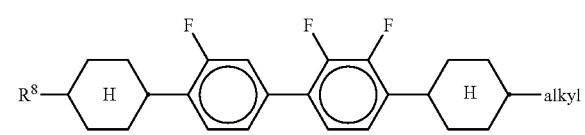

VK3

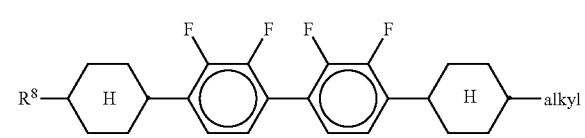

VK4

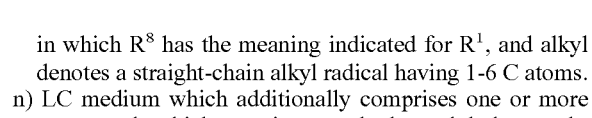

in which $R^8$ has the meaning indicated for $R^1$, and alkyl denotes a straight-chain alkyl radical having 1-6 C atoms.

n) LC medium which additionally comprises one or more compounds which contain a tetrahydronaphthyl or naphthyl unit, such as, for example, the compounds selected from the group consisting of the following formulae:

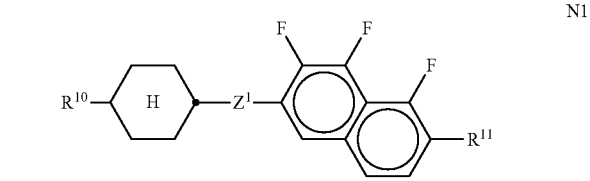

N1

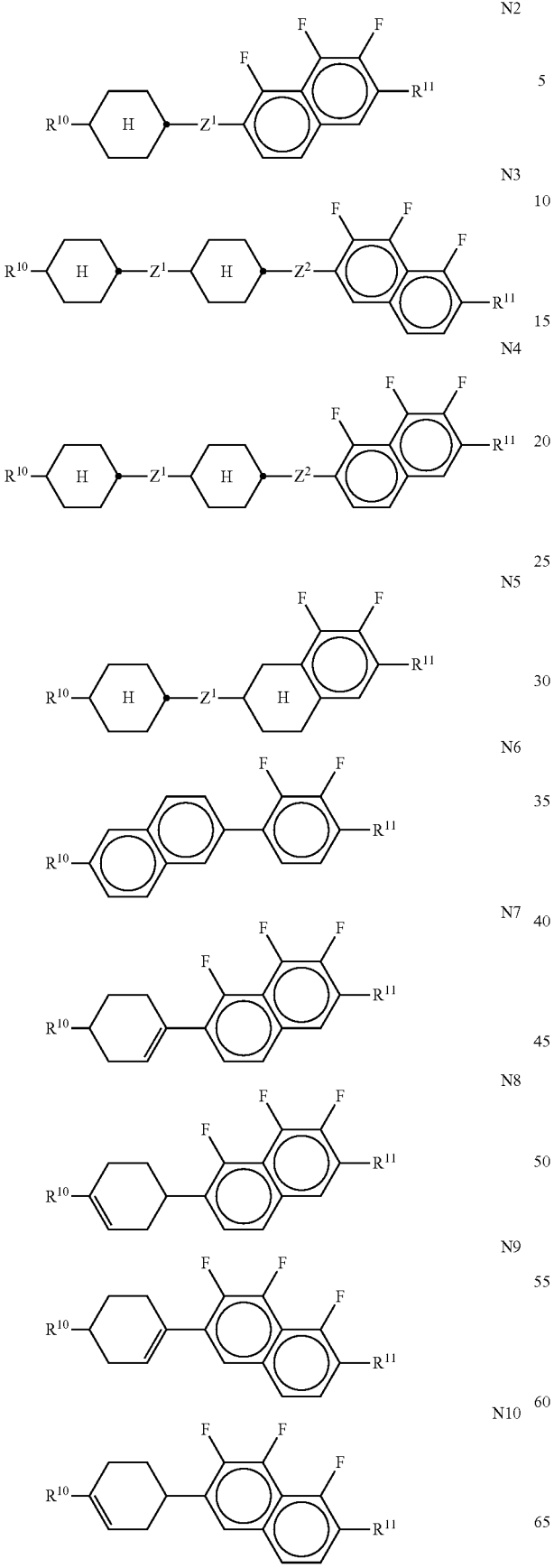

in which $R^{10}$ and $R^{11}$ each, independently of one another, have one of the meanings indicated for $R^1$, preferably denote straight-chain alkyl or alkoxy having 1 to 6 C atoms or straight-chain alkenyl having 2 to 6 C atoms, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CH—$CH_2CH_2$—, —$CH_2CH_2$CH=CH—, —$CH_2O$—, —$OCH_2$—, —COO—, —O—CO—, —$C_2F_4$—, —CF=CF—, —CF=CH—, —CH=CF—, —$CH_2$— or a single bond.

o) LC medium which additionally comprises one or more difluoro-dibenzochromans and/or chromans of the following formulae:

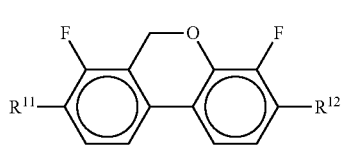

BC

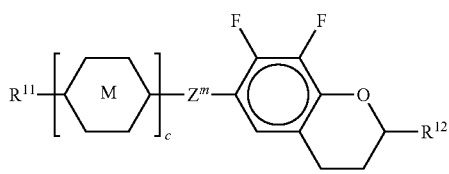

CR

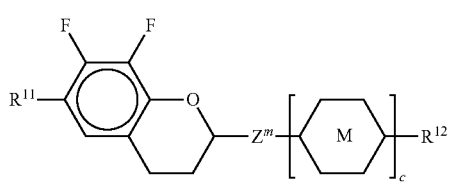

RC in which $R^{11}$ and $R^{12}$ each, independently of one another, have the meanings indicated above, ring M denotes trans-1,4-cyclohexylene or 1,4-phenylene, $Z^m$ denotes —$C_2H_4$—, —$CH_2O$—, —$OCH_2$—, —CO—O— or —O—CO—, c denotes 0 or 1, preferably in amounts of 3 to 20% by weight, in particular in amounts of 3 to 15% by weight.

Particularly preferred compounds of the formulae BC, CR and RC are selected from the group consisting of the following sub-formulae:

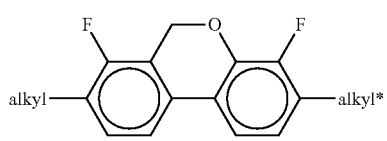

BC1

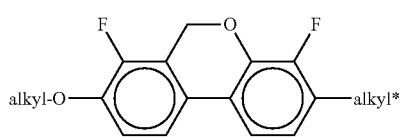

BC2

BC3
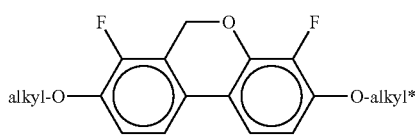
BC4
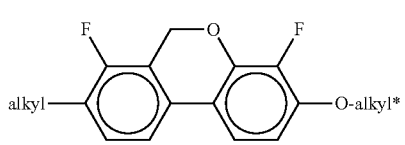
BC5
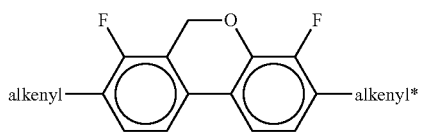
BC6
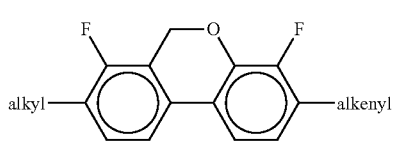
BC7
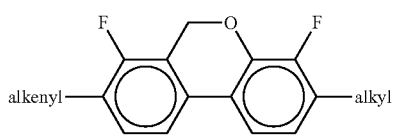
CR1
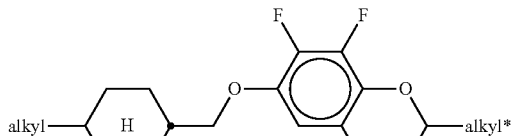
CR2
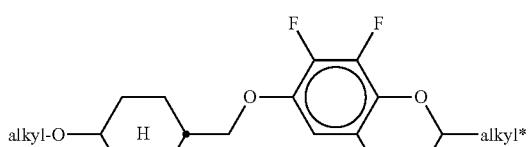
CR3
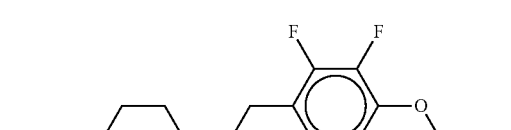
CR4
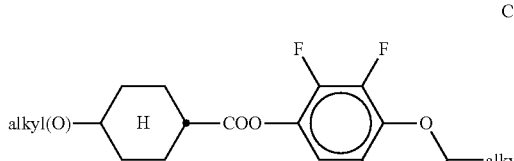
CR5
CR6
CR7
CR8
CR9
RC1
RC2
RC3
in which alkyl and alkyl* each, independently of one another, denote a straight-chain alkyl radical having 1-6 C atoms, (O) denotes an oxygen atom or a single bond, c denotes 1 or 2, and alkenyl and alkenyl* each, independently of one another, denote a straight-chain alkenyl radical having 2-6 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Very particular preference is given to mixtures comprising one, two or three compounds of the formula BC-2.

p) LC medium which additionally comprises one or more fluorinated phenanthrenes and/or dibenzofurans of the following formulae:

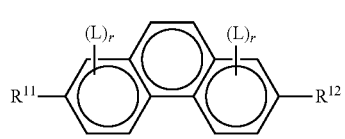

PH

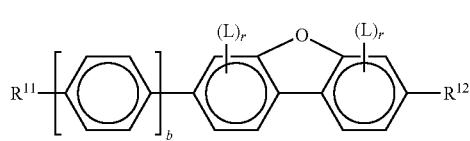

BF in which R$^{11}$ and R$^{12}$ each, independently of one another, have the meanings indicated above, b denotes 0 or 1, L denotes F, and r denotes 1, 2 or 3.

Particularly preferred compounds of the formulae PH and BF are selected from the group consisting of the following sub-formulae:

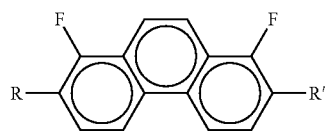

PH1

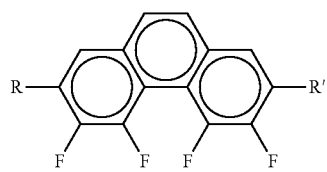

PH2

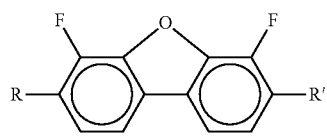

BF1

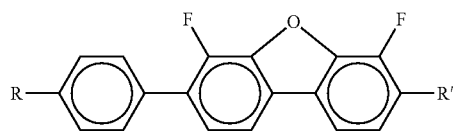

BF2 in which R and R' each, independently of one another, denote a straight-chain alkyl or alkoxy radical having 1-7 C atoms.

q) LC medium which, apart from the polymerisable compounds according to the invention, in particular of the formula I or sub-formulae thereof and the comonomers, comprises no compounds which contain a terminal vinyloxy group (—O—CH=CH$_2$).

r) LC medium which comprises 1 to 5, preferably 1, 2 or 3, polymerisable compounds, preferably selected from polymerisable compounds according to the invention, in particular of the formula I or sub-formulae thereof.

s) LC medium in which the proportion of polymerisable compounds, in particular of the formula I or sub-formulae thereof, in the mixture as a whole is 0.05 to 5%, preferably 0.1 to 1%.

t) LC medium which comprises 1 to 8, preferably 1 to 5, compounds of the formulae CY1, CY2, PY1 and/or PY2. The proportion of these compounds in the mixture as a whole is preferably 5 to 60%, particularly preferably 10 to 35%. The content of these individual compounds is preferably in each case 2 to 20%.

u) LC medium which comprises 1 to 8, preferably 1 to 5, compounds of the formulae CY9, CY10, PY9 and/or PY10. The proportion of these compounds in the mixture as a whole is preferably 5 to 60%, particularly preferably 10 to 35%. The content of these individual compounds is preferably in each case 2 to 20%.

v) LC medium which comprises 1 to 10, preferably 1 to 8, compounds of the formula ZK, in particular compounds of the formulae ZK1, ZK2 and/or ZK6. The proportion of these compounds in the mixture as a whole is preferably 3 to 25%, particularly preferably 5 to 45%. The content of these individual compounds is preferably in each case 2 to 20%.

w) LC medium in which the proportion of compounds of the formulae CY, PY and ZK in the mixture as a whole is greater than 70%, preferably greater than 80%.

x) PSA-VA display in which the pretilt angle is preferably ≤85°, particularly preferably ≤80°.

In a second preferred embodiment, the LC medium comprises an LC host mixture based on compounds having positive dielectric anisotropy. LC media of this type are particularly suitable for use in PSA-OCB, PSA-TN, PSA-positive-VA, PSA-IPS or PSA-FFS displays.

Particular preference is given to an LC medium of this second preferred embodiment which comprises one or more compounds selected from the group consisting of the compounds of the formulae AA and BB:

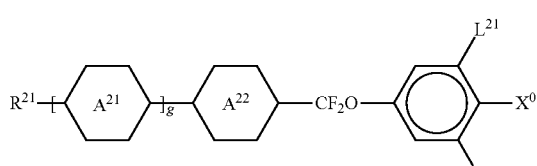

AA

BB

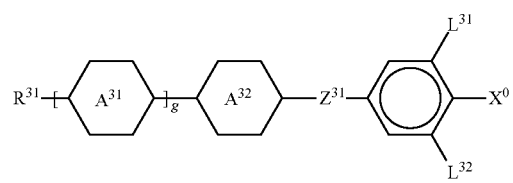

and optionally, in addition to the compounds of the formulae AA and/or BB, one or more compounds of the formula CC

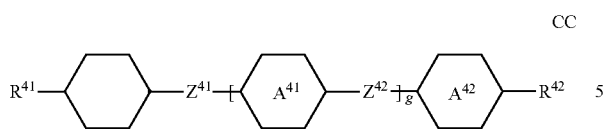
CC in which the individual radicals have the following meanings:

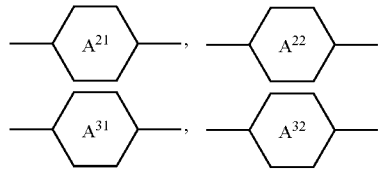

each, independently of one another, and on each occurrence identically or differently, denote

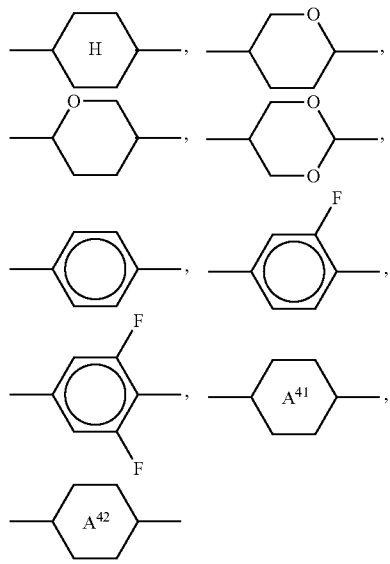

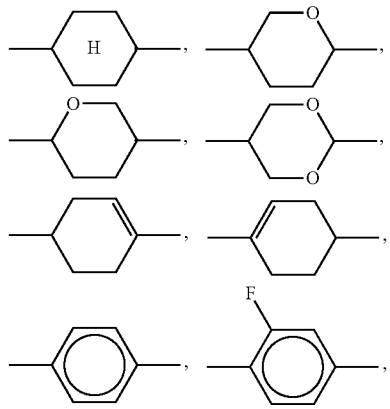

each, independently of one another, and on each occurrence identically or differently, denote $R^{21}$, $R^{31}$, $R^{41}$, $R^{42}$ each, independently of one another, denote alkyl, alkoxy, oxaalkyl or fluoroalkyl having 1 to 9 C atoms or alkenyl having 2 to 9 C atoms, $X^0$ denotes F, Cl, halogenated alkyl or alkoxy having 1 to 6 C atoms or halogenated alkenyl or alkenyloxy having 2 to 6 C atoms, $Z^{31}$ denotes —$CH_2CH_2$—, —$CF_2CF_2$—, —COO—, trans-CH=CH—, trans-CF=CF—, —$CH_2O$— or a single bond, preferably —$CH_2CH_2$—, —COO—, trans-CH=CH— or a single bond, particularly preferably —COO—, trans-CH=CH— or a single bond, $Z^{41}$, $Z^{42}$ denotes —$CH_2CH_2$—, —COO—, trans-CH=CH—, trans-CF=CF—, —$CH_2O$—, —$CF_2O$—, —C≡C— or a single bond, preferably a single bond, $L^{21}$, $L^{22}$, $L^{31}$, $L^{32}$ denote H or F, g denotes 1, 2 or 3, h denotes 0, 1, 2 or 3.

$X^0$ is preferably F, Cl, $CF_3$, $CHF_2$, $OCF_3$, $OCHF_2$, $OCFHCF_3$, $OCFHCHF_2$, $OCFHCHF_2$, $OCF_2CH_3$, $OCF_2CHF_2$, $OCF_2CHF_2$, $OCF_2CF_2CHF_2$, $OCF_2CF_2CHF_2$, $OCFHCF_2CF_3$, $OCFHCF_2CHF_2$, $OCF_2CF_2CF_3$, $OCF_2CF_2CClF_2$, $OCClFCF_2CF_3$ or CH=$CF_2$, particularly preferably F or $OCF_3$.

The compounds of the formula AA are preferably selected from the group consisting of the following formulae:

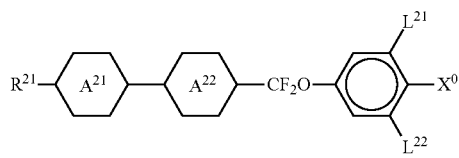
AA1

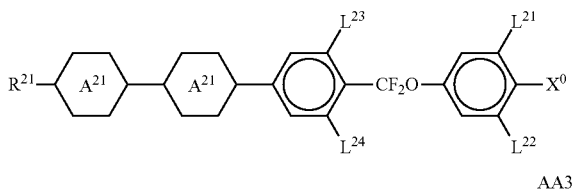
AA2

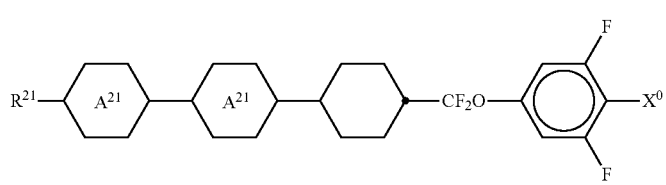
AA3

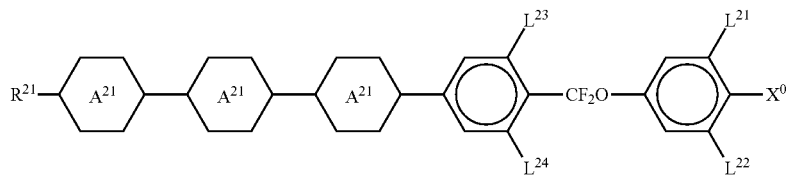

AA4 in which $A^{21}$, $R^{21}$, $X^0$, $L^{21}$ and $L^{22}$ have the meanings indicated in formula AA, $L^{23}$ and $L^{24}$ each, independently of one another, denote H or F, and $X^0$ preferably denotes F. Particular preference is given to compounds of the formulae AA1 and AA2.

Particularly preferred compounds of the formula AA1 are selected from the group consisting of the following sub-formulae:

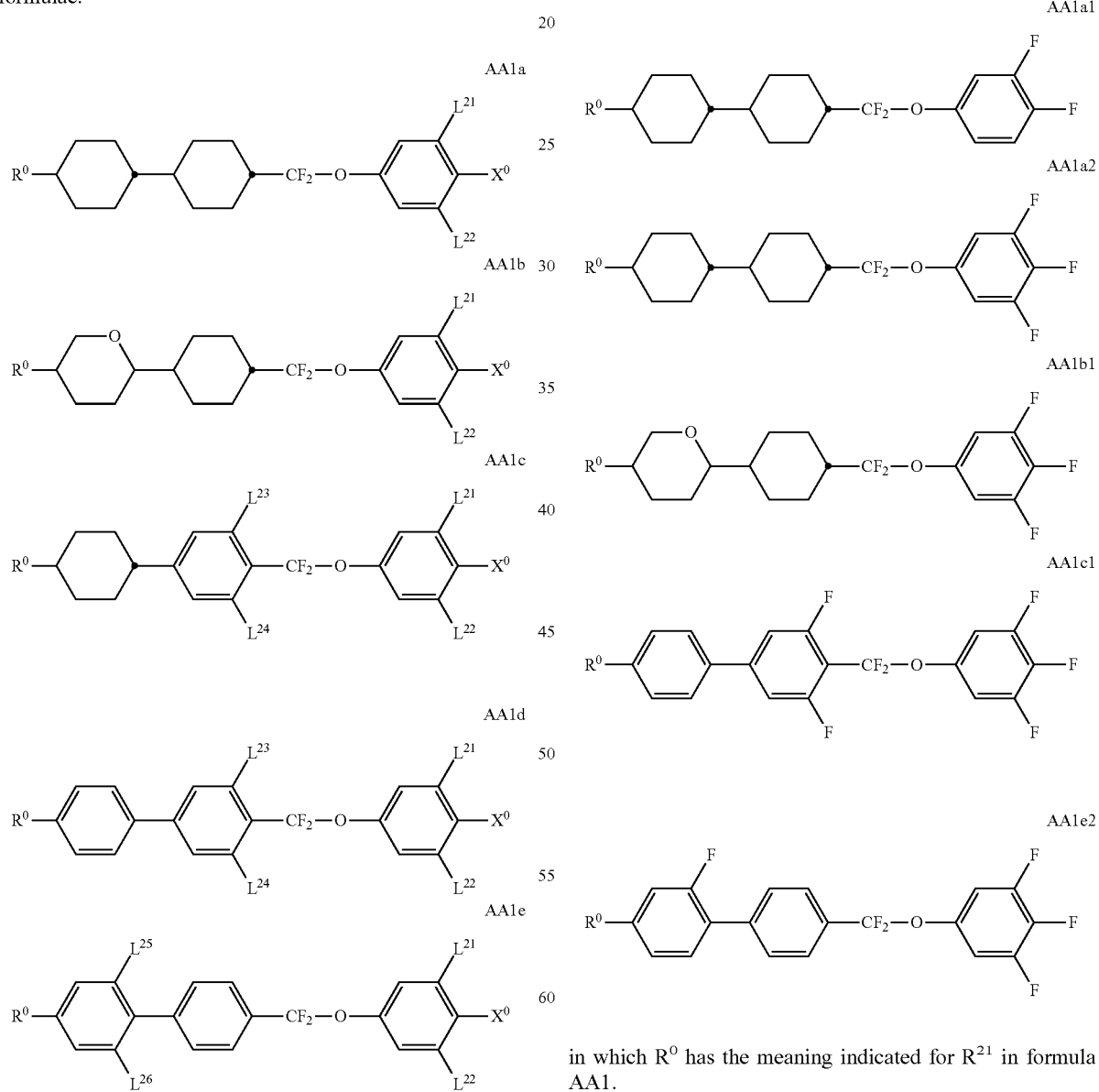

in which $R^0$ has the meaning indicated for $R^{21}$ in formula AA1, $X^0$, $L^{21}$ and $L^{22}$ have the meanings indicated in formula AA1, $L^{23}$, $L^{24}$, $L^{25}$ and $L^{26}$ each, independently of one another, denote H or F, and $X^0$ preferably denotes F.

Very particularly preferred compounds of the formula AA1 are selected from the group consisting of the following sub-formulae:

in which $R^0$ has the meaning indicated for $R^{21}$ in formula AA1.

Particularly preferred compounds of the formula AA2 are selected from the group consisting of the following sub-formulae:

AA2a
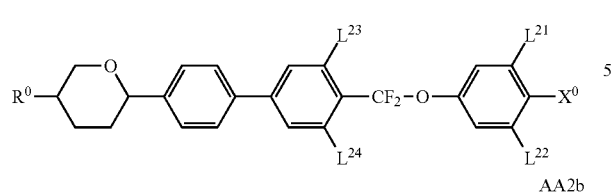

AA2b
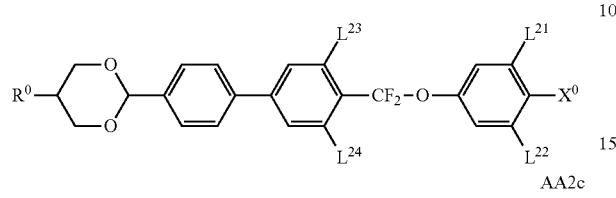

AA2c
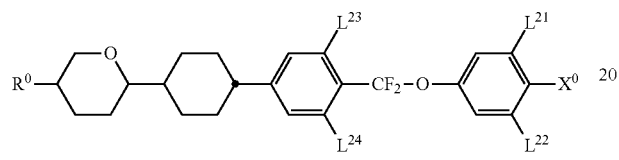

AA2d
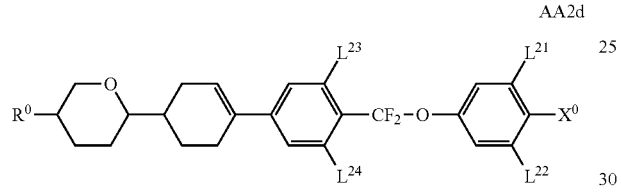

AA2e
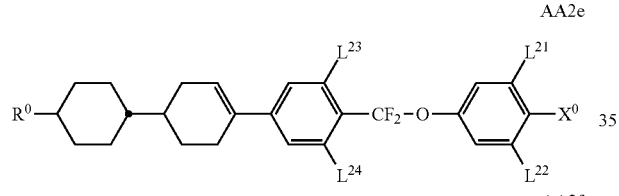

AA2f
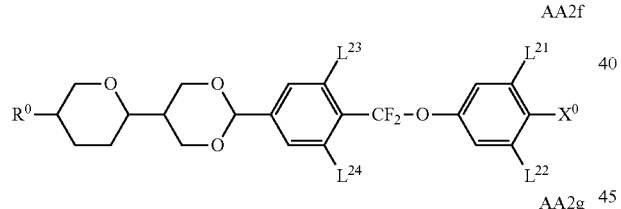

AA2g
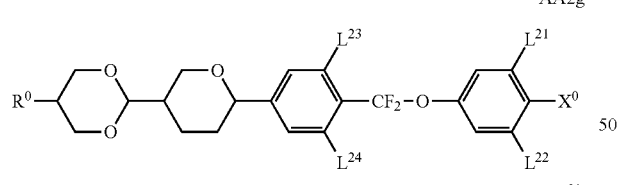

AA2h
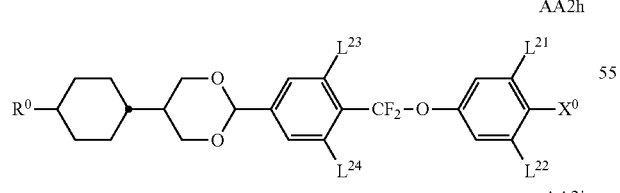

AA2i
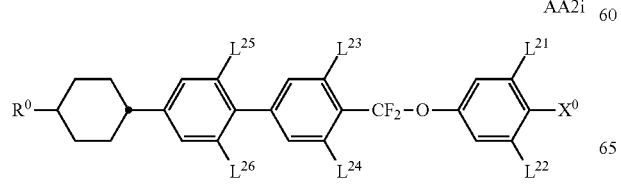

AA2j
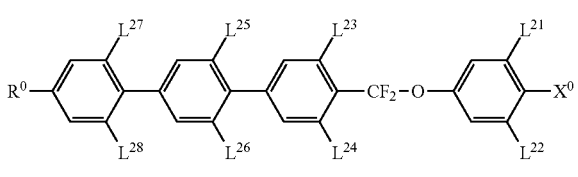

in which $R^0$ has the meaning indicated for $R^{21}$ in formula AA1, $X^0$, $L^{21}$ and $L^{22}$ have the meanings indicated in formula AA, $L^{23}$, $L^{24}$, $L^{25}$ and $L^{26}$ each, independently of one another, denote H or F, and $X^0$ preferably denotes F.

Very particularly preferred compounds of the formula AA2 are selected from the group consisting of the following sub-formulae:

AA2a1

AA2c1

AA2d1

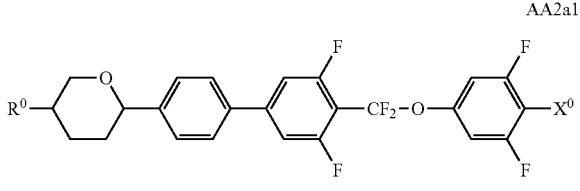

AA2e1

AA2f1

AA2h1

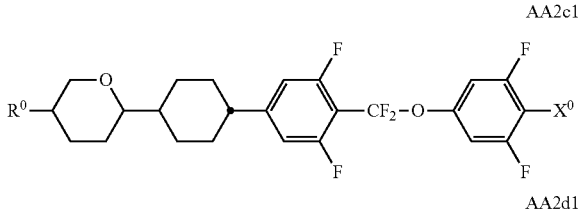

-continued

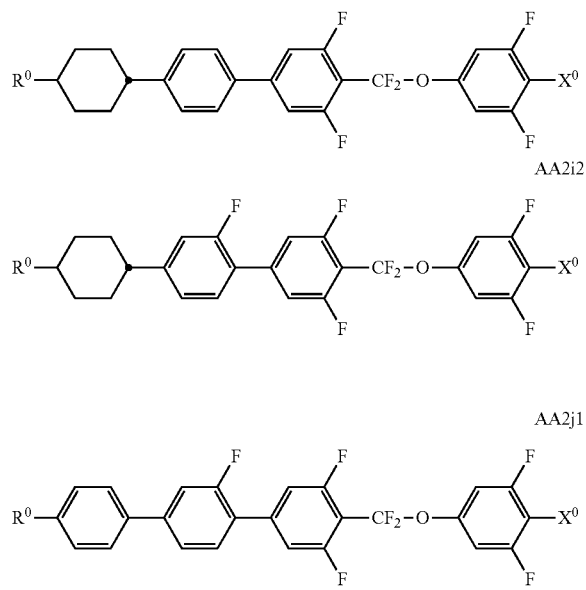

AA2i1

AA2i2

AA2j1

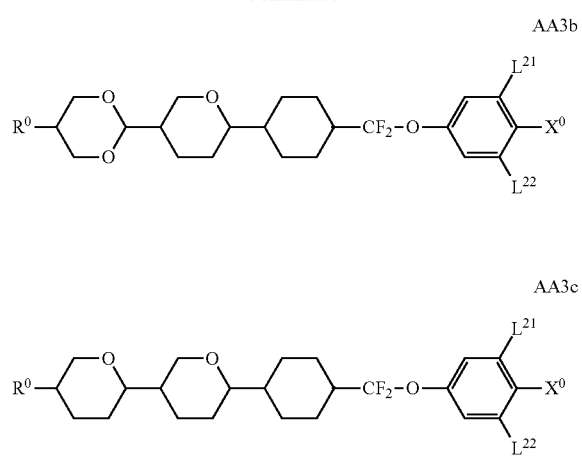

AA3b

AA3c in which $R^0$ has the meaning indicated for $R^{21}$ in formula AA1, $X^0$, $L^{21}$ and $L^{22}$ have the meanings indicated in formula AA3, and $X^0$ preferably denotes F.

Particularly preferred compounds of the formula AA4 are those of the following sub-formula:

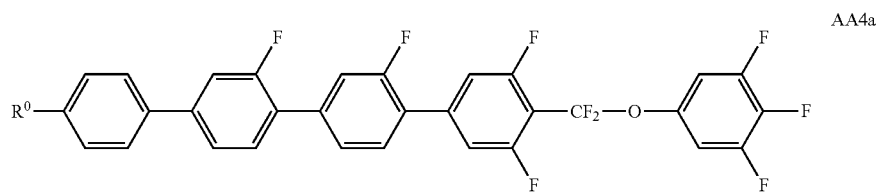

AA4a

-continued

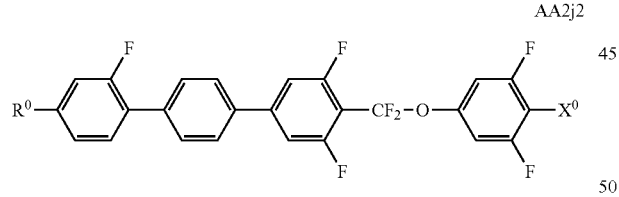

AA2j2 in which $R^0$ has the meaning indicated for $R^{21}$ in formula AA1.

Particularly preferred compounds of the formula AA3 are selected from the group consisting of the following sub-formulae:

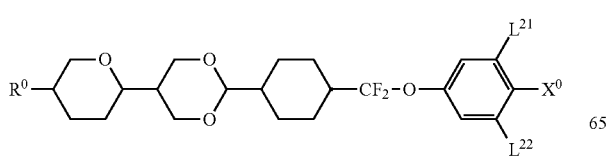

AA3a in which $R^0$ has the meaning indicated for $R^{21}$ in formula AA1.

The compounds of the formula BB are preferably selected from the group consisting of the following sub-formulae:

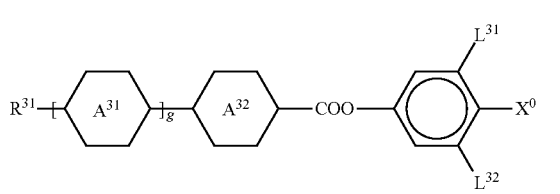

BB1

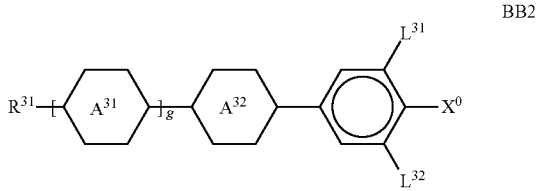

BB2

BB3

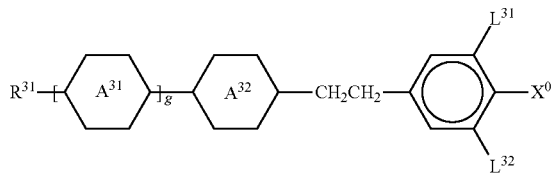

in which $A^{31}$, $A^{32}$, $R^{31}$, $X^0$, $L^{31}$, $L^{32}$ and g have the meanings indicated in formula BB, and $X^0$ preferably denotes F. Particular preference is given to compounds of the formulae BB1 and BB2.

Particularly preferred compounds of the formula BB1 are selected from the group consisting of the following sub-formulae:

BB1a

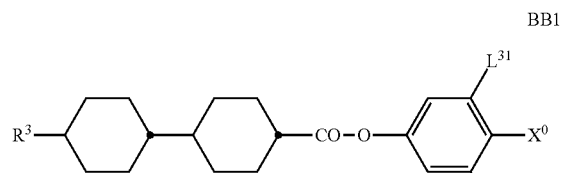

BB1b

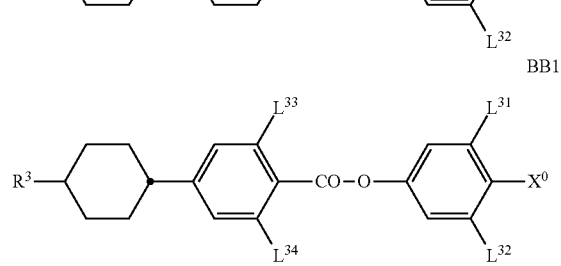

in which $R^3$ has the meaning indicated for $R^{31}$ in formula BB1, $X^0$, $L^{31}$ and $L^{32}$ have the meanings indicated in formula BB1, and $X^0$ preferably denotes F.

Very particularly preferred compounds of the formula BB1a are selected from the group consisting of the following sub-formulae:

BB1a1

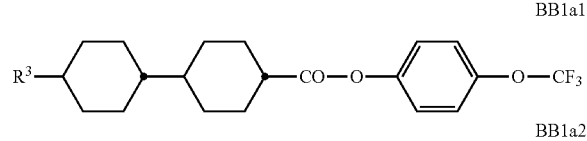

BB1a2

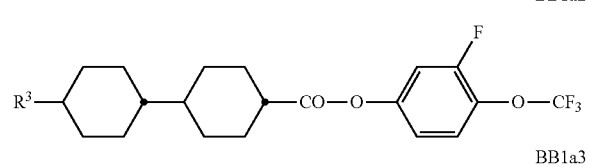

BB1a3

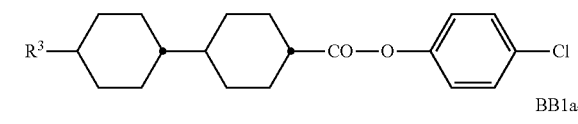

BB1a4

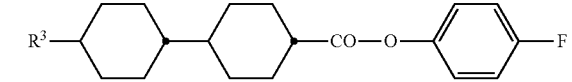

BB1a5

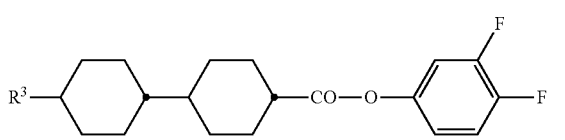

BB1a6

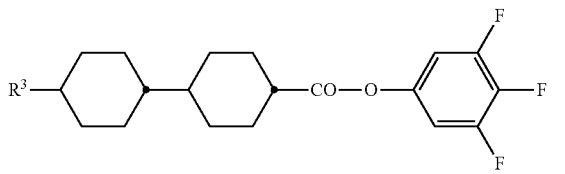

in which $R^3$ has the meaning indicated for $R^{31}$ in formula BB1.

Very particularly preferred compounds of the formula BB1b are selected from the group consisting of the following sub-formulae:

BB1b1

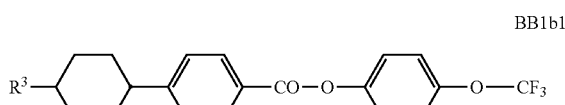

BB1b2

BB1b3

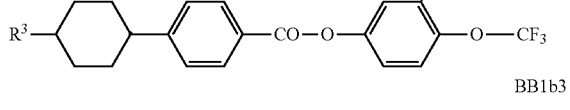

BB1b4

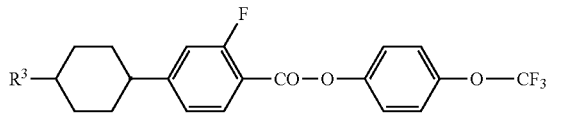

in which $R^3$ has the meaning indicated for $R^{31}$ in formula BB1.

Particularly preferred compounds of the formula BB2 are selected from the group consisting of the following sub-formulae:

BB2a

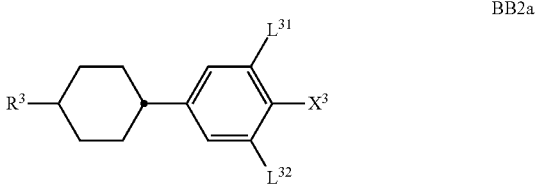

-continued

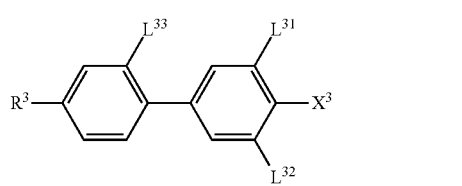
BB2b

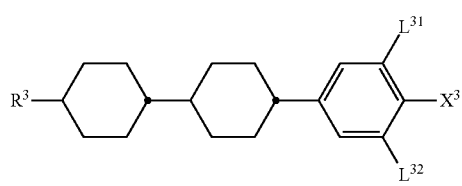
BB2c

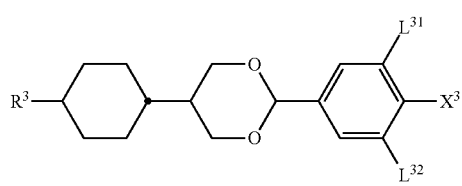
BB2d

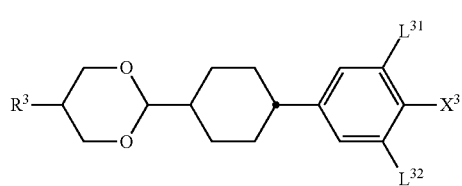
BB2e

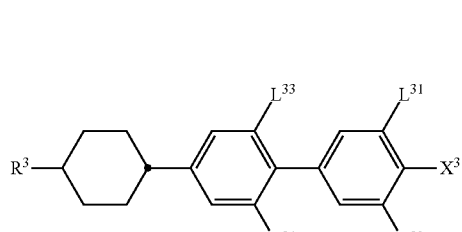
BB2f

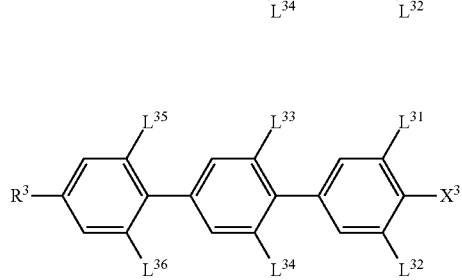
BB2g

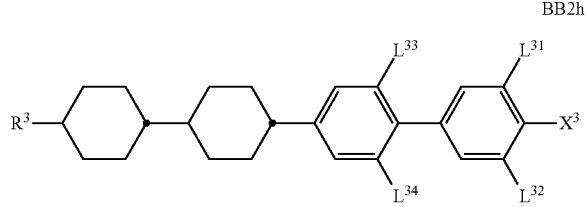
BB2h

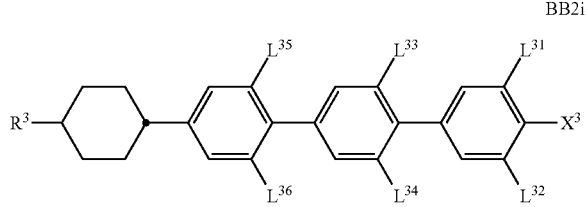
BB2i

-continued

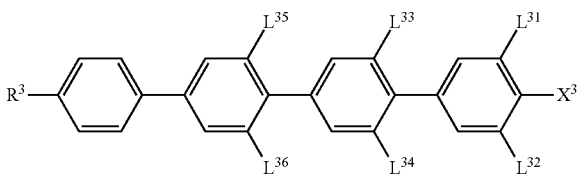
BB2k in which $R^0$ has the meaning indicated for $R^{31}$ in formula BB2, $X^0$, $L^{31}$ and $L^{32}$ have the meanings indicated in formula BB2, $L^{33}$, $L^{34}$, $L^{35}$ and $L^{36}$ each, independently of one another, denote H or F, and $X^0$ preferably denotes F. Particular preference is given to compounds of the formulae BB1 and BB2.

Very particularly preferred compounds of the formula BB2a are selected from the group consisting of the following sub-formulae:

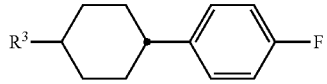
BB2a1

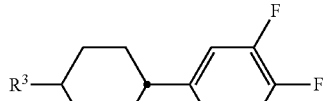
BB2a2

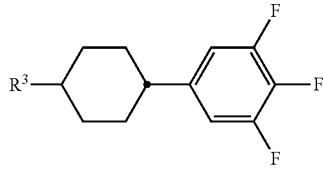
BB2a3

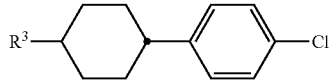
BB2a4

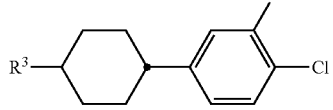
BB2a5 in which $R^3$ has the meaning indicated for $R^{31}$ in formula BB2.

Very particularly preferred compounds of the formula BB2b are selected from the group consisting of the following sub-formulae:

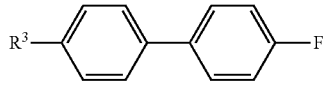
BB2b1

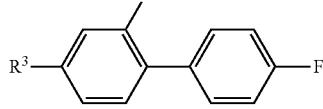
BB2b2

-continued

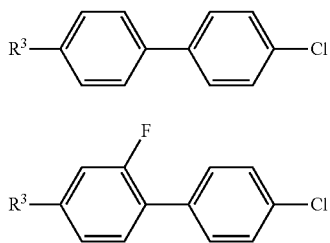

BB2b3

BB2b4 in which R³ has the meaning indicated for R³¹ in formula BB2.

Very particularly preferred compounds of the formula BB2c are selected from the group consisting of the following sub-formulae:

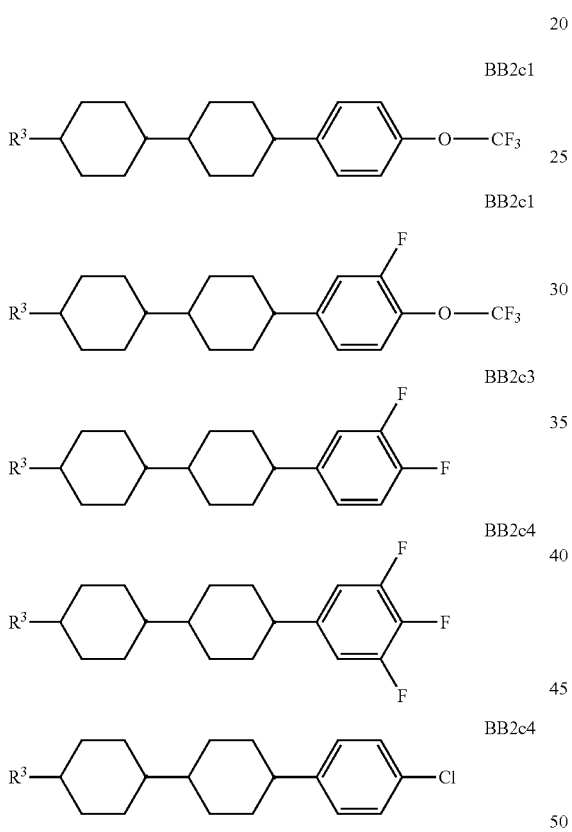

BB2c1

BB2c1

BB2c3

BB2c4

BB2c4 in which R³ has the meaning indicated for R³¹ in formula BB2.

Very particularly preferred compounds of the formula BB2d and BB2e are selected from the group consisting of the following sub-formulae:

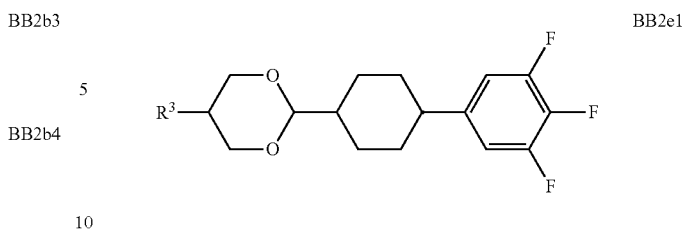

BB2e1 in which R³ has the meaning indicated for R³¹ in formula BB2.

Very particularly preferred compounds of the formula BB2f are selected from the group consisting of the following sub-formulae:

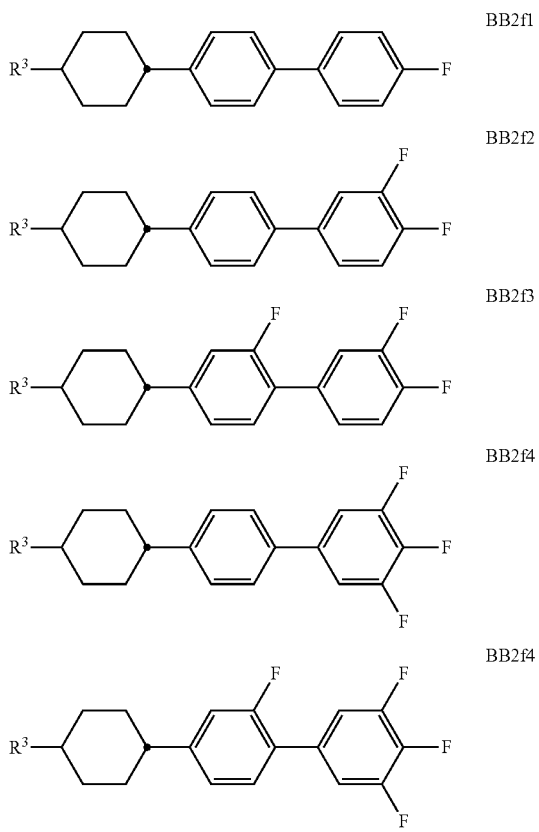

BB2f1

BB2f2

BB2f3

BB2f4

BB2f4 in which R³ has the meaning indicated for R³¹ in formula BB2.

Very particularly preferred compounds of the formula BB2g are selected from the group consisting of the following sub-formulae:

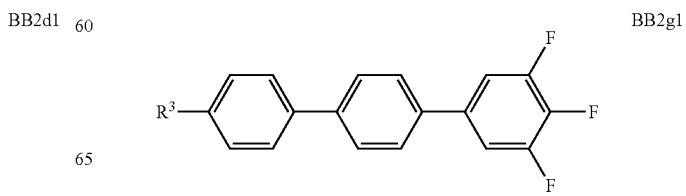

BB2g1

BB2d1

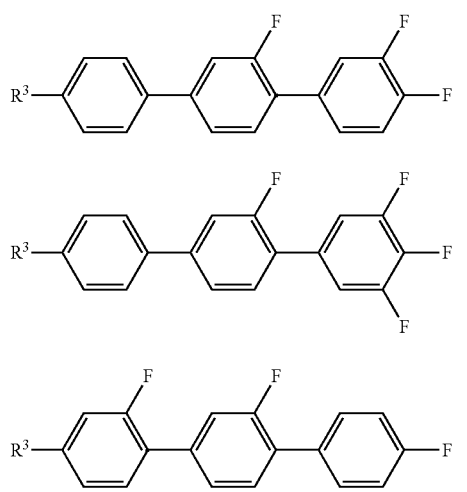

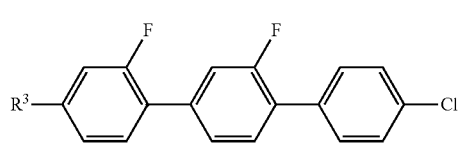

in which R³ has the meaning indicated for R³¹ in formula BB2.

Very particularly preferred compounds of the formula BB2h are selected from the group consisting of the following sub-formulae:

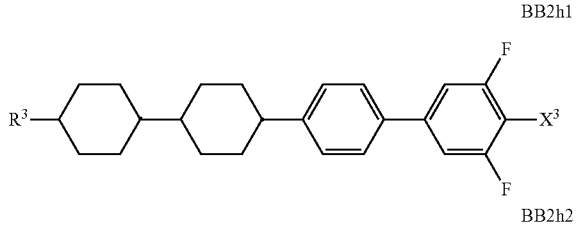

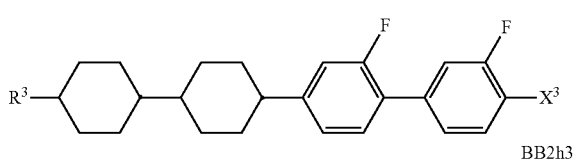

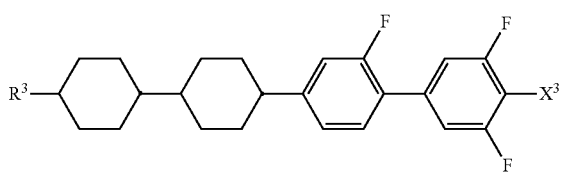

in which R³ has the meaning indicated for R³¹ in formula BB2.

Very particularly preferred compounds of the formula BB2i are selected from the group consisting of the following sub-formulae:

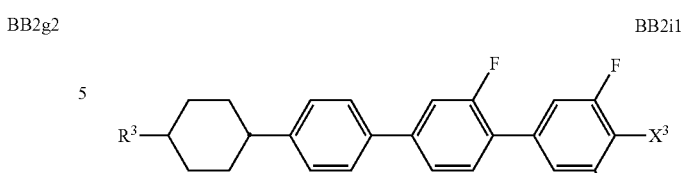

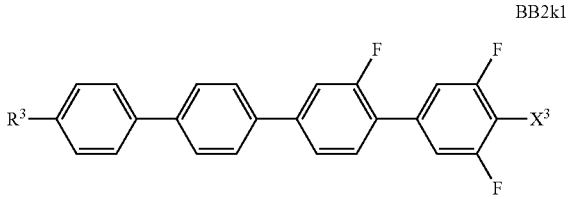

in which R³ has the meaning indicated for R³¹ in formula BB2.

Very particularly preferred compounds of the formula BB2k are selected from the group consisting of the following sub-formulae:

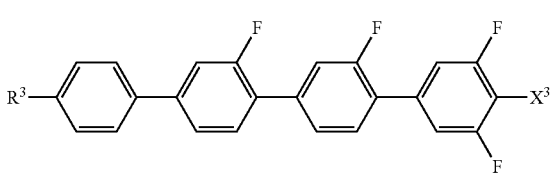

in which R³ has the meaning indicated for R³¹ in formula BB2.

Alternatively or additionally to the compounds of formulae BB1 and/or BB2, the LC media may comprise one or more compounds of the formula BB3 as defined above.

Particularly preferred compounds of the formula BB3 are selected from the group consisting of the following sub-formulae:

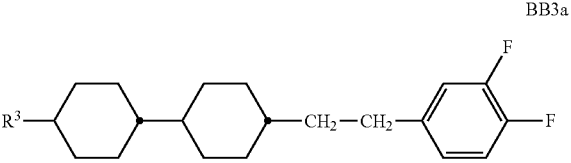

BB3b

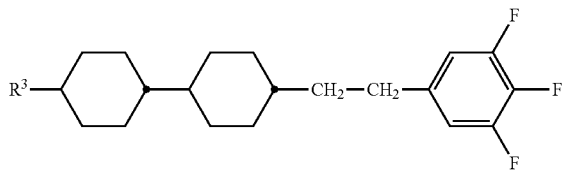

in which R³ has the meaning indicated for R³¹ in formula BB3.

In addition to the compounds of the formulae AA and/or BB, the LC media of this second preferred embodiment preferably comprise one or more dielectrically neutral compounds having a dielectric anisotropy in the range from −1.5 to +3, preferably selected from the group of the compounds of the formula CC as defined above.

Particularly preferred compounds of the formula CC are selected from the group consisting of the following sub-formulae:

CC1
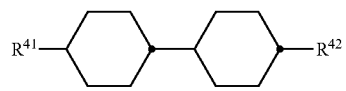

CC2
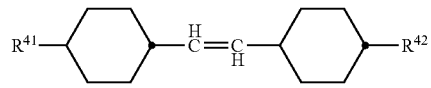

CC3
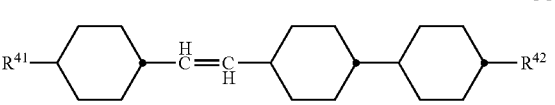

CC4
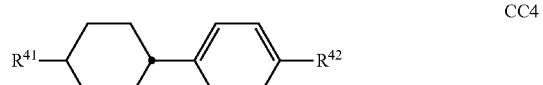

CC5
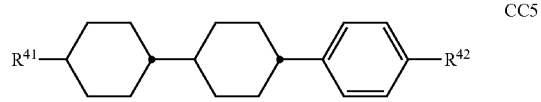

CC6
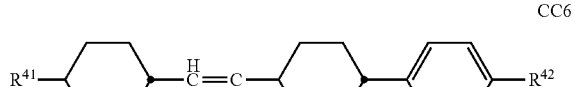

CC7
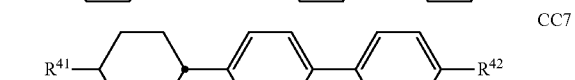

CC8
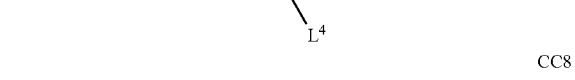

CC9
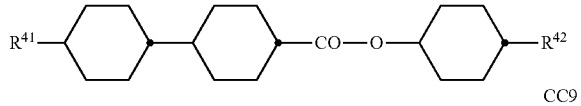

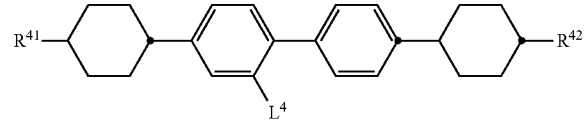

CC10
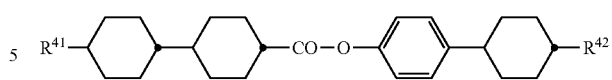

CC11
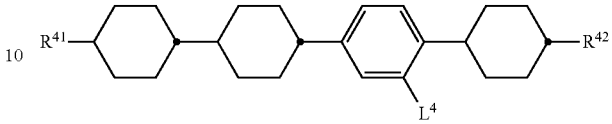

CC12
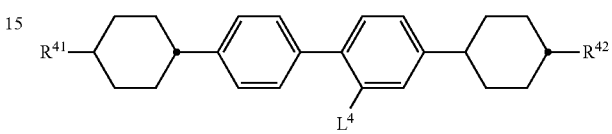

CC13
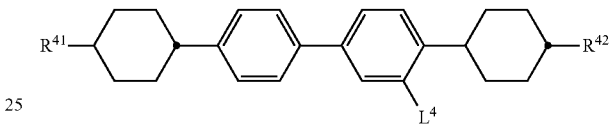

CC14
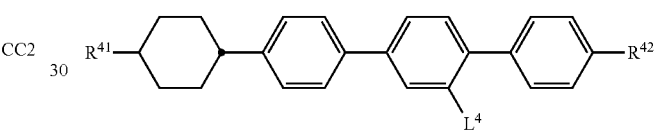

in which $R^{41}$ and $R^{42}$ have the meanings indicated in formula CC and preferably each, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and $L^4$ denotes H or F.

In addition or alternatively to the compounds of the formula CC, the LC media of this second preferred embodiment preferably comprise one or more dielectrically neutral compounds having a dielectric anisotropy in the range from −1.5 to +3, selected from the group of the compounds of the formula DD DD

in which $A^{41}$, $A^{42}$, $Z^{41}$, $Z^{42}$, $R^{41}$, $R^{42}$ and h have the meanings indicated in formula CC.

Particularly preferred compounds of the formula DD are selected from the group consisting of the following sub-formulae:

DD1
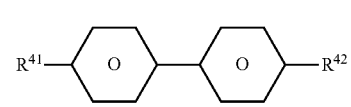

-continued

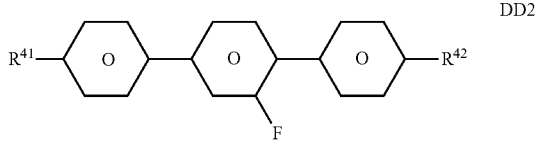
DD2 in which $R^{41}$ and $R^{42}$ have the meanings indicated in formula DD and $R^{41}$ preferably denotes alkyl and, in formula DD1, $R^{42}$ preferably denotes alkenyl, preferably —$(CH_2)_2$—CH=CH—$CH_3$, and, in formula DD2, $R^{42}$ preferably denotes alkyl, —$(CH_2)_2$—CH=$CH_2$ or —$(CH_2)_2$—CH=CH—$CH_3$.

The compounds of the formulae AA and BB are preferably used in a concentration of 2% to 60%, more preferably 3% to 35% and in very particularly preferably 4% to 30% of the mixture as a whole.

The compounds of the formulae CC and DD are preferably used in a concentration of 2% to 70%, more preferably 5% to 65%, even more preferably 10% to 60% and very particularly preferably 10%, preferably 15%, to 50% of the mixture as a whole.

The combination of LC host mixtures and LC compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from the prior art.

The liquid-crystal mixture preferably has a nematic phase range of at least 80 K, particularly preferably at least 100 K, and a rotational viscosity of not greater than 250 mPa·s, preferably not greater than 200 mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds having negative dielectric anisotropy in accordance with the first preferred embodiment, in particular for use in displays of the PSA-VA type, have a negative dielectric anisotropy $\Delta\epsilon$, preferably from about −0.5 to −10, in particular from about −2.5 to 7.5, at 20° C. and 1 kHz.

The birefringence $\Delta n$ in LC media according to the invention for use in displays of the VA type is preferably less than 0.16, particularly preferably between 0.06 and 0.14, in particular between 0.07 and 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PSA-OCB type are preferably those based on compounds having positive dielectric anisotropy in accordance with the second preferred embodiments, and preferably have a positive dielectric anisotropy $\Delta\epsilon$ of about +4 to +17 at 20° C. and 1 kHz.

The birefringence $\Delta n$ in LC media according to the invention for use in displays of the OCB type is preferably between 0.14 and 0.22, in particular between 0.16 and 0.22.

LC media according to the invention, based on compounds having positive dielectric anisotropy in accordance with the second preferred embodiment, for use in displays of the PSA-TN, PSA-positive-VA, PSA-IPS or PSA-FFS type preferably have a positive dielectric anisotropy of between +2 and +30, in particular between +3 and +20.

The birefringence $\Delta n$ in LC media according to the invention for use in displays of the PSA-TN, PSA-positive-VA, PSA-IPS or PSA-FFS type is preferably between 0.07 and 0.15, in particular between 0.08 and 0.13.

The LC media according to the invention may also comprise further additives which are known to the person skilled in the art and are described in the literature, such as, for example, polymerisation initiators, inhibitors, stabilisers, surface-active substances, nanoparticles or chiral dopants. These may be polymerisable or non-polymerisable. Polymerisable additives are accordingly ascribed to the polymerisable component or component A). Non-polymerisable additives are accordingly ascribed to the non-polymerisable component or component B).

The LC media may, for example, comprise one or more chiral dopants, preferably those selected from the group consisting of compounds from Table B below.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes.

The structure of the LC displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PSA-VA displays are described, for example, in US 2006/0066793 A1.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)

TABLE A

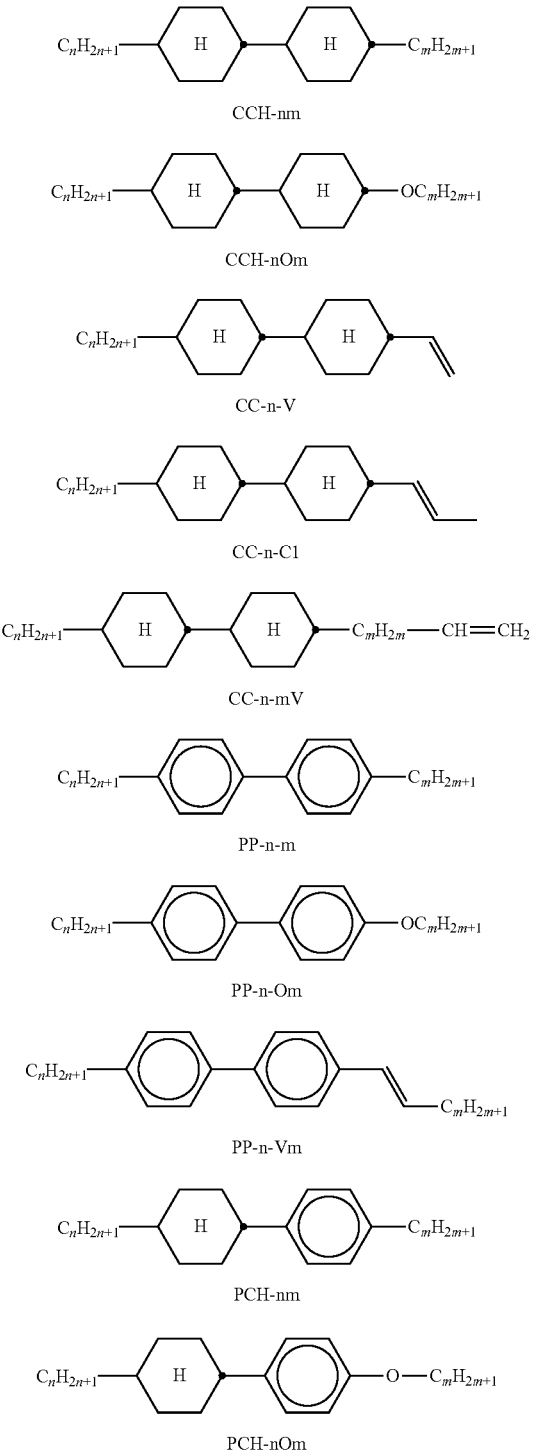

TABLE A-continued
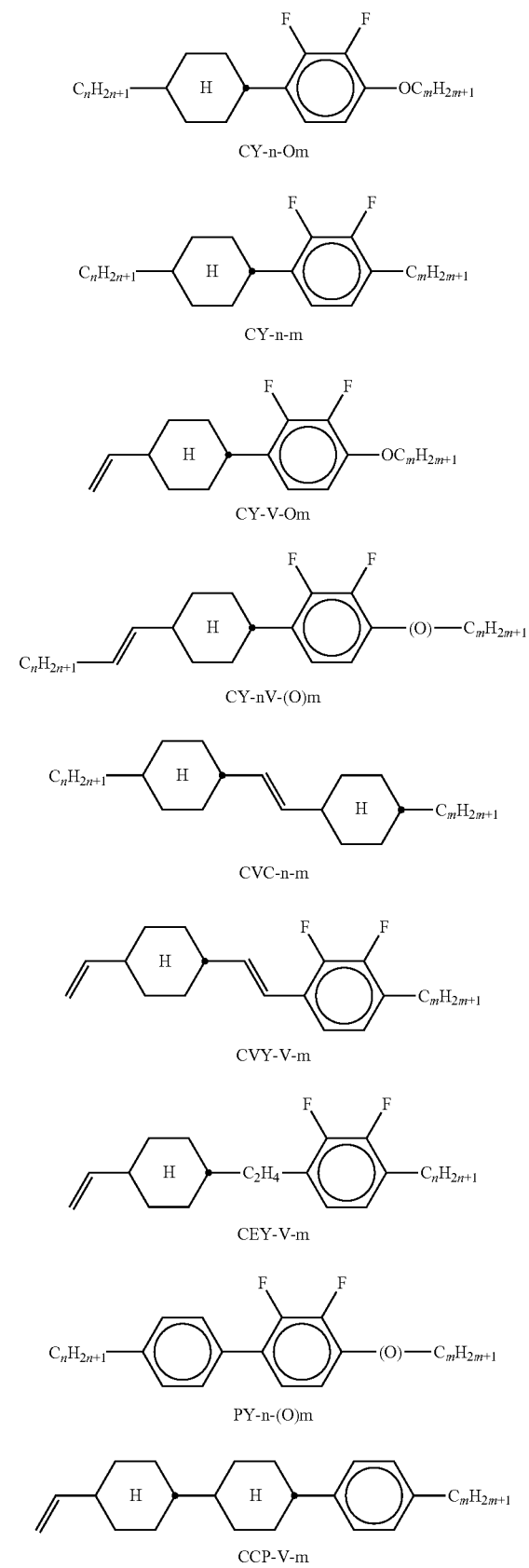

TABLE A-continued
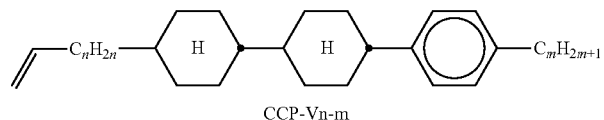
CCP-Vn-m
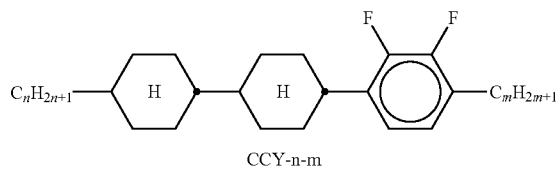
CCY-n-m
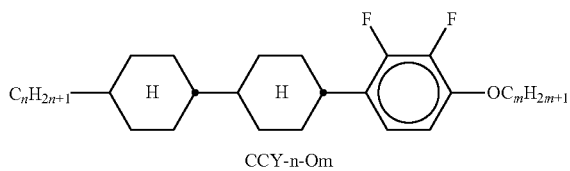
CCY-n-Om
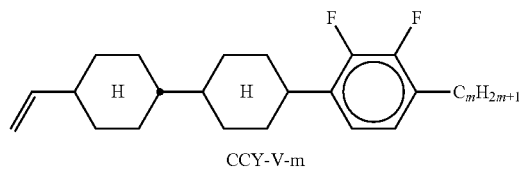
CCY-V-m
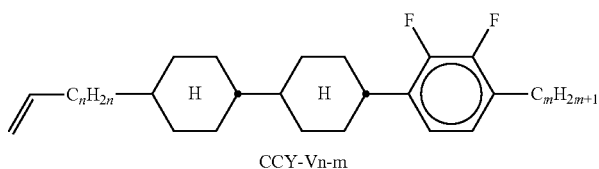
CCY-Vn-m
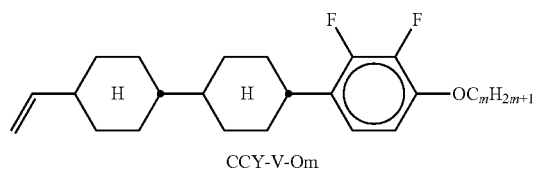
CCY-V-Om
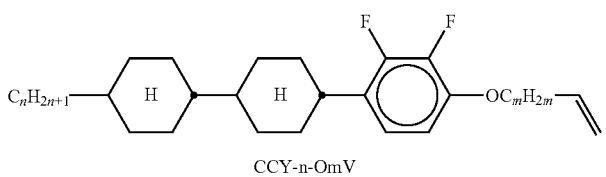
CCY-n-OmV
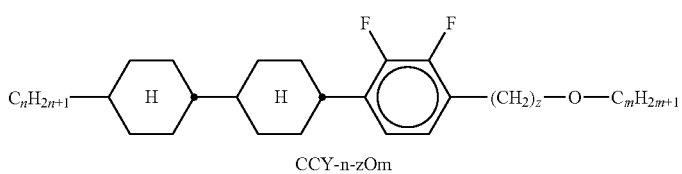
CCY-n-zOm
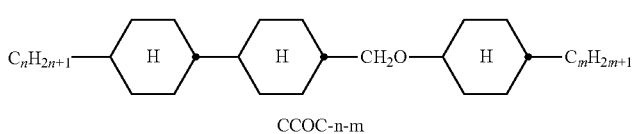
CCOC-n-m TABLE A-continued
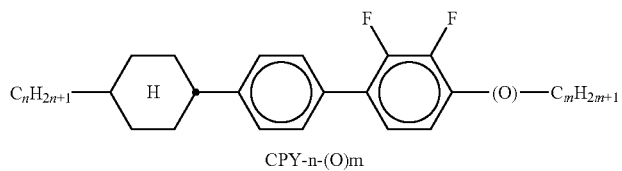
CPY-n-(O)m
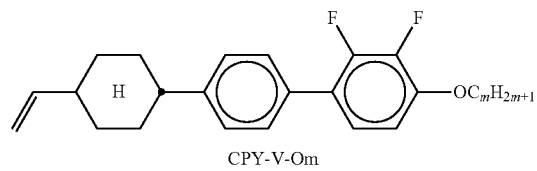
CPY-V-Om
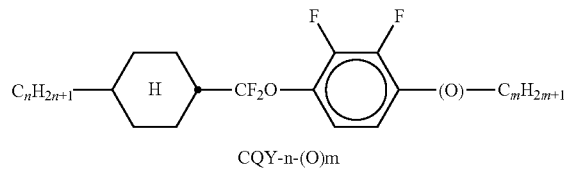
CQY-n-(O)m
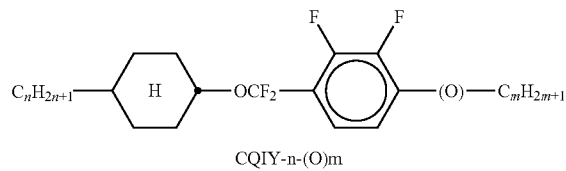
CQIY-n-(O)m
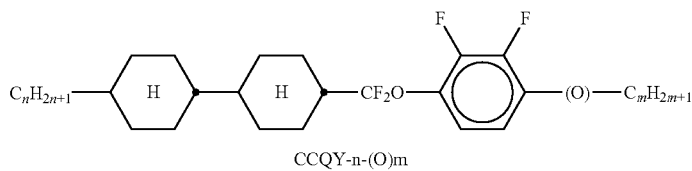
CCQY-n-(O)m
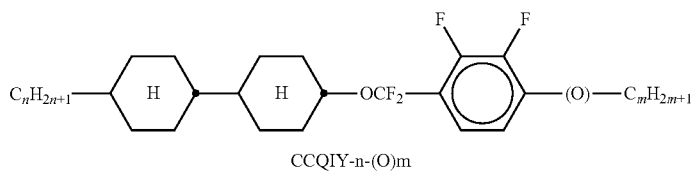
CCQIY-n-(O)m
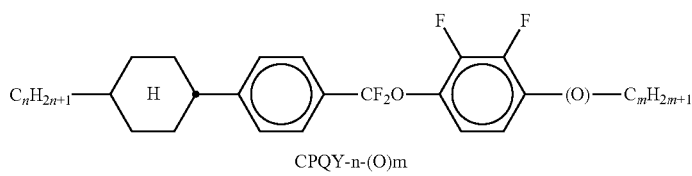
CPQY-n-(O)m
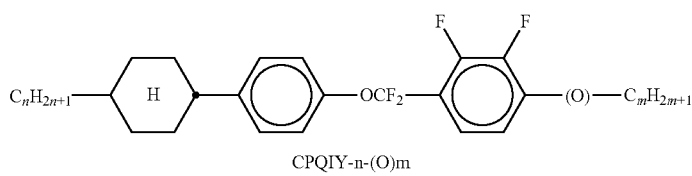
CPQIY-n-(O)m
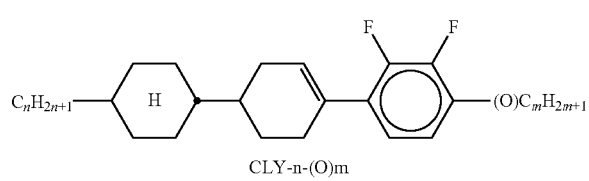
CLY-n-(O)m TABLE A-continued
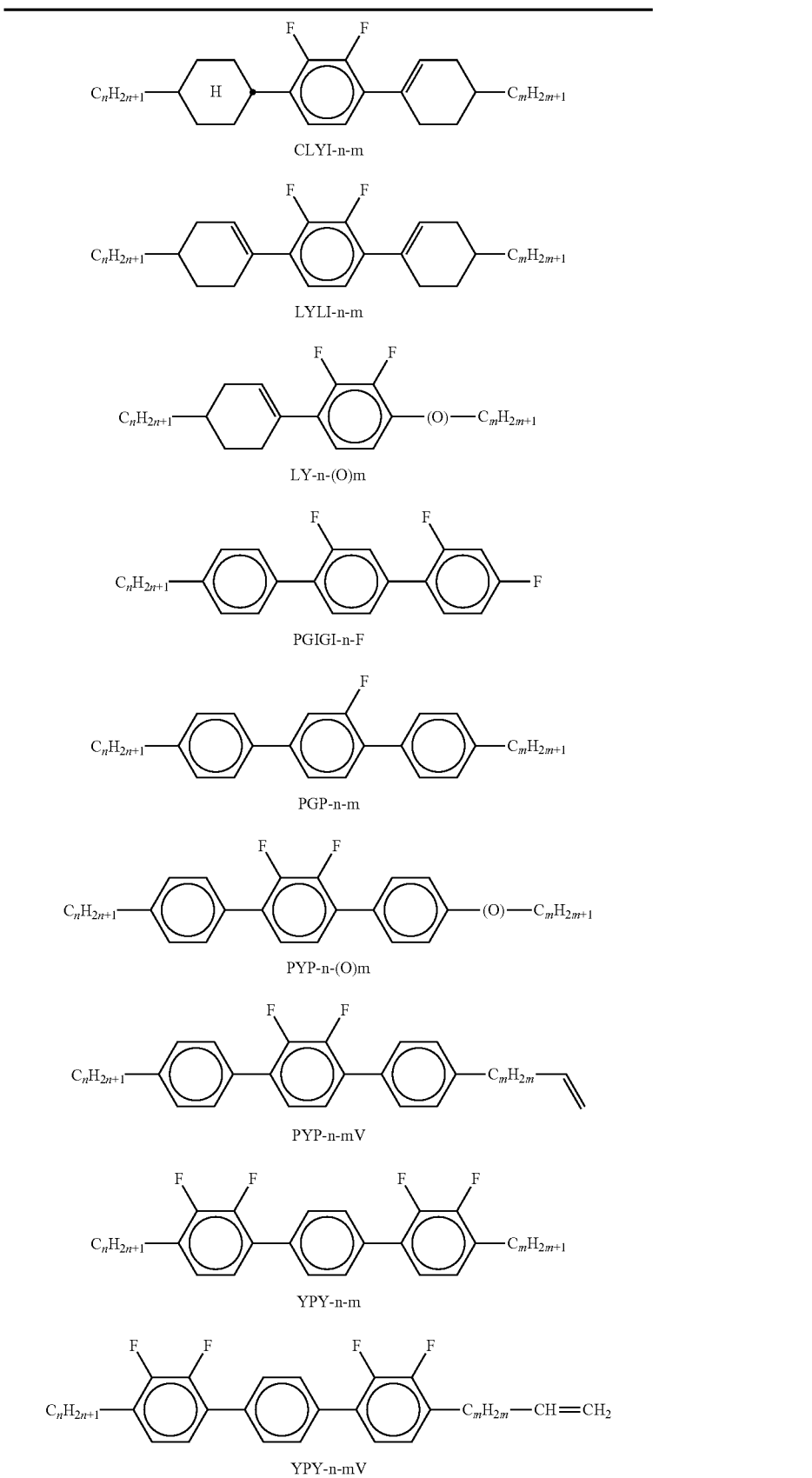

TABLE A-continued
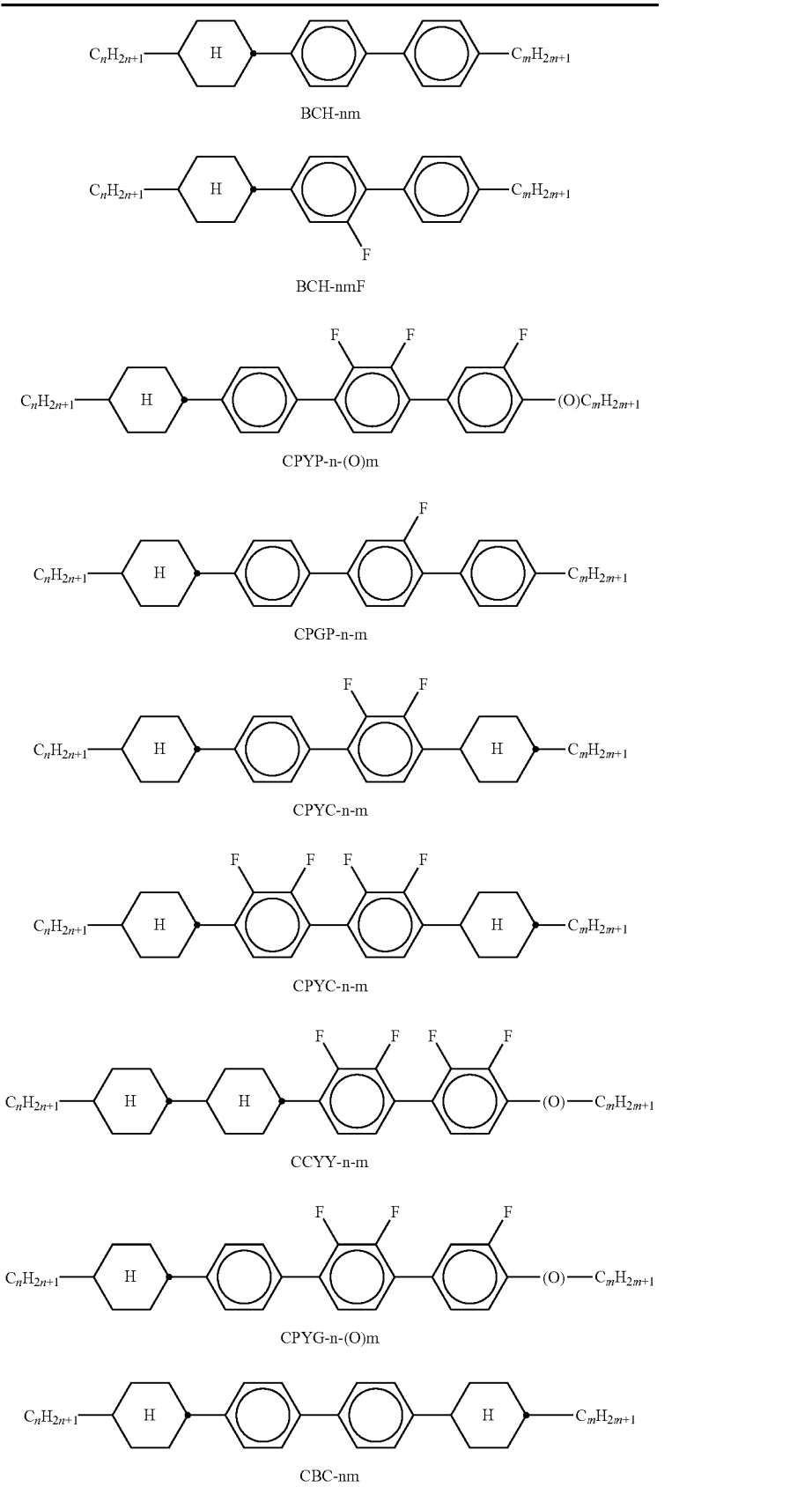

TABLE A-continued
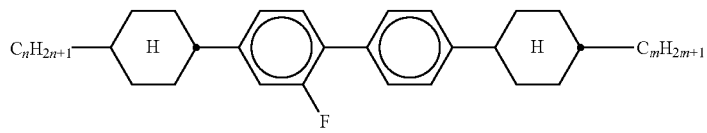
CBC-nmF
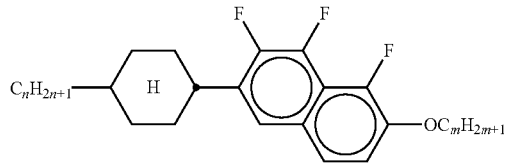
CNap-n-Om
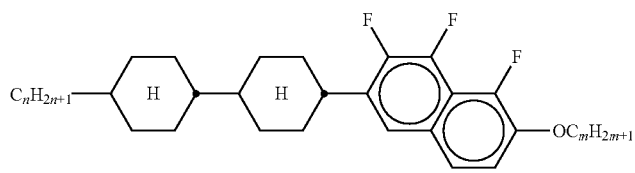
CCNap-n-Om
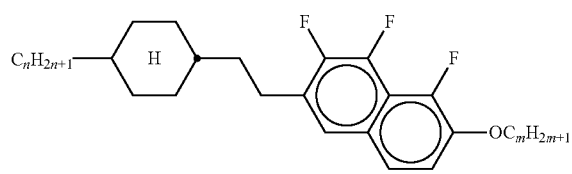
CENap-n-Om
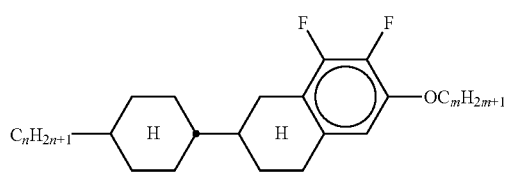
CTNap-n-Om
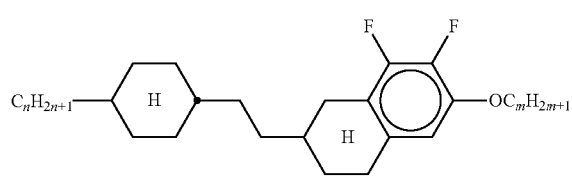
CETNap-n-Om
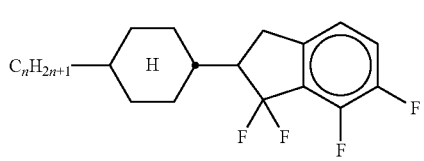
CK-n-F
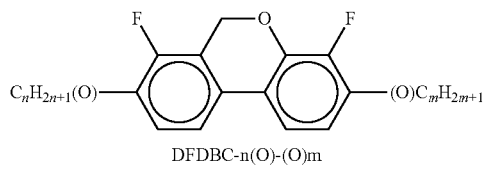
DFDBC-n(O)-(O)m TABLE A-continued
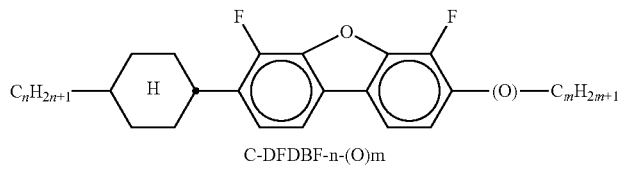
C-DFDBF-n-(O)m
In a preferred embodiment of the present invention, the LC media according to the invention comprise one or more compounds selected from the group consisting of compounds from Table A.
TABLE B
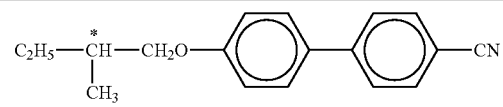
C 15
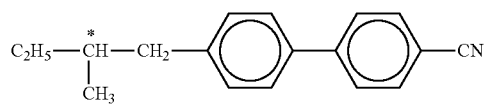
CB 15
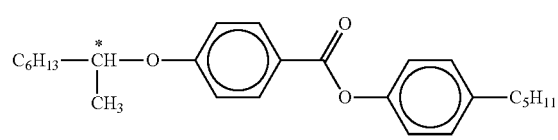
CM 21
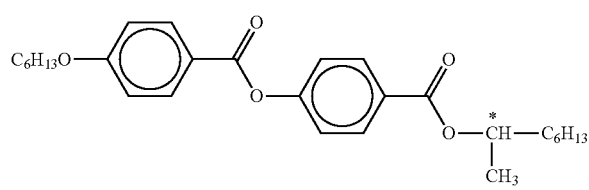
R/S-811
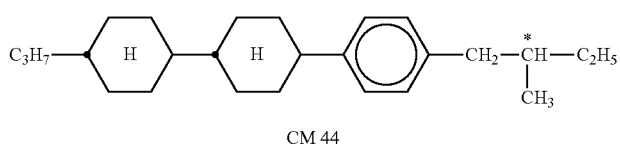
CM 44
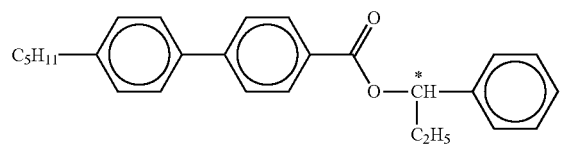
CM 45
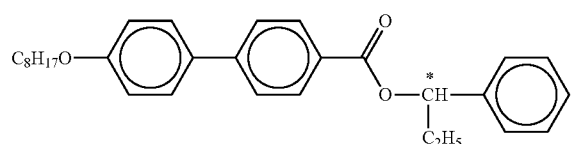
CM 47

TABLE B-continued

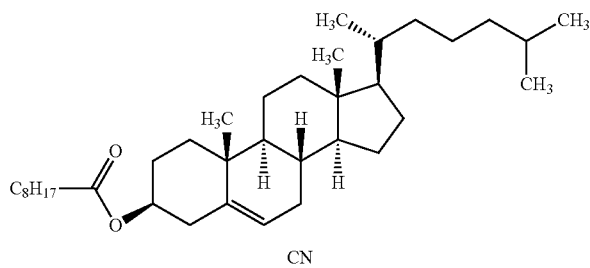
CN

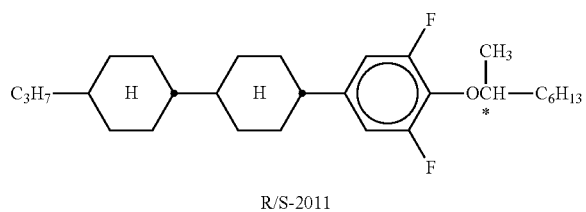
R/S-2011

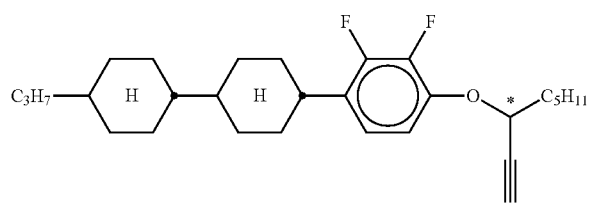
R/S-3011

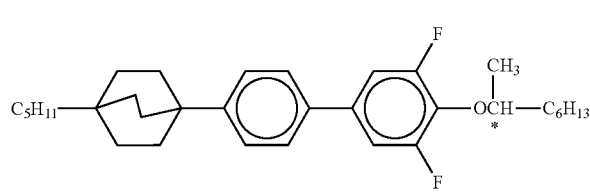
R/S-4011

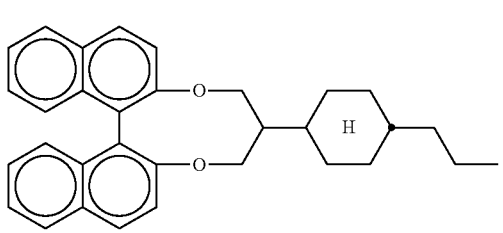
R/S-5011

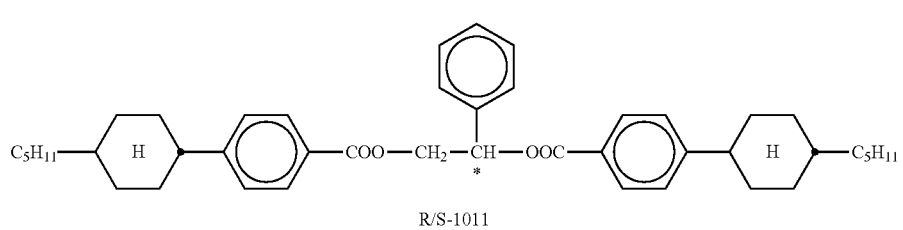
R/S-1011

Table B shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table B.

TABLE C
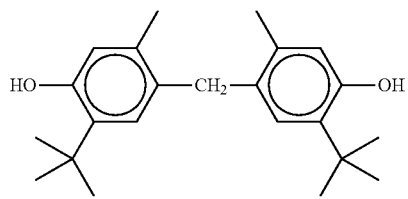
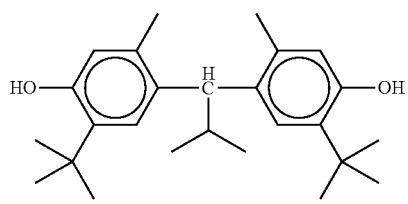
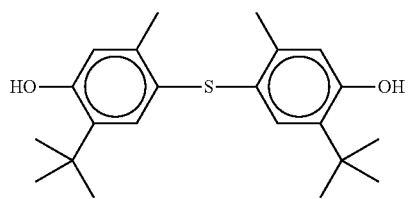
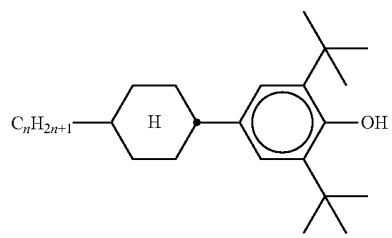
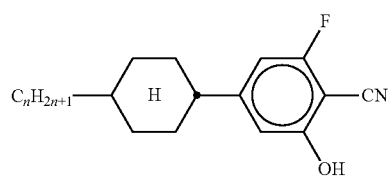
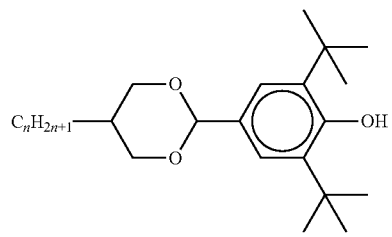
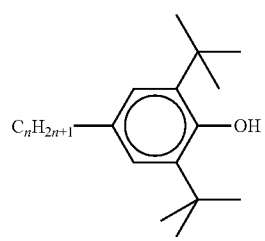

TABLE C-continued
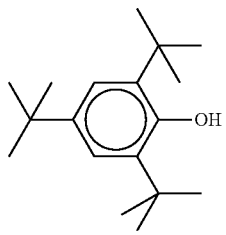
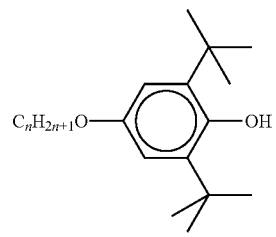
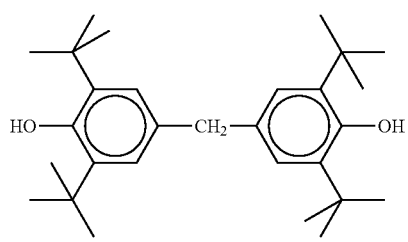
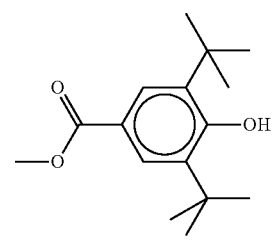
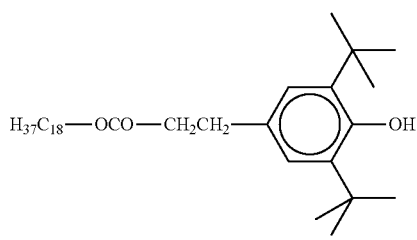
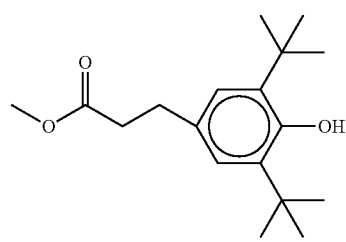

TABLE C-continued
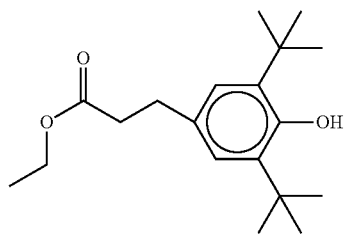
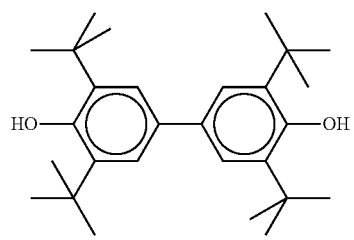
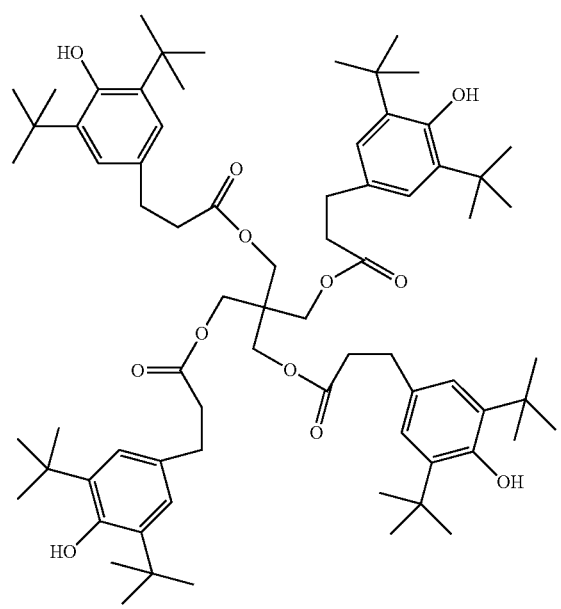 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]
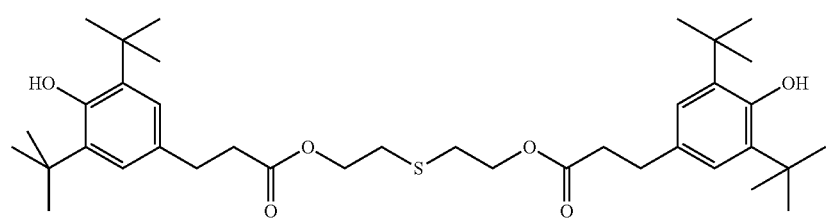 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

TABLE C-continued
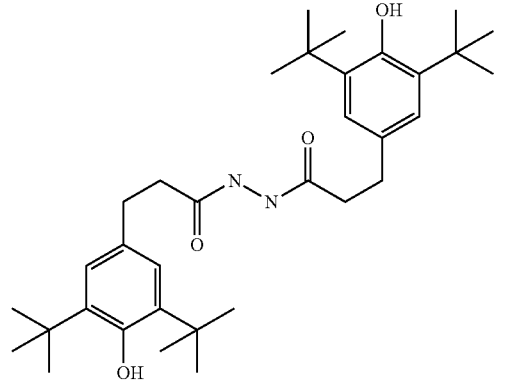 [SMILES: CC(C)(C)c1cc(CCC(=O)NNC(=O)CCc2cc(C(C)(C)C)c(O)c(C(C)(C)C)c2)cc(C(C)(C)C)c1O]
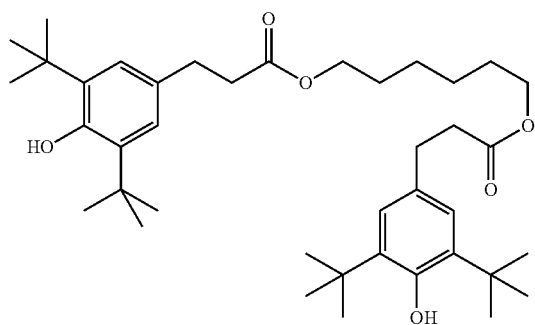 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
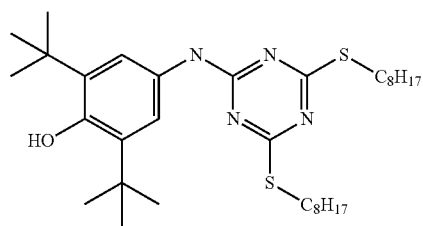
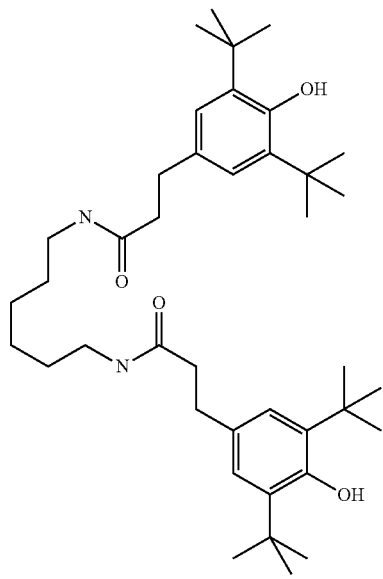 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

TABLE C-continued
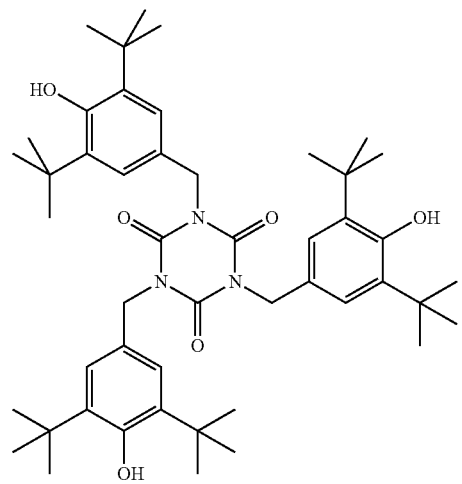 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
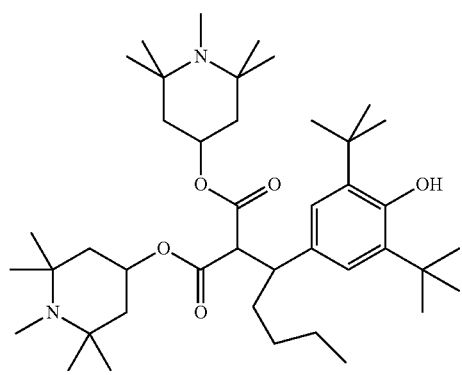 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]
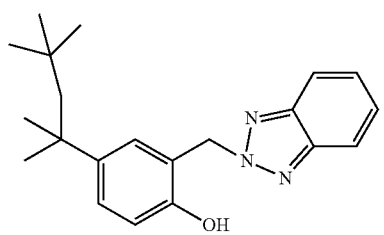 [SMILES: CC(C)(C)CC(C)(C)c1ccc(O)c(Cn2nc3ccccc3n2)c1]
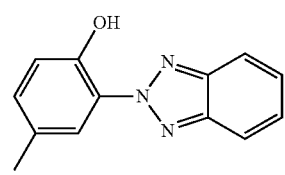 [SMILES: Cc1ccc(O)c(-n2nc3ccccc3n2)c1]
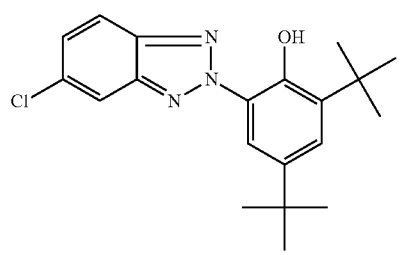 [SMILES: CC(C)(C)c1cc(-n2nc3ccc(Cl)cc3n2)c(O)c(C(C)(C)C)c1]

TABLE C-continued
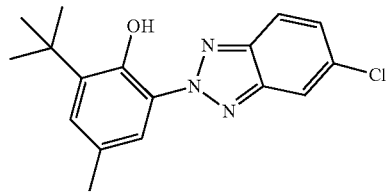 [SMILES: Cc1cc(-n2nc3ccc(Cl)cc3n2)c(O)c(C(C)(C)C)c1]
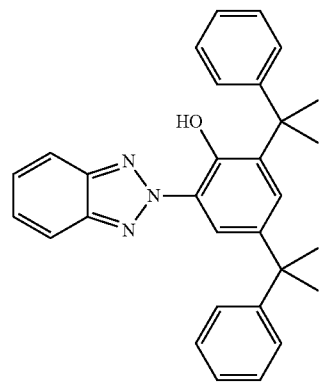 [SMILES: CC(C)(c1ccccc1)c1cc(-n2nc3ccccc3n2)c(O)c(C(C)(C)c2ccccc2)c1]
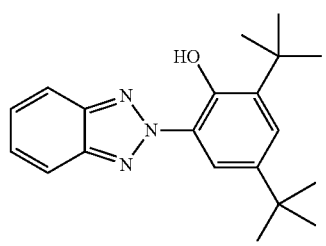 [SMILES: CC(C)(C)c1cc(-n2nc3ccccc3n2)c(O)c(C(C)(C)C)c1]
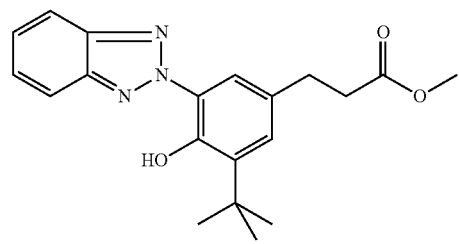 [SMILES: COC(=O)CCc1cc(-n2nc3ccccc3n2)c(O)c(C(C)(C)C)c1]
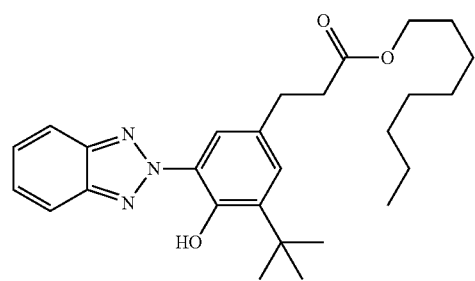 [SMILES: CCCCCCCCOC(=O)CCc1cc(-n2nc3ccccc3n2)c(O)c(C(C)(C)C)c1]

TABLE C-continued
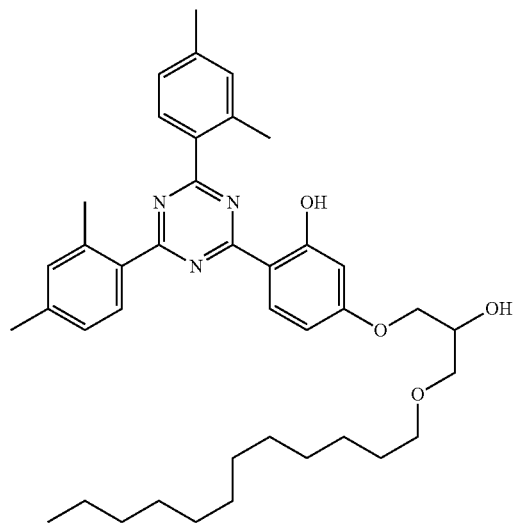 [SMILES: CCCCCCCCCCCCOCC(O)COc1ccc(-c2nc(-c3ccc(C)cc3C)nc(-c3ccc(C)cc3C)n2)c(O)c1]
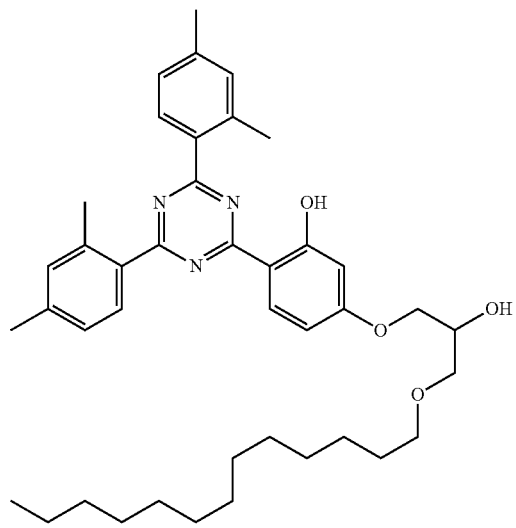 [SMILES: CCCCCCCCCCCCCOCC(O)COc1ccc(-c2nc(-c3ccc(C)cc3C)nc(-c3ccc(C)cc3C)n2)c(O)c1]
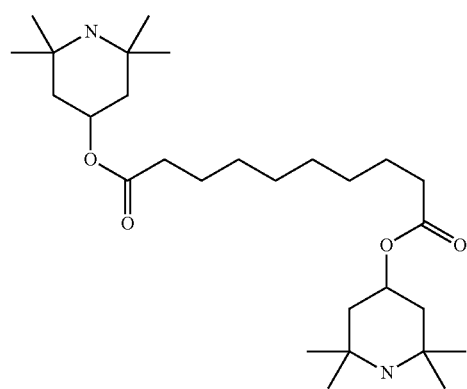

TABLE C-continued

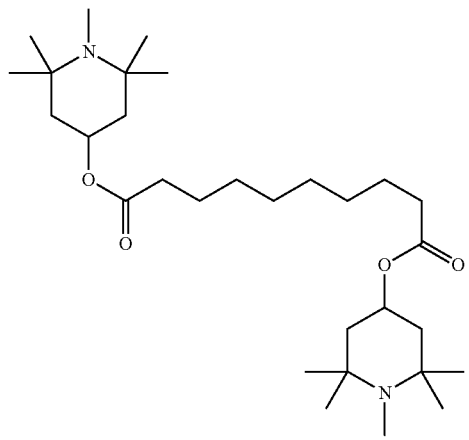

20

Table C shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table C.

TABLE D

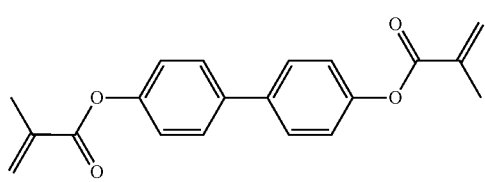 [SMILES: C=C(C)C(=O)Oc1ccc(-c2ccc(OC(=O)C(=C)C)cc2)cc1]

RM-1

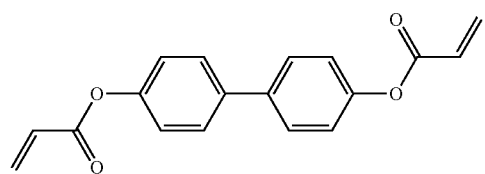 [SMILES: C=CC(=O)Oc1ccc(-c2ccc(OC(=O)C=C)cc2)cc1]

RM-2

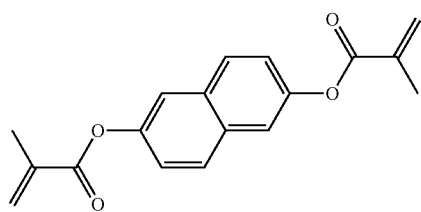 [SMILES: C=C(C)C(=O)Oc1ccc2cc(OC(=O)C(=C)C)ccc2c1]

RM-3

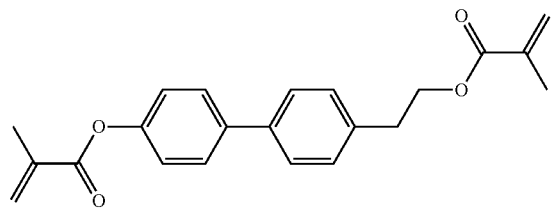 [SMILES: C=C(C)C(=O)OCCc1ccc(-c2ccc(OC(=O)C(=C)C)cc2)cc1]

RM-4

TABLE D-continued
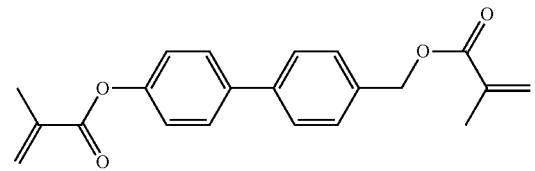 [SMILES: C=C(C)C(=O)OCc1ccc(-c2ccc(OC(=O)C(=C)C)cc2)cc1]
RM-5
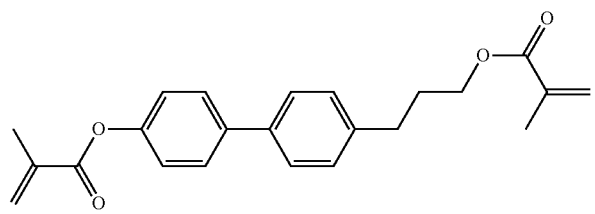 [SMILES: C=C(C)C(=O)OCCCc1ccc(-c2ccc(OC(=O)C(=C)C)cc2)cc1]
RM-6
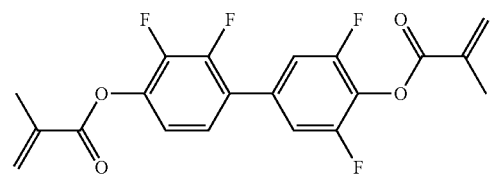 [SMILES: C=C(C)C(=O)Oc1ccc(-c2cc(F)c(OC(=O)C(=C)C)c(F)c2)c(F)c1F]
RM-7
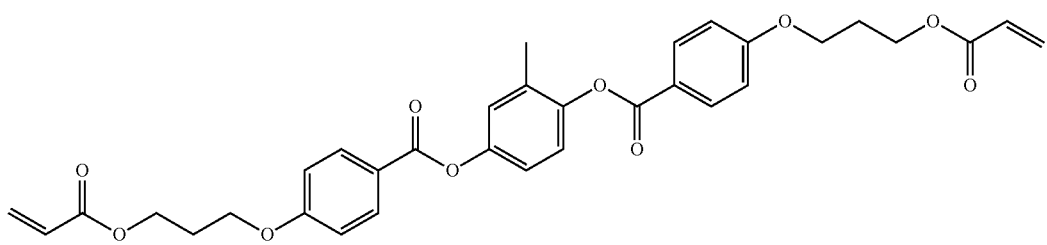 [SMILES: C=CC(=O)OCCCOc1ccc(C(=O)Oc2ccc(OC(=O)c3ccc(OCCCOC(=O)C=C)cc3)c(C)c2)cc1]
RM-8
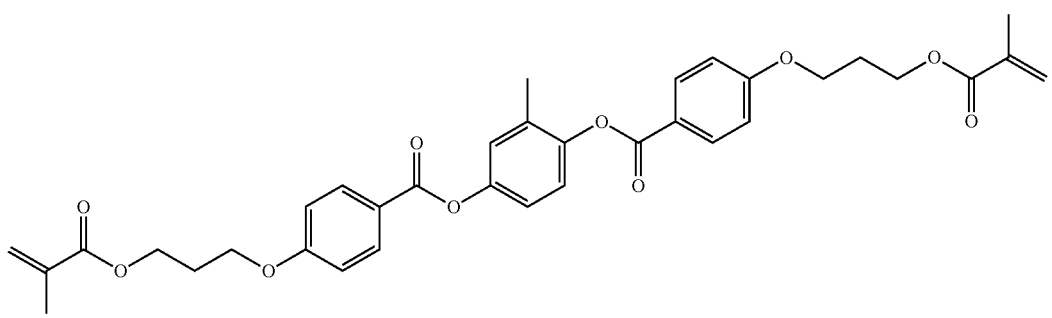 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-9
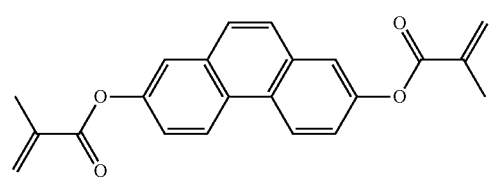 [SMILES: C=C(C)C(=O)Oc1ccc2c(ccc3cc(OC(=O)C(=C)C)ccc32)c1]
RM-10
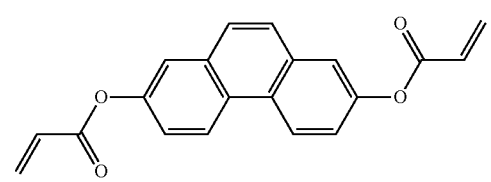 [SMILES: C=CC(=O)Oc1ccc2c(ccc3cc(OC(=O)C=C)ccc32)c1]
RM-11

TABLE D-continued
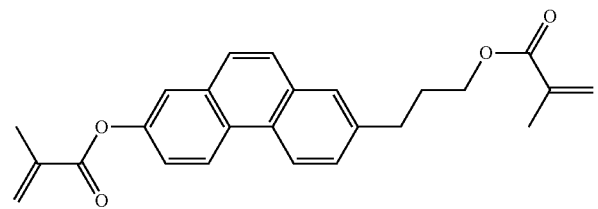 [SMILES: C=C(C)C(=O)OCCCc1ccc2c(ccc3cc(OC(=O)C(=C)C)ccc32)c1] RM-12
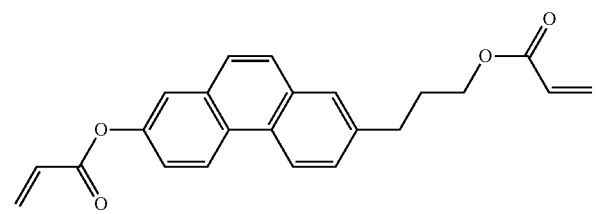 [SMILES: C=CC(=O)OCCCc1ccc2c(ccc3cc(OC(=O)C=C)ccc32)c1] RM-13
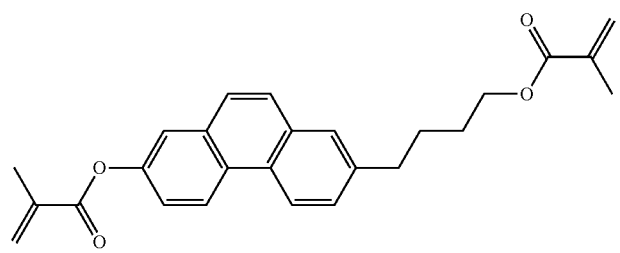 [SMILES: C=C(C)C(=O)OCCCCc1ccc2c(ccc3cc(OC(=O)C(=C)C)ccc32)c1] RM-14
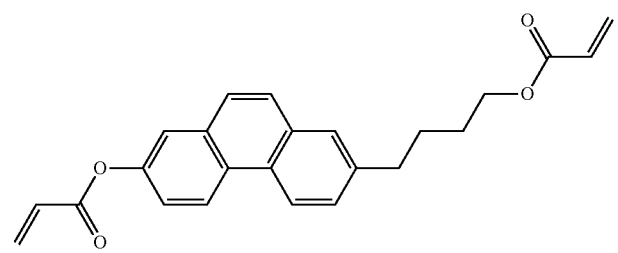 [SMILES: C=CC(=O)OCCCCc1ccc2c(ccc3cc(OC(=O)C=C)ccc32)c1] RM-15
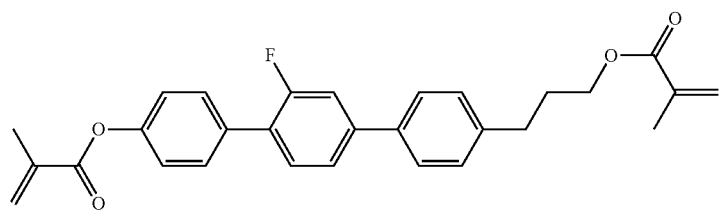 [SMILES: C=C(C)C(=O)OCCCc1ccc(-c2ccc(-c3ccc(OC(=O)C(=C)C)cc3)c(F)c2)cc1] RM-16
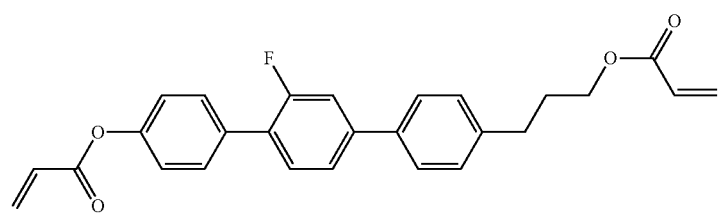 [SMILES: C=CC(=O)OCCCc1ccc(-c2ccc(-c3ccc(OC(=O)C=C)cc3)c(F)c2)cc1] RM-17
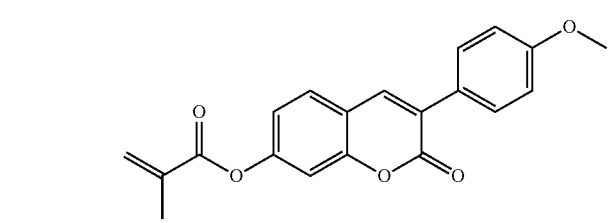 [SMILES: C=C(C)C(=O)Oc1ccc2cc(-c3ccc(OC)cc3)c(=O)oc2c1] RM-18

TABLE D-continued
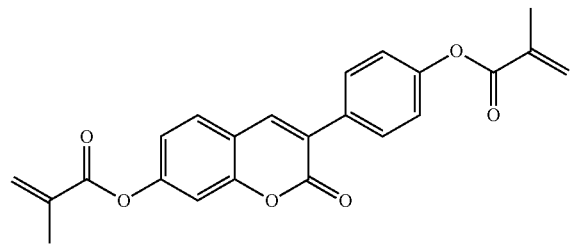 [SMILES: C=C(C)C(=O)Oc1ccc(-c2cc3ccc(OC(=O)C(=C)C)cc3oc2=O)cc1] RM-19
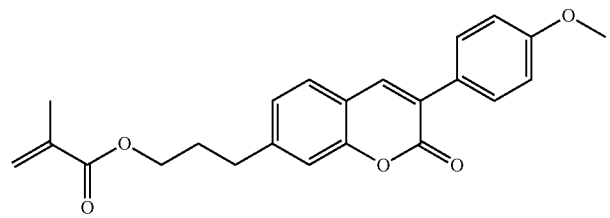 [SMILES: C=C(C)C(=O)OCCCc1ccc2cc(-c3ccc(OC)cc3)c(=O)oc2c1] RM-20
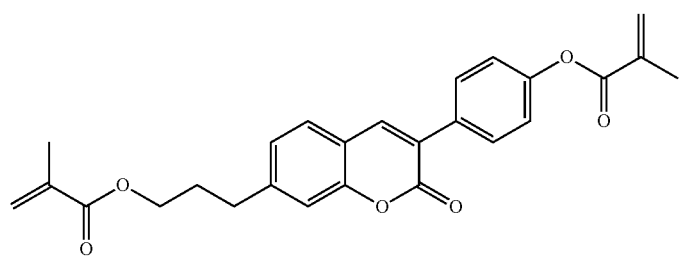 [SMILES: C=C(C)C(=O)OCCCc1ccc2cc(-c3ccc(OC(=O)C(=C)C)cc3)c(=O)oc2c1] RM-21
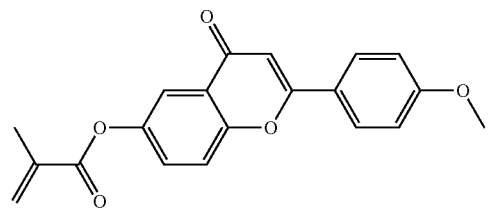 [SMILES: C=C(C)C(=O)Oc1ccc2oc(-c3ccc(OC)cc3)cc(=O)c2c1] RM-22
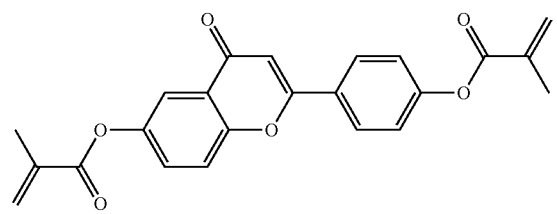 [SMILES: C=C(C)C(=O)Oc1ccc(-c2cc(=O)c3cc(OC(=O)C(=C)C)ccc3o2)cc1] RM-23
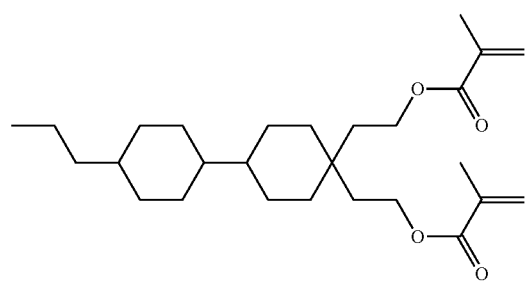 [SMILES: C=C(C)C(=O)OCCC1(CCOC(=O)C(=C)C)CCC(C2CCC(CCC)CC2)CC1] RM-24

TABLE D-continued
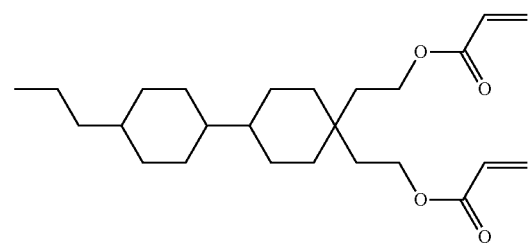 [SMILES: C=CC(=O)OCCC1(CCOC(=O)C=C)CCC(C2CCC(CCC)CC2)CC1]
RM-25
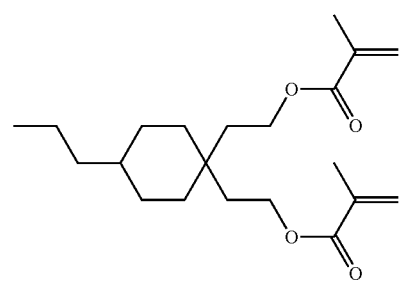 [SMILES: C=C(C)C(=O)OCCC1(CCOC(=O)C(=C)C)CCC(CCC)CC1]
RM-26
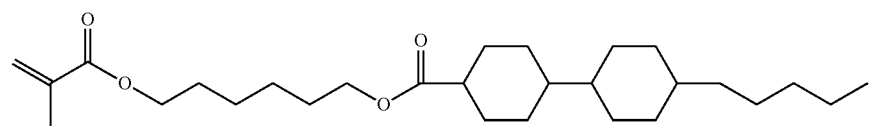 [SMILES: C=C(C)C(=O)OCCCCCCOC(=O)C1CCC(C2CCC(CCCCC)CC2)CC1]
RM-27
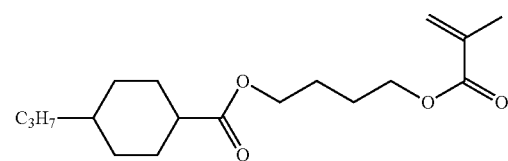
RM-28
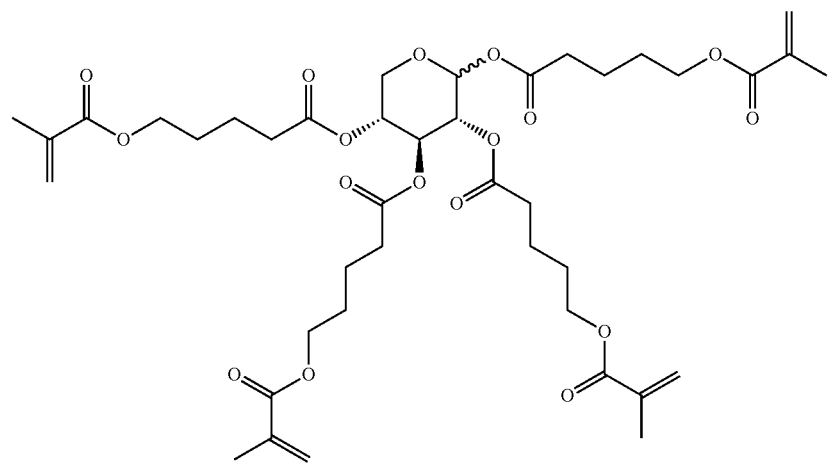 [SMILES: C=C(C)C(=O)OCCCCC(=O)OC1OC[C@@H](OC(=O)CCCCOC(=O)C(=C)C)[C@H](OC(=O)CCCCOC(=O)C(=C)C)[C@H]1OC(=O)CCCCOC(=O)C(=C)C]
RM-29

TABLE D-continued

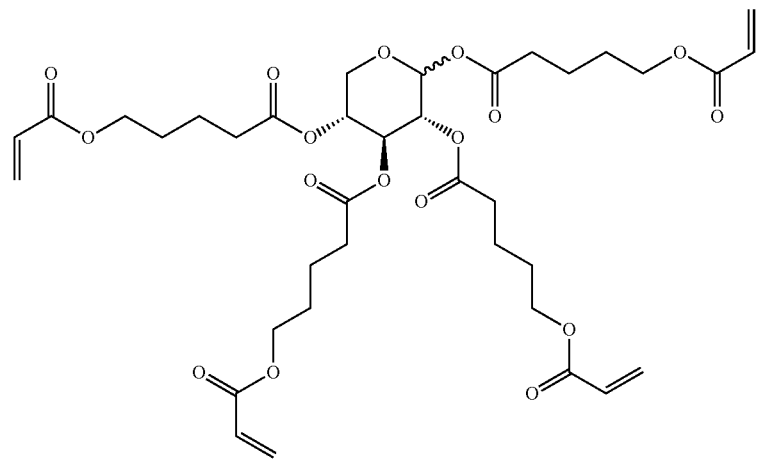 [SMILES: C=CC(=O)OCCCCC(=O)OC1OC[C@@H](OC(=O)CCCCOC(=O)C=C)[C@H](OC(=O)CCCCOC(=O)C=C)[C@H]1OC(=O)CCCCOC(=O)C=C]
RM-30

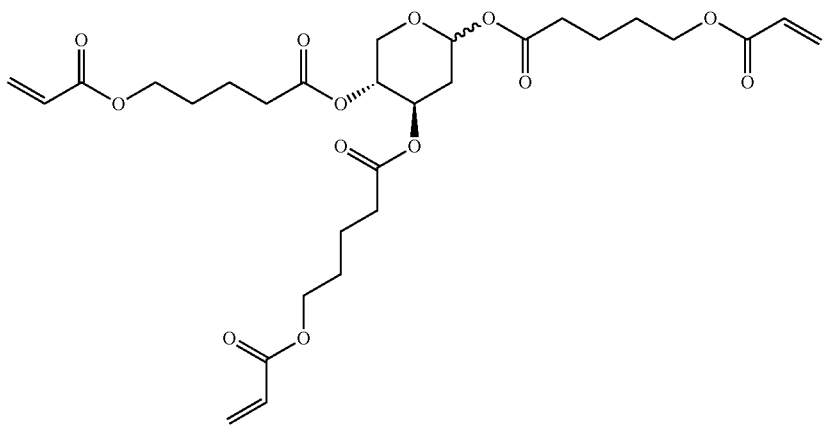 [SMILES: C=CC(=O)OCCCCC(=O)OC1C[C@@H](OC(=O)CCCCOC(=O)C=C)[C@H](OC(=O)CCCCOC(=O)C=C)CO1]
RM-31

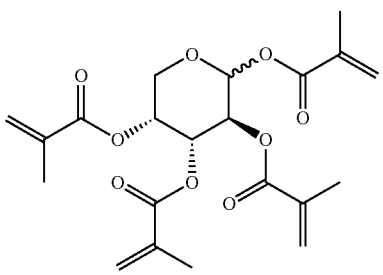 [SMILES: C=C(C)C(=O)OC1OC[C@@H](OC(=O)C(=C)C)[C@@H](OC(=O)C(=C)C)[C@@H]1OC(=O)C(=C)C]
RM-32

Table D shows illustrative compounds which can be used in the LC media in accordance with the present invention, preferably as reactive mesogenic compounds.

In a preferred embodiment of the present invention, the mesogenic media comprise one or more compounds selected from the group of the compounds from Table D.

In addition, the following abbreviations and symbols are used:
$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta \epsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and Δn is determined at 589 nm and Δ∈ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($c1_0$).

The display used for measurement of the capacitive threshold voltage consists of two plane-parallel glass outer plates at a separation of 20 μm, each of which has on the inside an electrode layer and an unrubbed polyimide alignment layer on top, which effect a homeotropic edge alignment of the liquid-crystal molecules.

The display or test cell used for measurement of the tilt angles consists of two plane-parallel glass outer plates at a separation of 4 μm, each of which has on the inside an electrode layer and a polyimide alignment layer on top, where the two polyimide layers are rubbed antiparallel to one another and effect a homeotropic edge alignment of the liquid-crystal molecules.

The polymerisable compounds are polymerised in the display or test cell by irradiation with UVA light (usually 365 nm) of defined intensity for a prespecified time, with a voltage simultaneously being applied to the display (usually 10 V to 30 V alternating current, 1 kHz). In the examples, unless indicated otherwise, a 28 mW/cm² mercury vapour lamp is used, and the intensity is measured using a standard UV meter (model Ushio UNI meter) fitted with a 365 nm band-pass filter.

The tilt angle is determined by crystal rotation experiment (Autronic-Melchers TBA-105). A low value (i.e. a large deviation from the 90° angle) corresponds to a large tilt here.

The VHR value is measured as follows: 0.3% of a polymerisable monomeric compound is added to the LC host mixture, and the resultant mixture is introduced into TN-VHR test cells (rubbed at 90°, TN-polyimide alignment layer, layer thickness d≈6 μm). The HR value is determined after 5 min at 100° C. before and after UV exposure for 2 h (suntest) at 1 V, 60 Hz, 64 μs pulse (measuring instrument: Autronic-Melchers VHRM-105).

In order to investigate the low-temperature stability, also referred to as "LTS", i.e. the stability of the LC mixture to individual components spontaneously crystallizing out at low temperatures, bottles containing 1 g of LC/RM mixture are placed in storage at −10° C., and it is regularly checked whether the mixtures have crystallised out.

EXAMPLE 1

Compound 1 is prepared as follows:

1.1 3-(4-Bromophenyl)propan-1-ol

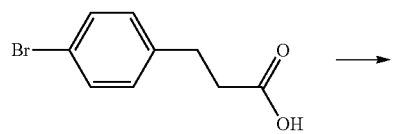

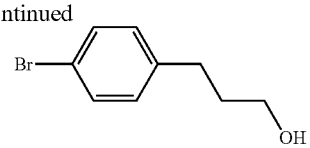

30.0 g (0.128 mol) of 3-(4-bromophenyl)propionic acid are initially introduced in 300 ml of THF, and 257 ml (0.257 mol) of a 1 M solution of boron hydride in THF are added dropwise with ice cooling. The batch is left to stir overnight at room temp., carefully hydrolysed with cooling, and extracted three times with MTB ether. The combined org. phases are washed with sat. sodium chloride solution and dried over sodium sulfate. The solvent is removed in vacuo, and the residue is filtered through silica gel with MTB ether, giving 3-(4-bromophenyl)propan-1-ol, which is employed in the next step without further purification.

1.2 3-[4-(4,4,5,5-Tetramethyl-1,3,2-dioxaborolan-2-yl)phenyl]propan-1-ol 26.5 g (0.123 mol) of 3-(4-bromophenyl)propan-1-ol and 36.0 g (0.139 mol) of bis(pinacolato)diboron are dissolved in 400 ml of dioxane and, after addition of 36.5 g (0.372 mol) of potassium acetate and 2.80 (3.82 mmol) of [1,1'-bis(diphenylphosphino)ferrocene]palladium(II) dichloride, heated under reflux overnight. The batch is subsequently acidified using dil. hydrochloric acid and extracted three times with MTB ether. The combined org. phases are washed with water, dried over sodium sulfate and evaporated in vacuo. The residue is filtered through silica gel with heptane/MTB ether (4:1), and residues of bis(pinacolato)diboron are removed at 160° C. in a fine vacuum, giving 3-[4-(4,4,5,5-tetramethyl-1,3,2-dioxaborolan-2-yl)phenyl]propan-1-ol as a yellow oil which is sufficiently pure for further reactions.

1.3 3-(4'-Bromo-3'-fluorobiphenyl-4-yl)propan-1-ol

-continued

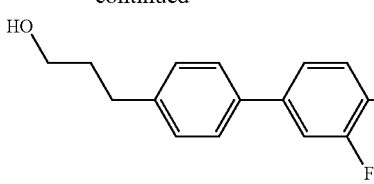

18 g (65 mmol) of sodium metaborate octahydrate and 2.8 g (3.9 mmol) of bis(triphenylphosphine)palladium(II) chloride are initially introduced in 200 ml of water and 100 ml of THF, 1-bromo-2-fluoro-4-iodobenzene are added, and a solution of 21.5 g (0.082 mol) of 3-[4-(4,4,5,5-tetramethyl-1,3,2-dioxaborolan-2-yl)phenyl]propan-1-ol in 100 ml THF is subsequently added dropwise. The batch is heated under reflux overnight, taken up in MTB ether and washed three times with water. The org. phase is dried over sodium sulfate, and the solvent is removed in vacuo. Chromatography of the crude product on silica gel with toluene/ethyl acetate (7:1) gives 3-(4'-bromo-3'-fluorobiphenyl-4-yl)propan-1-ol as a colourless oil.

$^1$H-NMR (300 MHz, CDCl$_3$):

δ=1.93 ppm (m$_c$, 2H, CH$_2$), 2.76 (dd, J=7.4 Hz, J=8.7 Hz, 2H, Ar—CH$_2$—), 3.71 (dd, J=6.1 Hz, J=11.2 Hz, 2H, —CH$_2$OH), 7.2-7.4 (m, 4H, Ar—H), 7.47 (AB-m$_c$, 2H, Ar—H), 7.57 (dd, J=7.3 Hz, J=8.3 Hz, 1H, Ar—H).

1.4 2,2'-Difluoro-4"-(3-hydroxypropyl)-[1,1';4',1"]terphenyl-4-ol

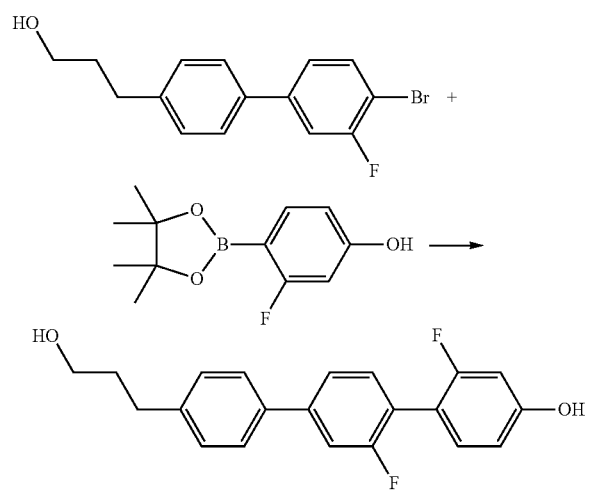

16.5 g (59 mmol) of sodium metaborate octahydrate and 1.3 g (1.8 mmol) of bis(triphenylphosphine)palladium(II) chloride are initially introduced in 150 ml of water and 50 ml of THF, 12.5 g (38.5 mmol) of 3-(4'-bromo-3'-fluorobiphenyl-4-yl)propan-1-ol are added, and a solution of 12.5 g (0.053 mol) of 3-fluoro-4-(4,4,5,5-tetramethyl-1,3,2-dioxaborolan-2-yl)-phenol in 50 ml of THF is subsequently added dropwise. The batch is heated under reflux overnight, taken up in MTB ether and washed three times with water. The org. phase is dried over sodium sulfate, the solvent is removed in vacuo, and the crude product is recrystallised from toluene/ethyl acetate (9:1), giving 2,2'-difluoro-4"-(3-hydroxypropyl)[1,1';4',1"]-terphenyl-4-ol as colourless crystals.

1.5 2,2'-Difluoro-4"-[3-(2-methylacryloyloxy)propyl]-[1,1';4',1"]terphenyl-4-yl 2-methylacrylate (1)

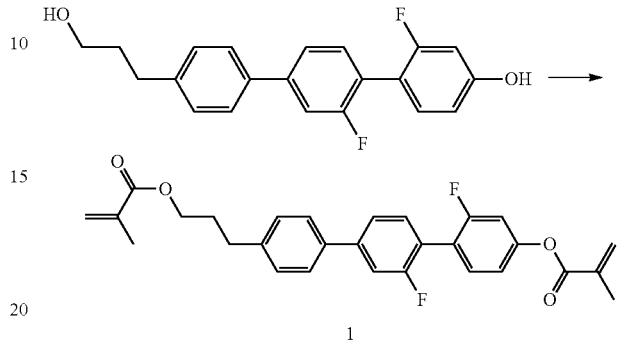

3.0 g (8.81 mmol) of 2,2'-difluoro-4"-(3-hydroxypropyl)[1,1';4',1"]terphenyl-4-ol are initially introduced in 60 ml of dichloromethane, 4 ml of trethylamine are added, and a solution of 2.2 ml (22.5 mmol) of acryloyl chloride in 5 ml of dichloromethane is added dropwise with ice cooling. The cooling is removed, and the batch is left to stir at room temp. for 3 h. The solution is subsequently filtered through silica gel, evaporated, and the residue is recrystallised from ethanol, giving 2,2'-difluoro-4"-[3-(2-methylacryloyloxy)-propyl][1,1';4',1"]terphenyl-4-yl 2-methylacrylate (1) as colourless crystals of m.p. 67° C.

EXAMPLE 2

Compound 2 is prepared as follows:

2.1 2'-Fluoro-4"-(3-hydroxypropyl)[1,1';4',1"]terphenyl-4-ol

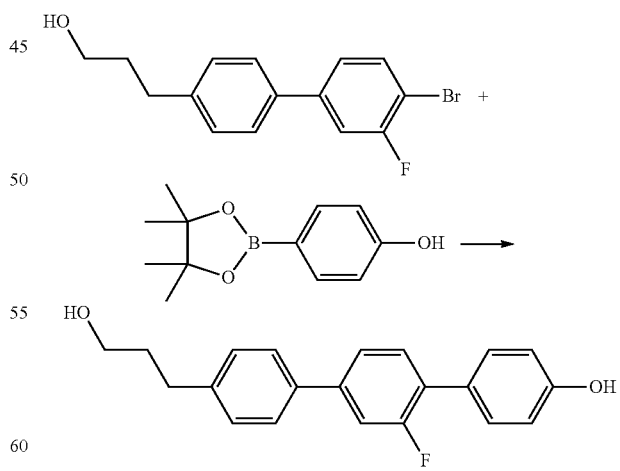

Analogously to the synthesis described under 1.4, 2'-fluoro-4"-(3-hydroxypropyl)[1,1';4',1"]terphenyl-4-ol is obtained as colourless solid from 3-(4'-bromo-3'-fluorobiphenyl-4-yl)propan-1-ol and 4-(4,4,5,5-tyetramethyl-1,3,2-dioxaborolan-2-yl)phenol.

$^1$H-NMR (400 MHz, DMSO-d$_6$)
δ=1.80 ppm (m$_c$, 2H, CH$_2$), 2.71 (7, J=7.8 Hz, 2H, Ar—CH$_2$—), 3.71 (7, J=6.5 Hz, 2H, —CH$_2$OH), 4.53 (s, br. 1H, OH), 6.93 (AB-m$_c$, 2H, Ar—H), 7.35 (d, J=8.25, 2H, Ar—H), 7.47 (AB-dd, J=1.5 Hz, J=8.6 Hz, 2H, Ar—H), 7.54-7.64 (m, 3H, Ar—H), 7.70 (d, J=8.3 Hz, 2H, Ar—H), 9.70 (s, 1H, Ar—OH).

2.2 2'-Fluoro-4"-[3-(2-methylacryloyloxy)propyl][1,1';4',1"]terphenyl-4-yl 2-methylacrylate (2)

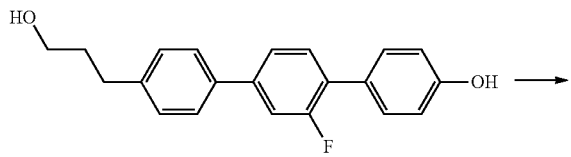

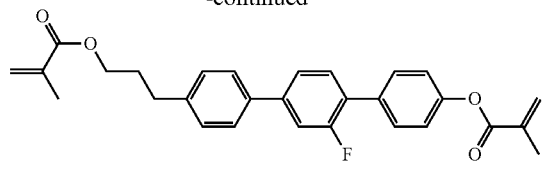

2

Analogously to Example 1, 2'-fluoro-4"-[3-(2-methylacryloyloxy)propyl]-[1,1';4',1"]terphenyl-4-yl 2-methylacrylate (2) is obtained as colourless crystals of m.p. 76° C. from 2'-fluoro-4"-(3-hydroxypropyl)-[1,1';4',1"]terphenyl-4-ol.

EXAMPLES 3-7

The following compounds are prepared analogously to the processes described in Examples 1 and 2:

3

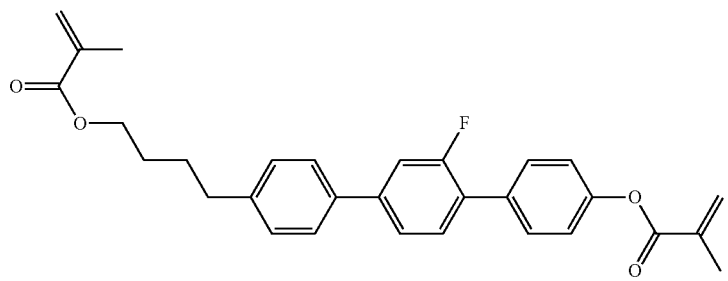

C 80 SmB 83 SmA 139 I

4

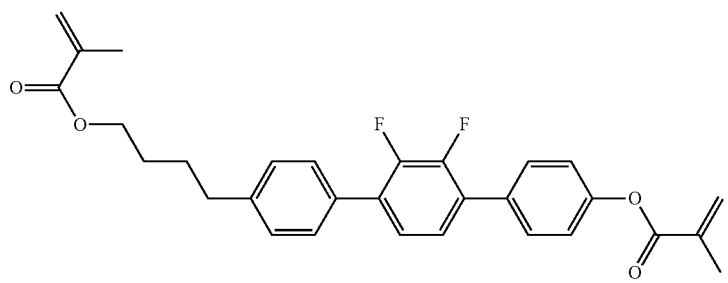

C 102 N 115.3 I

5

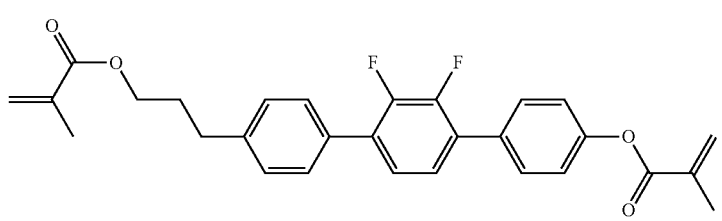

C 91 SmA (75) N 100.3 I

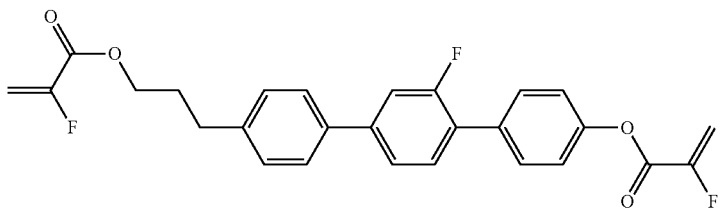

Tg C 95

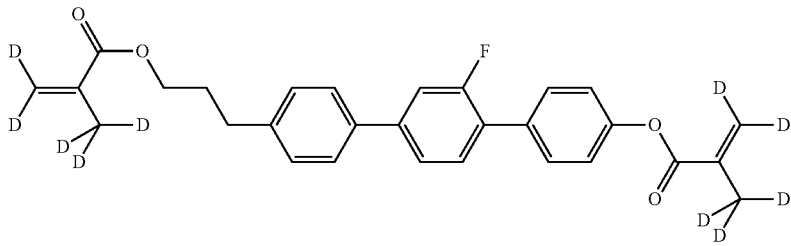

(in which D denotes deuterium)

MIXTURE EXAMPLE A

The nematic LC mixture N1 is formulated as follows:

| | | | |
|---|---|---|---|
| CCH-501 | 9.00% | Cl.p. | +70.0 |
| CCH-35 | 14.00% | $\Delta n$ | 0.0825 |
| PCH-53 | 8.00% | $\Delta \epsilon$ | −3.5 |
| CY-3-O4 | 14.00% | $\epsilon_\|$ | 3.5 |
| CY-5-O4 | 13.00% | $K_3/K_1$ | 1.00 |
| CCY-3-O2 | 8.00% | $\gamma$ | 141 |
| CCY-5-O2 | 8.00% | $V_0$ | 2.06 |
| CCY-2-1 | 9.00% | | |
| CCY-3-1 | 9.00% | | |
| CPY-2-O2 | 8.00% | | |

In each case. 0.3% of a polymerisable monomer of the formula 1, 2, 3, 4, 5 or 6 from Examples 1-6 is added to LC mixture N1.

The mixtures prepared in this way are introduced into VA e/o test cells (rubbed antiparallel, VA-polyimide alignment layer, layer thickness d≈4 µm). The cells are irradiated with UV light having an intensity of 50 mW/cm² for the time indicated with application of a voltage of 24 V (alternating current), causing polymerisation of the monomeric compound. The tilt angle is determined before and after the UV irradiation by a crystal rotation experiment (Autronic-Melchers TBA-105).

In order to determine the polymerisation rate, the residual content of unpolymerised monomer (in % by weight) in the test cells after various exposure times is measured by the HPLC method. To this end, each mixture is polymerised in the test cell under the conditions indicated. The mixture is then rinsed out of the test cell using MEK (methyl ethyl ketone) and measured.

In addition, the LC phase properties of the LC media comprising LC mixture N1 and monomer 1 or 2 are determined by DSC measurement, as are the LTS at −10° C. and the VHR values before and after suntest exposure for 2 h, as indicated above.

For comparative purposes, the experiments described below are carried out with the polymerisable compounds C1 and C2 known from the prior art (for example WO 2009/030329 A1).

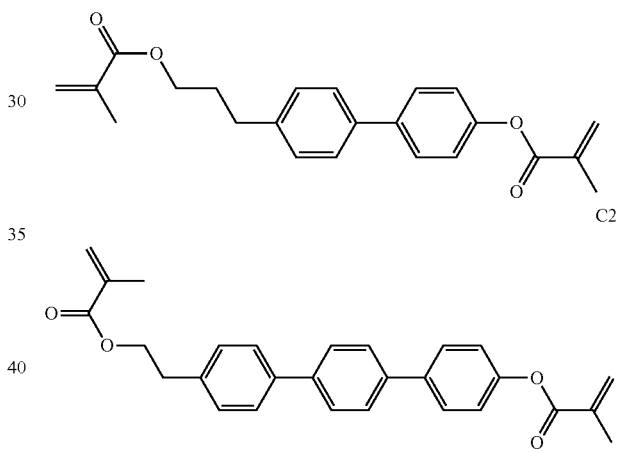

The comparative tilt-angle results for monomers 1-6 as well as C1 and C2 are shown in Table 1.

TABLE 1

| t/s | C1 | C2 | 1 | 2 |
|---|---|---|---|---|
| | | Tilt angle/° | | |
| 0 | 87.0 | 88.9 | 89.1 | 89.7 |
| 30 | 86.3 | 82.5 | 88.8 | 88.8 |
| 60 | 87.6 | 76.8 | 88.1 | 85.1 |
| 120 | 85.9 | 75.5 | 84.3 | 81.6 |
| 240 | 82.6 | 73.6 | 78.6 | 78.9 |
| 360 | — | 73.0 | 77.6 | 77.3 |

| t/s | 3 | 4 | 5 | 6 |
|---|---|---|---|---|
| | | Tilt angle/° | | |
| 0 | 88.9 | 89.1 | 89.3 | 87.0 |
| 30 | 86.0 | 88.7 | 88.9 | 82.0 |
| 60 | 82.7 | 86.8 | 86.9 | 77.8 |
| 120 | 79.2 | 84.0 | 83.5 | 74.9 |
| 240 | 76.6 | 80.5 | 80.6 | 73.7 |
| 360 | 75.4 | 79.5 | 79.2 | 73.1 |

(t = exposure time)

As can be seen from Table 1, significantly faster generation of the pretilt angle is achieved under the same conditions (50 mW/cm$^2$, UVA; 24 V) in PSA displays containing an LC medium according to the invention comprising LC mixture N1 and one of monomers 1-6 compared with the LC medium comprising N1 and monomer C1.

The change in pretilt angle in a PSA display with monomer C1 in LC mixture N1 is, for example, 1.1° after exposure to 50 mW/cm$^2$, 2 min and 24 V voltage. A change in pretilt angle of 4.8°, i.e. four times as much, is achieved under the same conditions in the case of a PSA display containing monomer 1 according to the invention in N1, and a change in pretilt angle of 8.1°, i.e. seven times as much, is achieved with monomer 2 according to the invention in N1. In both examples, saturation of the tilt range is observed after only 240 s (4 min). This not the case for monomer C1.

The monomer concentrations in the display after various exposure times are shown in Table 2.

TABLE 2

| t/s | C1 | C2 | 1 | 2 |
|---|---|---|---|---|
| | | RM concentration/% | | |
| 0 | 0.300 | 0.300 | 0.300 | 0.300 |
| 120 | 0.271 | 0.144 | 0.220 | 0.127 |
| 240 | 0.277 | 0.023 | 0.133 | 0.074 |
| 360 | 0.241 | 0.000 | 0.082 | 0.037 |
| | Exponential factor c ($RNA_{conc.} = 0.3\, e^{(c\cdot t)}$) | | | |
| | −0.0005 | −0.0098 | −0.0035 | −0.0059 |

| t/s | 3 | 4 | 5 |
|---|---|---|---|
| | RM concentration/% | | |
| 0 | 0.300 | 0.300 | 0.300 |
| 120 | 0.159 | 0.230 | 0.235 |
| 240 | 0.062 | 0.169 | 0.164 |
| 360 | 0.030 | 0.102 | 0.118 |

(t = exposure time)

The difference in the residual monomer concentrations is very striking. As can be seen from Table 2, 0.241% from originally 0.3% of monomer are still present after exposure for 360 s (6 min) in PSA displays with monomer C1 in N1. By contrast, PSA displays, for example with monomer 1 according to the invention in N1, only contain 0.082% and those, for example, with monomer 2 according to the invention in N1 only contain 0.037% of residual monomer from originally 0.3% after the same exposure time An e function can be fitted to a curve of the measurement data of the monomer content plotted against the exposure time. This function can be used to determine an exponential factor c, which is a measure of the polymerisation rate (see Table 2). It follows from this that monomer 1 in N1 polymerises seven times more quickly and monomer 2 in N1 twelve times more quickly than monomer C1 in N1.

The LC phase behaviour and the LTS and VHR values of the LC media are shown in Table 3.

TABLE 3

| C1 | C2 | 1 | 2 |
|---|---|---|---|
| LC phases (DSC; numerical values in ° C.): | | | |
| C >200 (decomposed) | Tg −36 C 67 N (62.1) I | C 76 Sm 136 polymerised | |
| The following measurements were carried out with 0.3% of monomer in N1: | | | |
| LTS at −10° C., bulk: | | | |
| >1000 h N | 24 h N 48h K | >1000 h N | >1000 h N |

TABLE 3-continued

| | | | |
|---|---|---|---|
| VHR test cells: alignment material AL-3046: | | | |
| VHR in % (5 min, 100° C.): | | | |
| 92.8 | 85.8 | 90.4 | 90.9 |
| VHR in % (5 min, 100° C., 2 h suntest exposure): | | | |
| 89.8 | 86.2 | 94.3 | 93.9 |
| 3 | 4 | 5 | 6 |
| LC phases (DSC; numerical values in ° C.): | | | |
| C 80 SmB 83 SmA 139 I | C 102 N 115.3 I | C 91 SmA (75) N 100.3 I | C 95 I |
| The following measurements were carried out with 0.3% of monomer in N1: | | | |
| LTS at −10° C., bulk: | | | |
| >1000 h N | >1000 h N | >1000 h N | 226 N 432 Cr |
| VHR test cells: alignment material AL-3046: | | | |
| VHR in % (5 min, 100° C.): | | | |
| 98.5 | 99.3 | 99.2 | 99.3 |
| VHR in % (5 min, 100° C., 2 h suntest exposure): | | | |
| 97.9 | 98.6 | 983 | 87.8 |

As can be seen from Table 3, the LTS and VHR values of monomers 1-6 according to the invention in LC mixture N1 are also very good and comparable to or even better than the LTS and VHR values of monomer C1 in N1.

Although monomer C2 in LC mixture N1 exhibits even faster pretilt generation (see Table 1) and an even faster polymerisation rate (see Table 2) than monomers 1-6 according to the invention, it has, however, very low solubility and results in worse LTS and VHR values before and after suntest exposure of the LC/monomer mixture, as can be seen from Table 3.

The invention claimed is:

1. An LC medium or a PSA LC display which contains said medium, wherein said medium comprises one or more polymerizable compounds selected from formula I

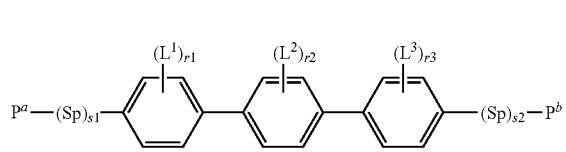

in which the individual radicals have the following meanings:

$P^a$, $P^b$ each, independently of one another, denote a polymerizable group,

Sp on each occurrence, identically or differently, denotes —(CH$_2$)$_{p1}$—, —(CH$_2$)$_{p1}$—O—, —(CH$_2$)$_{p1}$—O—CO— or —(CH$_2$)$_{p1}$—O—CO—O—, in which p1 denotes an integer from 1 to 12, where these groups are linked to $P^a$ or $P^b$ in such a way that O atoms are not directly adjacent, $L^1$, $L^2$, $L^3$ each, independently of one another, denote F or Cl, one or more of the radicals $L^1$, $L^2$ and $L^3$ also denotes fully or partially fluorinated alkyl or alkoxy having 1, 2 or 3 C atoms, $P^a$ or $P^a$-Sp-, where at least one of the radicals $L^1$, $L^2$ and $L^3$ denotes F or Cl, r1, r2, r3 each, independently of one another, denote 0, 1, 2, 3 or 4 where r1+r2+r3≥1, and s1, s2 each, independently of one another, denote 0 or 1, wherein at least one of s1 or s2 is 1 and the other is 0.

2. An LC medium or LC display according to claim 1, wherein said compounds of the formula I are selected from the following sub-formulae:

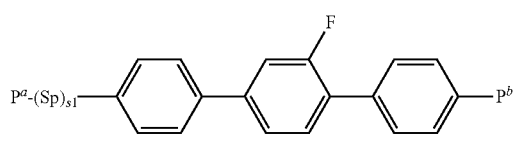
I1

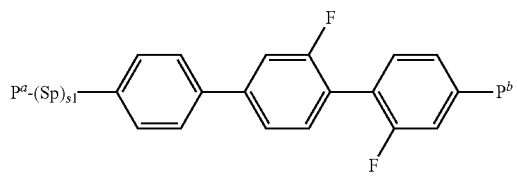
I2

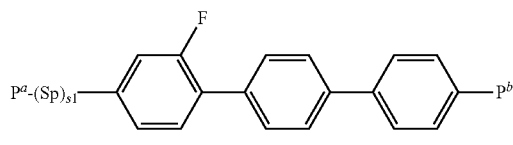
I3

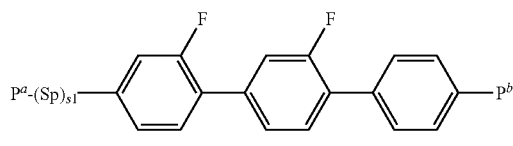
I4

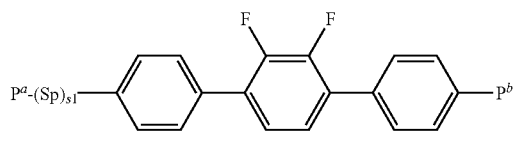
I5

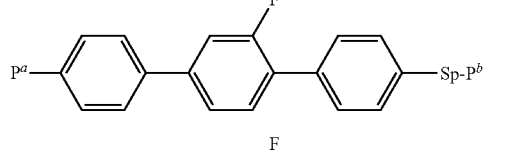
I6

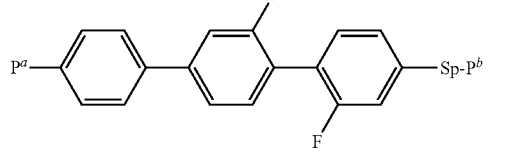
I7

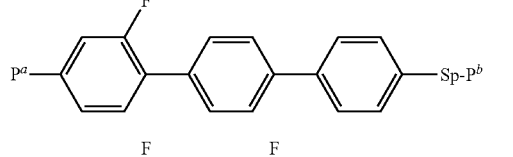
I8

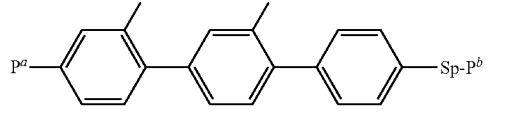
I9 in which $P^a$, $P^b$, $Sp$ and $s1$ have the meanings indicated for formula I.

3. An LC display according to claim 1, wherein said display comprises an LC cell having two substrates and two electrodes, where at least one substrate is transparent to light and at least one substrate has one or two electrodes, and a layer, located between the substrates, of said LC medium, wherein said LC medium comprises a polymerized component and a low-molecular-weight component, where the polymerized component is obtainable by polymerization of said one or more polymerizable compounds between the substrates of the LC cell in the LC medium.

4. An LC medium or LC display according to claim 1, wherein said LC medium comprises one or more compounds of the formulae CY and/or PY:

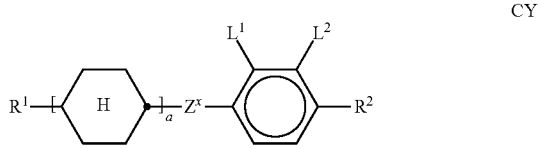
CY

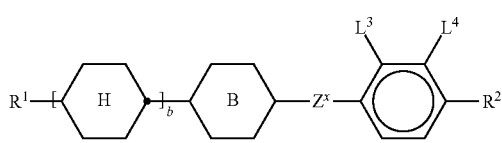
PY in which the individual radicals have the following meanings:
a denotes 1 or 2,
b denotes 0 or 1,

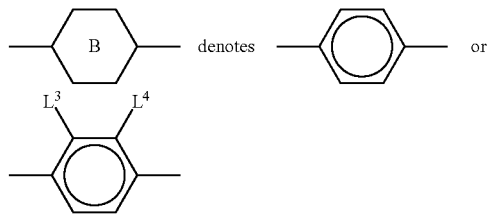

$R^1$ and $R^2$ each, independently of one another, denote alkyl having 1 to 12 C atoms, where, in addition, one or two non-adjacent $CH_2$ groups are each optionally replaced by —O—, —CH=CH—, —CO—, —O—CO— or —CO—O— in such a way that O atoms are not linked directly to one another, $Z^X$ denotes —CH=CH—, —$CH_2$O—, —O$CH_2$—, —$CF_2$O—, —O$CF_2$—, —O—, —$CH_2$—, —$CH_2CH_2$— or a single bond, and $L^{1-4}$ each, independently of one another, denote F, Cl, $OCF_3$, $CF_3$, $CH_3$, $CH_2F$, $CHF_2$.

5. An LC medium or LC display according to claim 1, wherein said LC medium comprises one or more compounds of the following formula:

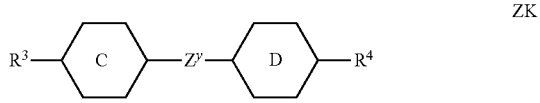
ZK in which the individual radicals have the following meanings:

denotes

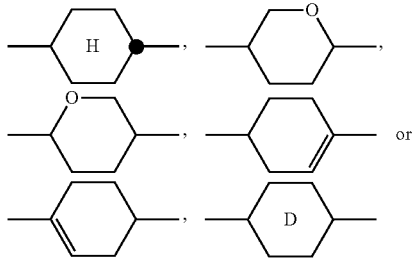

denotes

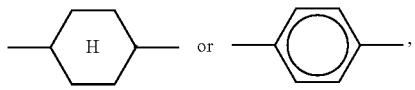

R$^3$ and R$^4$ each, independently of one another, denote alkyl having 1 to 12 C atoms, in which, in addition, one or two non-adjacent CH$_2$ groups are each optionally replaced by —O—, —CH=CH—, —CO—, —O—CO— or —CO—O— in such a way that O atoms are not linked directly to one another, and Z$^y$ denotes —CH$_2$CH$_2$—, —CH=CH—, —CF$_2$O—, —OCF$_2$—, —CH$_2$O—, —OCH$_2$—, —COO—, —OCO—, —C$_2$F$_4$—, —CF=CF— or a single bond.

6. An LC display according to claim 1.

7. An LC display according to claim 6, wherein said display is a PSA-VA, PSA-OCB, PSA-IPS, PSA-FFS, PSA-positive-VA or PSA-TN display.

8. An LC medium according to claim 1.

9. An LC medium according to claim 8, comprising
a polymerizable component A) comprising one or more polymerizable compounds, and
a liquid-crystalline component B) comprising one or more low-molecular-weight compounds,
wherein component A) comprises one or more polymerizable compounds according to formula I.

10. An LC medium according to claim 9, wherein component B) comprises one or more compounds selected from formulae CY, PY and ZK:

CY
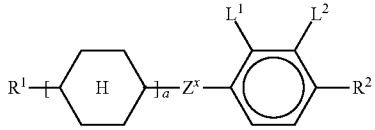

PY
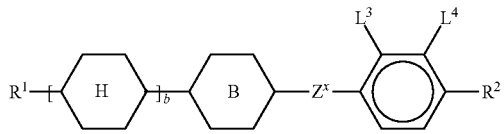

in which the individual radicals have the following meanings:
a denotes 1 or 2,
b denotes 0 or 1,

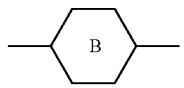

denotes

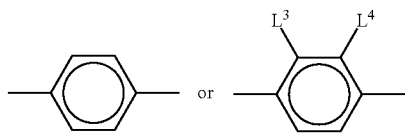

R$^1$ and R$^2$ each, independently of one another, denote alkyl having 1 to 12 C atoms, where, in addition, one or two non-adjacent CH$_2$ groups are each optionally replaced by —O—, —CH=CH—, —CO—, —O—CO— or —CO—O— in such a way that O atoms are not linked directly to one another, Z$^x$ denotes —CH=CH—, —CH$_2$O—, —OCH$_2$—, —CF$_2$O—, —OCF$_2$—, —O—, —CH$_2$—, —CH$_2$CH$_2$— or a single bond, and L$^{1-4}$ each, independently of one another, denote F, Cl, OCF$_3$, CF$_3$, CH$_3$, CH$_2$F, CHF$_2$, ZK
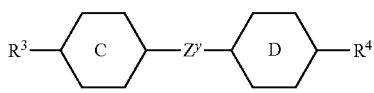

in which the individual radicals have the following meanings:

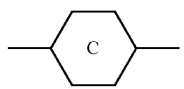

denotes

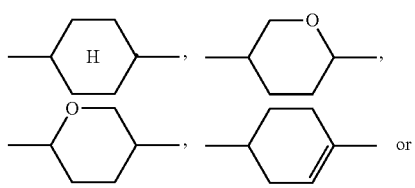

denotes

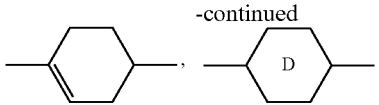

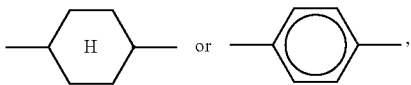

$R^3$ and $R^4$ each, independently of one another, denote alkyl having 1 to 12 C atoms, in which, in addition, one or two non-adjacent $CH_2$ groups are each optionally replaced by —O—, —CH=CH—, —CO—, —O—CO— or —CO—O— in such a way that O atoms are not linked directly to one another, and $Z^y$ denotes —$CH_2CH_2$—, —CH=CH—, —$CF_2O$—, —$OCF_2$—, —$CH_2O$—, —$OCH_2$—, —COO—, —OCO—, —$C_2F_4$—, —CF=CF— or a single bond.

11. A compound of the formula I

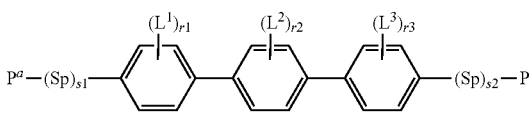

in which the individual radicals have the following meanings:

$P^a$ $P^b$ each, independently of one another, denote a polymerizable group,

Sp on each occurrence, identically or differently, denotes a spacer group, $L^1$, $L^2$, $L^3$ each, independently of one another, denote F or Cl, one or more of the radicals $L^1$, $L^2$ and $L^3$ also denotes fully or partially fluorinated alkyl or alkoxy having 1, 2 or 3 C atoms, $P^a$ or $P^a$-Sp-, where at least one of the radicals $L^1$, $L^2$ and $L^3$ denotes F or Cl, r1, r2, r3 each, independently of one another, denote 0, 1, 2, 3 or 4 where r1+r2+r3≥1, and s1, s2 each, independently of one another, denote 0 or 1, wherein at least one of s1 or s2 is 1 and the other is 0.

12. A compound of formula II

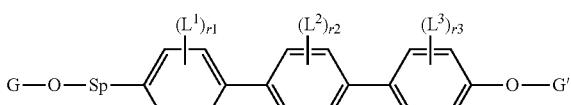

in which

Sp on each occurrence, identically or differently, denotes a spacer group, $L^1$, $L^2$, $L^3$ each, independently of one another, denote F or Cl, one or more of the radicals $L^1$, $L^2$ and $L^3$ also denotes fully or partially fluorinated alkyl or alkoxy having 1, 2 or 3 C atoms, $P^a$ or $P^a$-Sp-, where at least one of the radicals $L^1$, $L^2$ and $L^3$ denotes F or Cl, r1, r2, r3 each, independently of one another, denote 0, 1, 2, 3 or 4 where r1+r2+r3≥1, G and G' each, independently of one another, denote an H atom or a protecting group, wherein said protecting group is an alkyl, acyl, alkyl silyl, arylsilyl, 2-tetrahydropyranyl of methoxymethyl group, and $P^a$ denotes a polymerizable group.

13. A process for the preparation of a compound according to claim 1, in which a compound of formula II

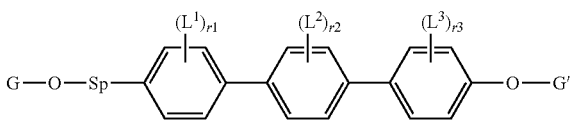

in which

Sp on each occurrence, identically or differently, denotes a spacer group, $L^1$, $L^2$, $L^3$ each, independently of one another, denote F or Cl, one or more of the radicals $L^1$, $L^2$ and $L^3$ also denotes fully or partially fluorinated alkyl or alkoxy having 1, 2 or 3 C atoms, $P^a$ or $P^a$-Sp-, where at least one of the radicals $L^1$, $L^2$ and $L^3$ denotes F or Cl, r1, r2, r3 each, independently of one another, denote 0, 1, 2, 3 or 4 where r1+r2+r3≥1, G and G' each, independently of one another, denote an H atom or a protecting group, wherein said protecting group is an alkyl, acyl, alkyl silyl, arylsilyl, 2-tetrahydropyranyl of methoxymethyl group, and $P^a$ denotes a polymerizable group is esterified or etherified using corresponding acids, acid derivatives, or halogenated compounds containing a group $P^a$ or $P^b$, which are defined as for the compound of formula I, in the presence of a dehydrating reagent.

14. A process for the production of a PSA LC display, said process comprising introducing an LC medium according to claim 8 into an LC cell having two substrates and two electrodes, where at least one substrate is transparent to light and at least one substrate has one or two electrodes, and the polymerizable compounds are polymerized.

15. A compound according to claim 11, wherein one of s1 and s2 is 0 and the other of s1 and s2 is 1.

16. An LC medium or LC display according to claim 1, wherein at least one of the radicals $L^1$, $L^2$ and $L^3$ denotes F.

17. An LC display according to claim 3, wherein said polymerized component is obtainable by polymerization of said one or more polymerizable compounds between the substrates of the LC cell in the LC medium by application of an electrical voltage to said electrodes.

18. An LC medium or LC display according to claim 4, wherein $Z^x$ is a single bond.

19. An LC medium according to claim 10, wherein r is a single bond.

20. A compound according to claim 11, wherein at least one of the radicals $L^1$, $L^2$ and $L^3$ denotes F.

21. A compound according to claim 12, wherein at least one of the radicals $L^1$, $L^2$ and $L^3$ denotes F.

22. A process according to claim 13, wherein at least one of the radicals $L^1$, $L^2$ and $L^3$ denotes F.

23. A process according to claim 14, wherein said polymerizable compounds are polymerized by application of an electrical voltage to said electrodes.

24. A compound according to claim 12, wherein G and G' each denote H.

* * * * *